(12) United States Patent
Shariff et al.

(10) Patent No.: US 10,032,180 B1
(45) Date of Patent: Jul. 24, 2018

(54) METHOD, APPARATUS, AND COMPUTER PROGRAM PRODUCT FOR FORECASTING DEMAND USING REAL TIME DEMAND

(71) Applicant: Groupon, Inc., Chicago, IL (US)

(72) Inventors: Shafiq Shariff, Chicago, IL (US); Derek Nordquist, Chicago, IL (US)

(73) Assignee: Groupon, Inc., Chicago, IL (US)

( * ) Notice: Subject to any disclaimer, the term of this patent is extended or adjusted under 35 U.S.C. 154(b) by 592 days.

(21) Appl. No.: 14/316,245

(22) Filed: Jun. 26, 2014

Related U.S. Application Data

(63) Continuation-in-part of application No. 13/826,333, filed on Mar. 14, 2013.

(60) Provisional application No. 61/939,193, filed on Feb. 12, 2014, provisional application No. 61/730,046, filed on Nov. 26, 2012, provisional application No. 61/709,623, filed on Oct. 4, 2012.

(51) Int. Cl.
*G06Q 30/02* (2012.01)
*G06F 17/18* (2006.01)

(52) U.S. Cl.
CPC ......... *G06Q 30/0202* (2013.01); *G06F 17/18* (2013.01)

(58) Field of Classification Search
CPC .................................................. G06Q 30/02
See application file for complete search history.

(56) References Cited

U.S. PATENT DOCUMENTS

| | | | |
|---|---|---|---|
| 6,058,371 A | 5/2000 | Djian | |
| 6,922,672 B1 | 7/2005 | Hailpern et al. | |
| 7,092,929 B1 | 8/2006 | Dvorak et al. | |
| 7,240,025 B2 | 7/2007 | Stone et al. | |
| 7,647,255 B2 | 1/2010 | Wang et al. | |
| 7,720,708 B1 | 5/2010 | Elkins, II et al. | |
| 7,769,628 B2 | 8/2010 | Mathews et al. | |
| 7,917,387 B2 | 3/2011 | Spurr et al. | |
| 8,001,058 B1 | 8/2011 | Harding et al. | |

(Continued)

OTHER PUBLICATIONS

Office Action from U.S. Appl. No. 13/803,275, dated Apr. 7, 2015.

(Continued)

*Primary Examiner* — Kurtis Gills
(74) *Attorney, Agent, or Firm* — Alston & Bird LLP

(57) ABSTRACT

Provided herein are systems, methods and computer readable media for managing a sales pipeline, and in some embodiments, generating demand based on real time demand and predicted demand. An example method comprises generating a virtual promotion, wherein the virtual promotion comprises a combination of a category or subcategory, a location, and a price range, calculating a probability that a particular consumer would buy the virtual offer in a predetermined time period, wherein the probability is generated at least based on historical data related to the particular consumer and one or more related consumers, determining an estimated number of units to be sold for the virtual offer as a function of at least the probability, the estimated number of units representing a predicted demand, calculating a real time demand, wherein the real time demand is generated based on a plurality of generated identification pairs for the predetermined time period, and determining, using a processor, total demand by summing the predicted demand and the real time demand.

45 Claims, 29 Drawing Sheets

(56) References Cited

U.S. PATENT DOCUMENTS

| | | |
|---|---|---|
| 8,010,404 B1 | 8/2011 | Wu et al. |
| 8,019,744 B1 | 9/2011 | Roizen et al. |
| 8,200,521 B2 | 6/2012 | Hader |
| 8,214,238 B1 | 7/2012 | Fairfield et al. |
| 8,249,942 B2 | 8/2012 | Mesaros |
| 8,478,650 B2 | 7/2013 | Ridley et al. |
| 8,533,038 B2 | 9/2013 | Bergh et al. |
| 8,600,843 B2 | 12/2013 | Bachman et al. |
| 8,725,597 B2 | 5/2014 | Mauseth et al. |
| 2001/0032128 A1 | 10/2001 | Kepecs |
| 2001/0039514 A1 | 11/2001 | Barenbaum et al. |
| 2002/0042739 A1 | 4/2002 | Srinivasan et al. |
| 2002/0052820 A1 | 5/2002 | Gatto |
| 2002/0099678 A1 | 7/2002 | Albright et al. |
| 2002/0169654 A1 | 11/2002 | Santos et al. |
| 2002/0198756 A1 | 12/2002 | Ghaisas et al. |
| 2003/0046191 A1 | 3/2003 | Ferreri et al. |
| 2003/0065603 A1 | 4/2003 | Aihara et al. |
| 2003/0220830 A1 | 11/2003 | Myr |
| 2004/0093296 A1 | 5/2004 | Phelan et al. |
| 2004/0143473 A1 | 7/2004 | Tivey et al. |
| 2005/0055275 A1 | 3/2005 | Newman et al. |
| 2005/0060242 A1 | 3/2005 | Armstrong et al. |
| 2005/0096963 A1 | 5/2005 | Myr et al. |
| 2005/0187818 A1 | 8/2005 | Zito et al. |
| 2005/0261951 A1 | 11/2005 | Tighe |
| 2005/0267828 A1 | 12/2005 | Baron et al. |
| 2006/0041500 A1 | 2/2006 | Diana et al. |
| 2006/0047559 A1 | 3/2006 | Jacoby et al. |
| 2006/0161534 A1 | 7/2006 | Carson, Jr. et al. |
| 2006/0212355 A1 | 9/2006 | Teague et al. |
| 2006/0287946 A1 | 12/2006 | Toms |
| 2007/0016508 A1 | 1/2007 | Lapointe et al. |
| 2007/0050276 A1 | 3/2007 | Mannion |
| 2007/0087831 A1* | 4/2007 | Van Luchene ......... A63F 13/12 463/42 |
| 2007/0168131 A1 | 7/2007 | Root et al. |
| 2008/0021844 A1 | 1/2008 | Sanwal et al. |
| 2008/0177615 A1 | 7/2008 | Chen-Ritzo et al. |
| 2008/0256061 A1 | 10/2008 | Chang et al. |
| 2008/0270209 A1 | 10/2008 | Mauseth et al. |
| 2008/0281756 A1 | 11/2008 | Riise et al. |
| 2008/0288481 A1 | 11/2008 | Zeng et al. |
| 2008/0294996 A1 | 11/2008 | Hunt et al. |
| 2008/0306812 A1 | 12/2008 | Bowen et al. |
| 2008/0313018 A1 | 12/2008 | Kamm, IV et al. |
| 2009/0024402 A1 | 1/2009 | Delingat et al. |
| 2009/0048859 A1* | 2/2009 | McCarthy ......... G06Q 30/0281 705/346 |
| 2009/0119258 A1 | 5/2009 | Petty |
| 2009/0177540 A1* | 7/2009 | Quatse ............... G06Q 30/02 705/14.26 |
| 2009/0276296 A1 | 11/2009 | Spriegel |
| 2009/0281818 A1 | 11/2009 | Li et al. |
| 2010/0050201 A1 | 2/2010 | Kubota et al. |
| 2010/0082410 A1* | 4/2010 | Baudin ............... G06Q 30/06 705/7.29 |
| 2010/0082413 A1 | 4/2010 | Huberman et al. |
| 2010/0082442 A1 | 4/2010 | Ma et al. |
| 2010/0094693 A1 | 4/2010 | Corke |
| 2010/0179704 A1* | 7/2010 | Ozog ............... G06Q 10/06315 700/291 |
| 2010/0211455 A1 | 8/2010 | Williams et al. |
| 2011/0029382 A1 | 2/2011 | Narasimhan et al. |
| 2011/0087531 A1 | 4/2011 | Winters et al. |
| 2011/0112892 A1 | 5/2011 | Tarantino |
| 2011/0112897 A1 | 5/2011 | Tietzen et al. |
| 2011/0173059 A1 | 7/2011 | Benson |
| 2011/0219073 A1 | 9/2011 | Lawler et al. |
| 2011/0225023 A1 | 9/2011 | Evens et al. |
| 2011/0231321 A1 | 9/2011 | Milne |
| 2011/0246255 A1 | 10/2011 | Gilbert et al. |
| 2011/0246260 A1 | 10/2011 | Gilbert et al. |
| 2011/0246306 A1 | 10/2011 | Blackhurst et al. |
| 2011/0258067 A1 | 10/2011 | Rowell |
| 2011/0289106 A1 | 11/2011 | Rankin, Jr. et al. |
| 2011/0313840 A1 | 12/2011 | Mason et al. |
| 2012/0010931 A1 | 1/2012 | Mehra et al. |
| 2012/0036009 A1 | 2/2012 | Aronowich et al. |
| 2012/0054001 A1 | 3/2012 | Zivkovic et al. |
| 2012/0054019 A1 | 3/2012 | Kitts et al. |
| 2012/0054020 A1 | 3/2012 | Jacobs |
| 2012/0066393 A1 | 3/2012 | Tekwani |
| 2012/0078721 A1 | 3/2012 | Dakka et al. |
| 2012/0123851 A1 | 5/2012 | Bax et al. |
| 2012/0123863 A1 | 5/2012 | Kaul et al. |
| 2012/0203708 A1 | 8/2012 | Psota et al. |
| 2012/0246015 A1 | 9/2012 | Bennett et al. |
| 2012/0259705 A1 | 10/2012 | Monteverde |
| 2012/0271660 A1 | 10/2012 | Harris et al. |
| 2012/0278154 A1 | 11/2012 | Lange et al. |
| 2012/0291087 A1 | 11/2012 | Agrawal |
| 2012/0323634 A1 | 12/2012 | Harper et al. |
| 2012/0330720 A1 | 12/2012 | Pickton et al. |
| 2012/0330772 A1 | 12/2012 | Choe et al. |
| 2013/0006916 A1 | 1/2013 | McBride et al. |
| 2013/0013345 A1 | 1/2013 | Wallquist et al. |
| 2013/0013404 A1* | 1/2013 | Suprock ............... G06Q 30/02 705/14.53 |
| 2013/0030872 A1 | 1/2013 | Oksman |
| 2013/0036069 A1 | 2/2013 | Salloum et al. |
| 2013/0054369 A1 | 2/2013 | Grigg et al. |
| 2013/0066885 A1 | 3/2013 | Komuves |
| 2013/0073381 A1 | 3/2013 | Binkley |
| 2013/0080239 A1 | 3/2013 | Okerlund |
| 2013/0103634 A1 | 4/2013 | Jojic et al. |
| 2013/0159319 A1 | 6/2013 | Duan et al. |
| 2013/0179264 A1 | 7/2013 | Wilson |
| 2013/0185147 A1* | 7/2013 | Letca ............... G06Q 30/0241 705/14.47 |
| 2013/0197675 A1 | 8/2013 | McCarthy et al. |
| 2013/0246176 A1 | 9/2013 | Chang et al. |
| 2013/0282509 A1 | 10/2013 | Strong et al. |
| 2013/0290172 A1 | 10/2013 | Mashinsky |
| 2013/0311271 A1 | 11/2013 | Agrawal et al. |
| 2013/0346157 A1* | 12/2013 | Avrilionis .......... G06Q 30/0206 705/7.35 |
| 2013/0346981 A1 | 12/2013 | Johnson et al. |
| 2014/0019249 A1 | 1/2014 | Nicholas et al. |
| 2014/0025467 A1 | 1/2014 | Nagarajan et al. |
| 2014/0143100 A1 | 5/2014 | Glustrom et al. |
| 2014/0279058 A1 | 9/2014 | Mullins et al. |
| 2015/0149091 A1 | 5/2015 | Milton et al. |
| 2016/0314399 A1 | 10/2016 | Mullins et al. |

OTHER PUBLICATIONS

Office Action from U.S. Appl. No. 13/826,757, dated Apr. 10, 2015.
"Credit Rating Analysis with Support Vector Machines and Neural Networks: A Market Comparative Study"; Zan Huanga, Hsinchun Chena, Chia-Jung Hsua, Wun-Hwa Chenb, Soushan Wu; 0617-9236/03/$—see front matter 2003 Elsevier B.V. All rights reserved. doi: 10.1016/S0167-9236(03)00086-1.
"Support Vector Machines for Regression and Applications to Financial Forecasting"; Theodore B. Trafalig and Huseyin Ince; 0-7695-0619-4/00 $10.00 2000 IEEE.
"Forecasting Corporate Revenue and Profit: Time-Series Models Versus Management and Analysts"; David A. Kodde and Hein Schreuder; Journal of Business Finance & Accounting 11(3), Autumn 1984, 0306686 x $2.50.
Office Action from U.S. Appl. No. 13/826,464, dated Apr. 7, 2015.
Office Action from U.S. Appl. No. 13/826,333, dated Apr. 21, 2015.
Office Action from U.S. Appl. No. 13/803,445, dated Jun. 5, 2015.
Advisory Action for U.S. Appl. No. 13/826,333, dated Nov. 27, 2015.
Advisory Action for U.S. Appl. No. 14/316,228 dated May 23, 2016.
Office Action for U.S. Appl. No. 13/826,464 dated Jun. 23, 2016.
Office Action for U.S. Appl. No. 13/826,866 dated May 24, 2016.
U.S. Appl. No. 61/639,067, filed Apr. 26, 2012; entitled *Deal Meter*.

(56) References Cited

OTHER PUBLICATIONS

U.S. Appl. No. 61/682,762, filed Aug. 13, 2012; entitled *Unified Payment and Return on Investment System*.
U.S. Appl. No. 13/411,502, filed Mar. 2, 2012; entitled *Relevance System for Consumer Deals*.
U.S. Appl. No. 13/460,745, filed Apr. 30, 2012, entitled *Sales Enhancement System*.
U.S. Appl. No. 13/842,379, filed Mar. 15, 2013 entitled *Pull-Type Searching System*.
U.S. Appl. No. 14/038,629, filed Sep. 26, 2013; entitled *Automated Deal Guide Structure Identification*.
U.S. Appl. No. 14/039,473, filed Sep. 27, 2013, entitlted *Method, Apparatus, and Computer Program Product for Consumer Tracking*.
U.S. Appl. No. 14/106,203, filed Dec. 13, 2013, entitled *Method, Apparatus, and Computer Program Product for Providing a Search Feedback System*.
U.S. Appl. No. 13/829,581, filed Mar. 14, 2013; In re: Richardson et al., entitled *Updating Routing Information Based on Client Location*.
Notice of Allowance for corresponding U.S. Appl. No. 13/826,757 dated Dec. 30, 2015.
Office Action from U.S. Appl. No. 13/803,445, dated Nov. 6, 2015.
Office Action from U.S. Appl. No. 13/805,000, dated Nov. 6, 2015.
Office Action from U.S. Appl. No. 13/803,275, dated Nov. 3, 2015.
Office Action from U.S. Appl. No. 14/316,228, dated Feb. 1, 2016.
Office Action from U.S. Appl. No. 13/805,000, dated Jun. 6, 2015.
Office Action from U.S. Appl. No. 14/316,228, dated Jul. 16, 2015.
Office Action from U.S. Appl. No. 13/826,333, dated Aug. 13, 2015.
Office Action from U.S. Appl. No. 13/826,464, dated Aug. 31, 2015.
Office Action from U.S. Appl. No. 13/826,866, dated Sep. 22, 2015.
Office Action from U.S. Appl. No. 13/826,757, dated Sep. 29, 2015.
Office Action for U.S. Appl. No. 13/826,333 dated Aug. 9, 2016.
Office Action for U.S. Appl. No. 14/316,264 dated Jul. 28, 2016.
Office Action for U.S. Appl. No. 14/316,253 dated Jul. 29, 2016.
Office Action for U.S. Appl. No. 13/803,445 dated Oct. 7, 2016.
Office Action for U.S. Appl. No. 13/805,000 dated Oct. 7, 2016.
Office Action for U.S. Appl. No. 14/316,228, dated Oct. 12, 2016.
Office Action for U.S. Appl. No. 15/051,165 dated Aug. 31, 2016.
Office Action for U.S. Appl. No. 13/826,464 dated Nov. 21, 2016.
Wong, W., "Andrew Mason talks about Groupon's growth and growing up", Chicago Tribune, Business, (Sep. 38, 2012), pp. 1-3, Retrieved oniine at: http://articles.chicagotribune.com/2012-09-08/business/chi-andrew-mason-talks-about-groupons-growth-and-growing-up-20120908_1_deal-personalization-groupons-core-daily-deal-business.
International Search Report and Written Opinion for Application No. PCT/US2014/44067 dated Nov. 14, 2014.
International Search Report and Written Opinion for Application No. PCT/US2014/020028 dated Jun. 6, 2014.
Extended European Search Report for European Office Application No. 14818658.8 dated Dec. 9, 2016, 5 pages.

* cited by examiner

FIG. 9

METHOD, APPARATUS, AND COMPUTER PROGRAM PRODUCT FOR FORECASTING DEMAND USING REAL TIME DEMAND

CROSS REFERENCES TO RELATED APPLICATIONS

This application claims priority to U.S. Provisional Patent Application No. 61/939,193, titled "METHOD, APPARATUS, AND COMPUTER PROGRAM PRODUCT FOR FORECASTING DEMAND" filed on Feb. 12, 2014, and U.S. patent application Ser. No. 13/826,333, titled "METHOD, APPARATUS, AND COMPUTER PROGRAM PRODUCT FOR FORECASTING DEMAND" filed Mar. 14, 2013, which claims priority to U.S. Provisional Patent Application No. 61/730,046, titled "METHOD AND APPARATUS FOR MATCHING SUBSCRIBER DEMAND WITH MERCHANT/INVENTORY SUPPLY" filed on Nov. 26, 2012", and U.S. Provisional Application No. 61/709,623, titled "MERCHANT SIDE CROSS-CATEGORY DEAL DIVERSITY", filed Oct. 4, 2012, each of which is hereby incorporated by reference.

The present application is related to U.S. patent application Ser. No. 13/803,445, filed Mar. 14, 2013, titled "METHOD, APPARATUS, AND COMPUTER PROGRAM PRODUCT FOR SALES PIPELINE AUTOMATION", U.S. patent application Ser. No. 14/106,203, filed Dec. 13, 2013, titled "METHOD, APPARATUS, AND COMPUTER PROGRAM PRODUCT FOR PROVIDING A SEARCH FEEDBACK SYSTEM", U.S. patent application Ser. No. 13/826,866, filed Mar. 14, 2013, titled "METHOD, APPARATUS, AND COMPUTER PROGRAM PRODUCT FOR CALCULATING A PROVIDER QUALITY SCORE", U.S. patent application Ser. No. 13/826,757, filed Mar. 14, 2013, titled "METHOD, APPARATUS, AND COMPUTER PROGRAM PRODUCT FOR DETERMINING A PROVIDER RETURN RATE", U.S. patent application Ser. No. 13/804,403, filed Mar. 14, 2013, titled "METHOD, APPARATUS, AND COMPUTER PROGRAM PRODUCT FOR IDENTIFYING A SERVICE NEED VIA A PROMOTIONAL SYSTEM", U.S. patent application Ser. No. 13/804,316, filed Mar. 14, 2013, titled "METHOD, APPARATUS, AND COMPUTER PROGRAM PRODUCT FOR DETERMINING CLOSING METRICS", and U.S. patent application Ser. No. 13/830,243, filed Mar. 14, 2013, titled "CAPACITY CALCULATOR", and U.S. patent application Ser. No. 13/803,275, filed Mar. 14, 2013, titled "MERCHANT SIDE CROSS-CATEGORY DEAL DIVERSITY" each of which is hereby incorporated by reference.

FIELD

Embodiments of the invention relate, generally, to managing a sales pipeline.

BACKGROUND

Applicant has discovered problems with current methods for managing a sales pipeline. In some examples, a plurality of manual steps in the process may be eliminated and/or the accuracy may be improved. Through applied effort, ingenuity, and innovation, Applicant has solved many of these identified problems by developing a solution that is embodied by the present invention, which is described in detail below.

BRIEF SUMMARY

In general, embodiments of the present invention provided herein include systems, methods and computer readable media for managing a sales pipeline.

In some embodiments, a method may be provided for forecasting demand comprising generating a virtual promotion, wherein the virtual promotion comprises a combination of a category or sub-category, a location, and a price range, calculating a probability that a particular consumer would buy the virtual offer in a predetermined time period, wherein the probability is generated at least based on historical data related to the particular consumer and one or more related consumers, determining an estimated number of units to be sold for the virtual offer as a function of at least the probability, the estimated number of units representing a predicted demand, calculating a real time demand, wherein the real time demand is generated based on a plurality of generated identification pairs for the predetermined time period, and determining, using a processor, total demand by summing the predicted demand and the real time demand.

In some embodiments, calculating the real time demand comprises accessing user search data, the user search data generated by a user interacting with a promotion and marketing service to identify a requested promotion, determining a first classification of the user search data by parsing the user search data into one or more terms, applying one or more terms within the user search data to a search index, wherein the first classification is configured to generate a mapping from the one or more terms within the user search data to at least one of a service or merchant, determining a second classification of the user search data, wherein the second classification identifies a requested redemption location for the requested promotion, and generating the identification pair for the search data that is representative of a promotion tuple, the identification pair comprising the first classification and the second classification.

In some embodiments, the method may further comprise distributing the real time demand across one or more predetermined price points. In some embodiments, the method may further comprise distributing the real time demand across a plurality of hyper-local regions in an instance in which the second classification comprises a region that contains two or more hyper-local regions. In some embodiments, the method may further comprise distributing the real time demand across a plurality of sub-categories in an instance in which the first classification comprises a category that contains two or more sub-categories.

In some embodiments, determining total demand further comprises identifying a benchmark conversion rate, comparing the real time demand to the benchmark conversion rate to set a modified real time demand that identifies a quantity of units that would have been purchased had the units been available, identifying an actual purchase quantity, and modifying the real time demand, wherein the real time demand is equal to the actual purchase quantity subtracted from the modified real time demand.

In some embodiments, the method may further comprise adjusting the total demand as a function of one or more external factors. In some embodiments, the method may further comprise generating a ranked user list for each of the one or more users comprising each of the one or more virtual offers and an associated calculated probability, assigning a voting value to each of the one or more virtual offers on each ranked user list, and generating a single list ranking each of the one or more virtual offers by adding the voting value each of the one or more virtual offers received on each ranked user list.

In some embodiments, the determining of the estimated number of units to be sold for is only for a predetermined number of virtual offers, and is based on the ranking of each of the one or more virtual offers on the single list. In some embodiments, the selecting of the one or more virtual offers further comprises calculating a projected revenue value for each virtual offer based on prior performance data per unit and the estimated number of units to be sold, ranking the one or more virtual offers by the projected revenue, and selecting one or more virtual offers to include in the forecasted demand based on the ranking of each of the one or more virtual offers by revenue and a pre-selected portfolio mix.

In some embodiments, the one or more external factors includes at least a seasonality component. In some embodiments, a virtual offer comprises at least price data, one product category or one service category, and location data. In some embodiments, the voting value is derived from a position of the one or more virtual offers on the ranked lists generated for each of the one or more users, wherein at least a predetermined number of virtual offers on each ranked list are assigned a first voting value. In some embodiments, the pre-selected portfolio mix comprises at least one of a category mix, a price mix, or location constraints. In some embodiments, one or more combinations of category or sub-category, location and price range are generated for a specified time period.

In some embodiments, a computer program product may be provided comprising at least one computer-readable storage medium having computer-executable program code instructions stored therein, the computer-executable program code instructions comprising program code instructions for generating a virtual promotion, wherein the virtual promotion comprises a combination of a category or sub-category, a location, and a price range, calculating a probability that a particular consumer would buy the virtual offer in a predetermined time period, wherein the probability is generated at least based on historical data related to the particular consumer and one or more related consumers, determining an estimated number of units to be sold for the virtual offer as a function of at least the probability, the estimated number of units representing a predicted demand, calculating a real time demand, wherein the real time demand is generated based on a plurality of generated identification pairs for the predetermined time period, and determining, using a processor, total demand by summing the predicted demand and the real time demand.

In some embodiments, calculating the real time demand comprises accessing user search data, the user search data generated by a user interacting with a promotion and marketing service to identify a requested promotion, determining a first classification of the user search data by parsing the user search data into one or more terms, applying one or more terms within the user search data to a search index, wherein the first classification is configured to generate a mapping from the one or more terms within the user search data to at least one of a service or merchant, determining a second classification of the user search data, wherein the second classification identifies a requested redemption location for the requested promotion, and generating the identification pair for the search data that is representative of a promotion tuple, the identification pair comprising the first classification and the second classification.

In some embodiments, the computer-executable program code instructions further comprise program code instructions for distributing the real time demand across one or more predetermined price points.

In some embodiments, the computer-executable program code instructions further comprise program code instructions for distributing the real time demand across a plurality of hyper-local regions in an instance in which the second classification comprises a region that contains two or more hyper-local regions.

In some embodiments, the computer-executable program code instructions further comprise program code instructions for distributing the real time demand across a plurality of sub-categories in an instance in which the first classification comprises a category that contains two or more sub-categories.

In some embodiments, the computer-executable program code instructions for determining total demand further comprise program code instructions for identifying a benchmark conversion rate, comparing the real time demand to the benchmark conversion rate to set a modified real time demand that identifies a quantity of units that would have been purchased had the units been available, identifying an actual purchase quantity, and modifying the real time demand, wherein the real time demand is equal to the actual purchase quantity subtracted from the modified real time demand.

In some embodiments, the computer-executable program code instructions further comprise program code instructions for adjusting the total demand as a function of one or more external factors.

In some embodiments, the computer-executable program code instructions further comprise program code instructions for generating a ranked user list for each of the one or more users comprising each of the one or more virtual offers and an associated calculated probability, assigning a voting value to each of the one or more virtual offers on each ranked user list, and generating a single list ranking each of the one or more virtual offers by adding the voting value each of the one or more virtual offers received on each ranked user list.

In some embodiments, the determining of the estimated number of units to be sold for is only for a predetermined number of virtual offers, and is based on the ranking of each of the one or more virtual offers on the single list.

In some embodiments, the computer-executable program code instructions for the selecting of the one or more virtual offers further comprise program code instructions for calculating a projected revenue value for each virtual offer based on prior performance data per unit and the estimated number of units to be sold, ranking the one or more virtual offers by the projected revenue, and selecting one or more virtual offers to include in the forecasted demand based on the ranking of each of the one or more virtual offers by revenue and a pre-selected portfolio mix.

In some embodiments, the one or more external factors includes at least a seasonality component. In some embodiments, a virtual offer comprises at least price data, one product category or one service category, and location data. In some embodiments, the voting value is derived from a position of the one or more virtual offers on the ranked lists generated for each of the one or more users, wherein at least a predetermined number of virtual offers on each ranked list are assigned a first voting value. In some embodiments, the pre-selected portfolio mix comprises at least one of a category mix, a price mix, or location constraints. In some embodiments, one or more combinations of category or sub-category, location and price range are generated for a specified time period.

In some embodiments, an apparatus may be provided comprising at least one processor and at least one memory including computer program code, the at least one memory and the computer program code configured to, with the processor, cause the apparatus to at least generate a virtual promotion, wherein the virtual promotion comprises a combination of a category or sub-category, a location, and a price range, calculate a probability that a particular consumer would buy the virtual offer in a predetermined time period, wherein the probability is generated at least based on historical data related to the particular consumer and one or more related consumers, determine an estimated number of units to be sold for the virtual offer as a function of at least the probability, the estimated number of units representing a predicted demand, calculate a real time demand, wherein the real time demand is generated based on a plurality of generated identification pairs for the predetermined time period, and determine, using a processor, total demand by summing the predicted demand and the real time demand.

In some embodiments, the at least one memory and the computer program code for calculating the real time demand are further configured to, with the processor, cause the apparatus to access user search data, the user search data generated by a user interacting with a promotion and marketing service to identify a requested promotion, determine a first classification of the user search data by parsing the user search data into one or more terms, apply one or more terms within the user search data to a search index, wherein the first classification is configured to generate a mapping from the one or more terms within the user search data to at least one of a service or merchant, determine a second classification of the user search data, wherein the second classification identifies a requested redemption location for the requested promotion, and generate the identification pair for the search data that is representative of a promotion tuple, the identification pair comprising the first classification and the second classification.

In some embodiments, the at least one memory and the computer program code are further configured to, with the processor, cause the apparatus to distribute the real time demand across one or more predetermined price points. In some embodiments, the at least one memory and the computer program code are further configured to, with the processor, cause the apparatus to distribute the real time demand across a plurality of hyper-local regions in an instance in which the second classification comprises a region that contains two or more hyper-local regions. In some embodiments, the at least one memory and the computer program code are further configured to, with the processor, cause the apparatus to distribute the real time demand across a plurality of sub-categories in an instance in which the first classification comprises a category that contains two or more sub-categories.

In some embodiments, the at least one memory and the computer program code for determining total demand are further configured to, with the processor, cause the apparatus to identify a benchmark conversion rate, compare the real time demand to the benchmark conversion rate to set a modified real time demand that identifies a quantity of units that would have been purchased had the units been available, identify an actual purchase quantity, and modify the real time demand, wherein the real time demand is equal to the actual purchase quantity subtracted from the modified real time demand.

In some embodiments, the at least one memory and the computer program code are further configured to, with the processor, cause the apparatus to adjust the total demand as a function of one or more external factors. In some embodiments, the at least one memory and the computer program code are further configured to, with the processor, cause the apparatus to generate a ranked user list for each of the one or more users comprising each of the one or more virtual offers and an associated calculated probability, assign a voting value to each of the one or more virtual offers on each ranked user list, and generate a single list ranking each of the one or more virtual offers by adding the voting value each of the one or more virtual offers received on each ranked user list.

In some embodiments, the determining of the estimated number of units to be sold for is only for a predetermined number of virtual offers, and is based on the ranking of each of the one or more virtual offers on the single list. In some embodiments, the at least one memory and the computer program code for selecting of the one or more virtual offers are further configured to, with the processor, cause the apparatus to calculate a projected revenue value for each virtual offer based on prior performance data per unit and the estimated number of units to be sold, rank the one or more virtual offers by the projected revenue, and select one or more virtual offers to include in the forecasted demand based on the ranking of each of the one or more virtual offers by revenue and a pre-selected portfolio mix.

In some embodiments, the one or more external factors includes at least a seasonality component. In some embodiments, a virtual offer comprises at least price data, one product category or one service category, and location data. In some embodiments, the voting value is derived from a position of the one or more virtual offers on the ranked lists generated for each of the one or more users, wherein at least a predetermined number of virtual offers on each ranked list are assigned a first voting value. In some embodiments, the pre-selected portfolio mix comprises at least one of a category mix, a price mix, or location constraints. In some embodiments, one or more combinations of category or sub-category, location and price range are generated for a specified time period.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

FIG. 1 is a flowchart showing an exemplary process for facilitating sales pipeline automation;

FIG. 2*a* shows a schematic block diagram of circuitry that can be included in a computing device in accordance with some embodiments discussed herein;

FIG. 2*b* shows a schematic block diagram of circuitry that can be included in a computing device in accordance with some embodiments discussed herein;

FIG. 2*c* shows a schematic block diagram of circuitry that can be included in a computing device in accordance with some embodiments discussed herein;

Figure 6A:
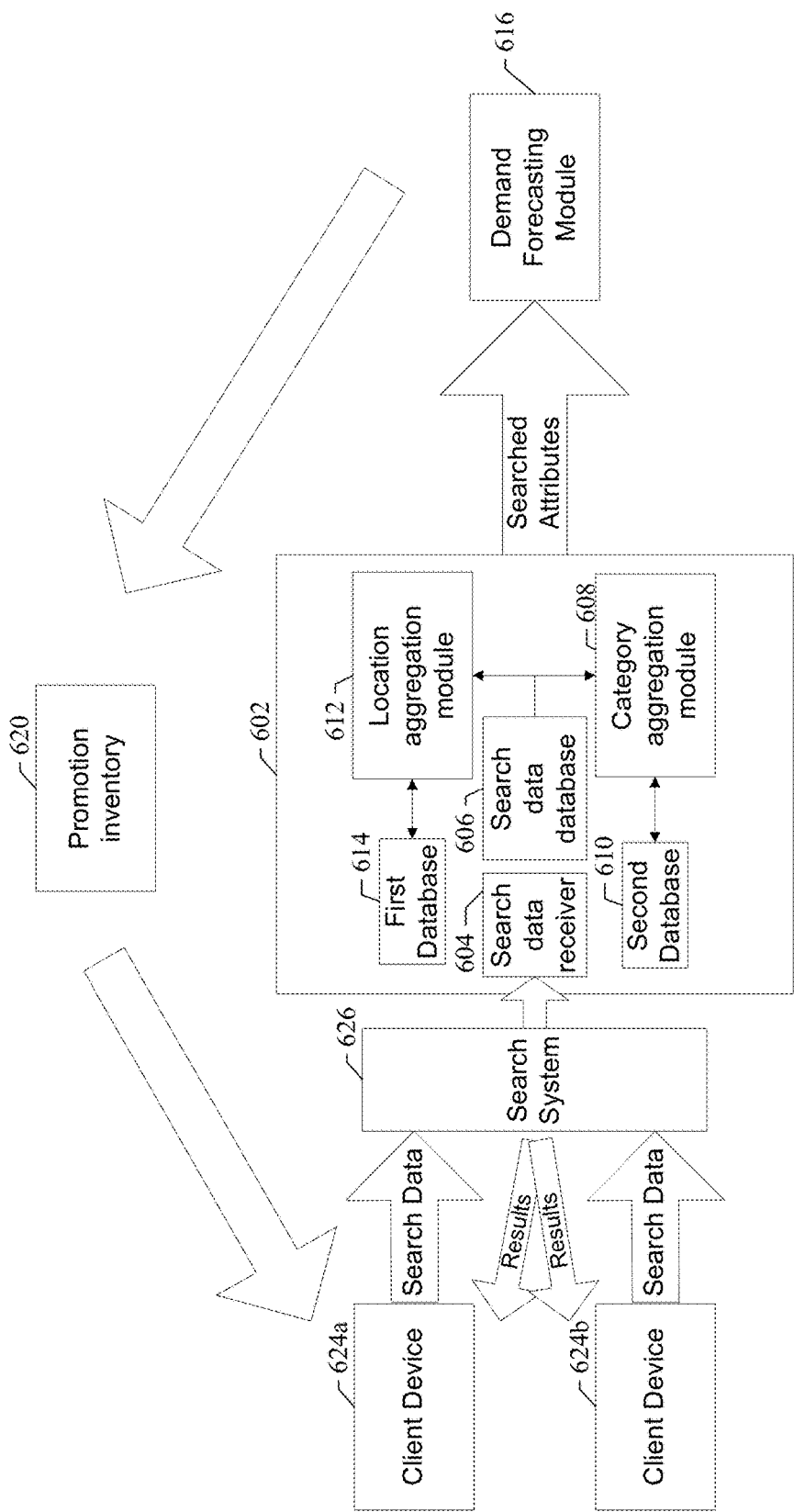
FIG. 6A is a block diagram showing exemplary search feedback system for receiving consumer search data and providing searched attributes associated with a location (e.g., location specific data) and/or with a category (e.g., category specific data)
Figure 6B:
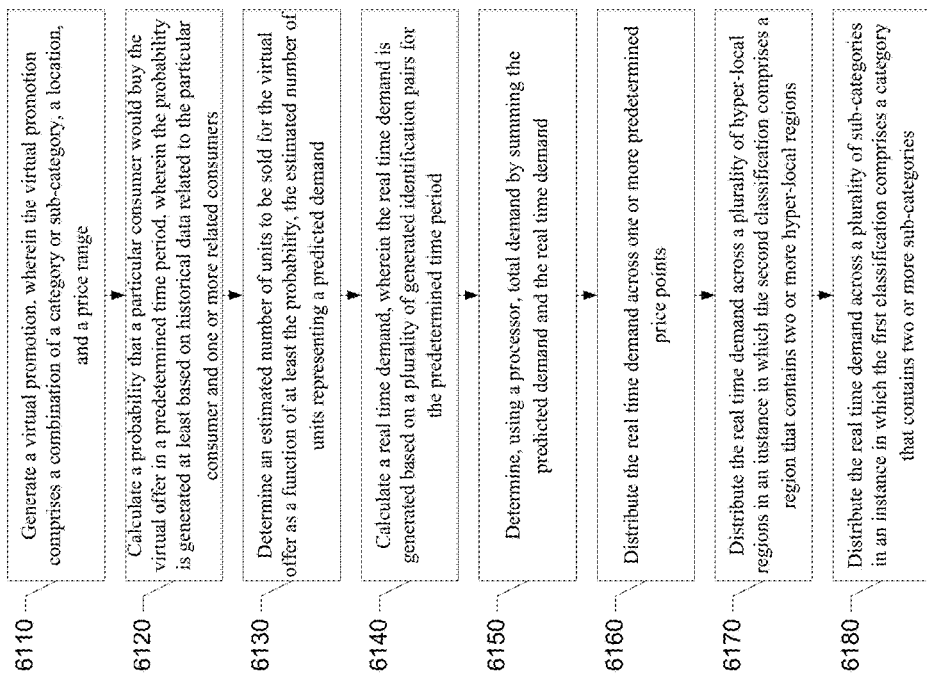
Figure 6C:
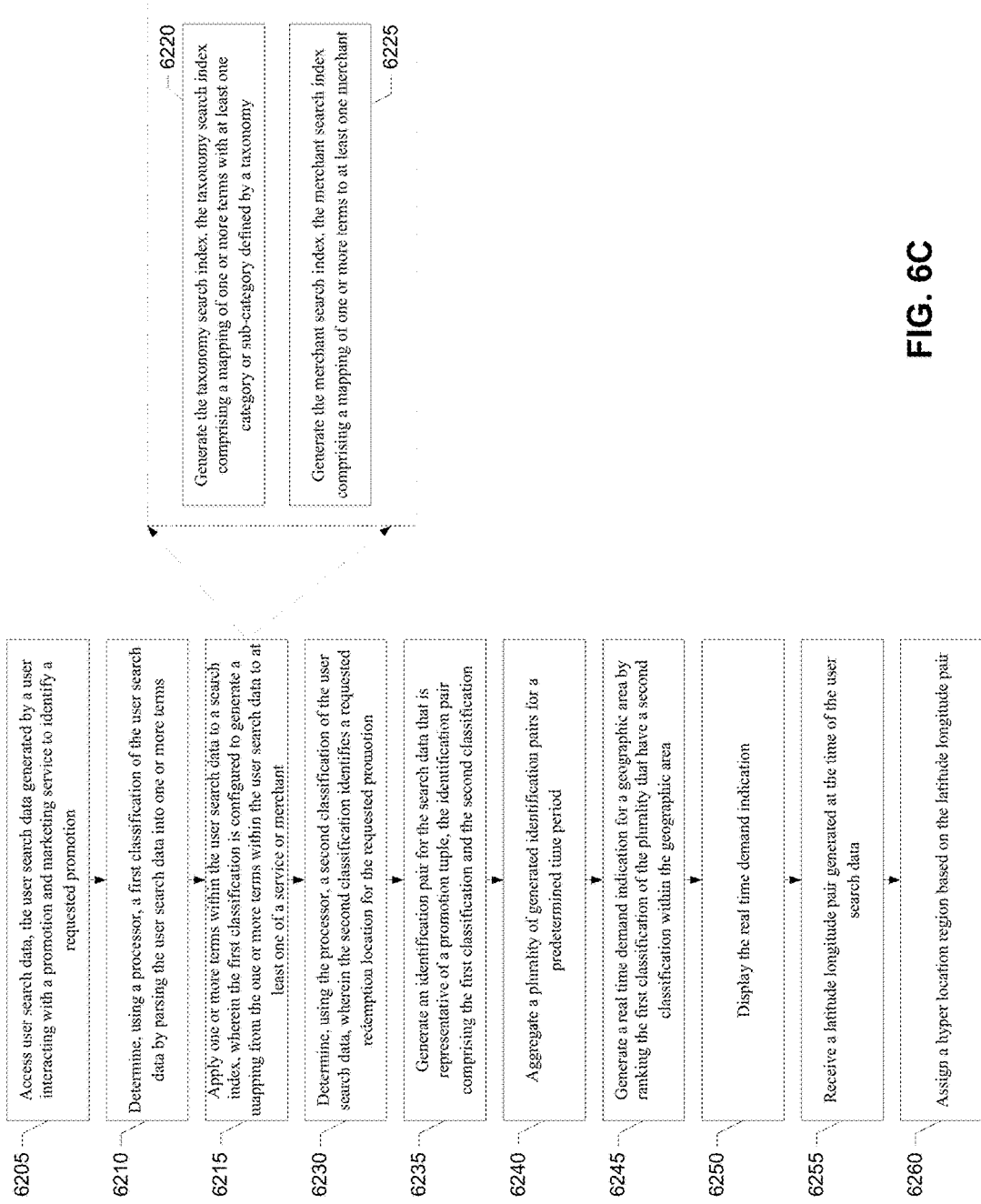
Figures 6D, 6E:
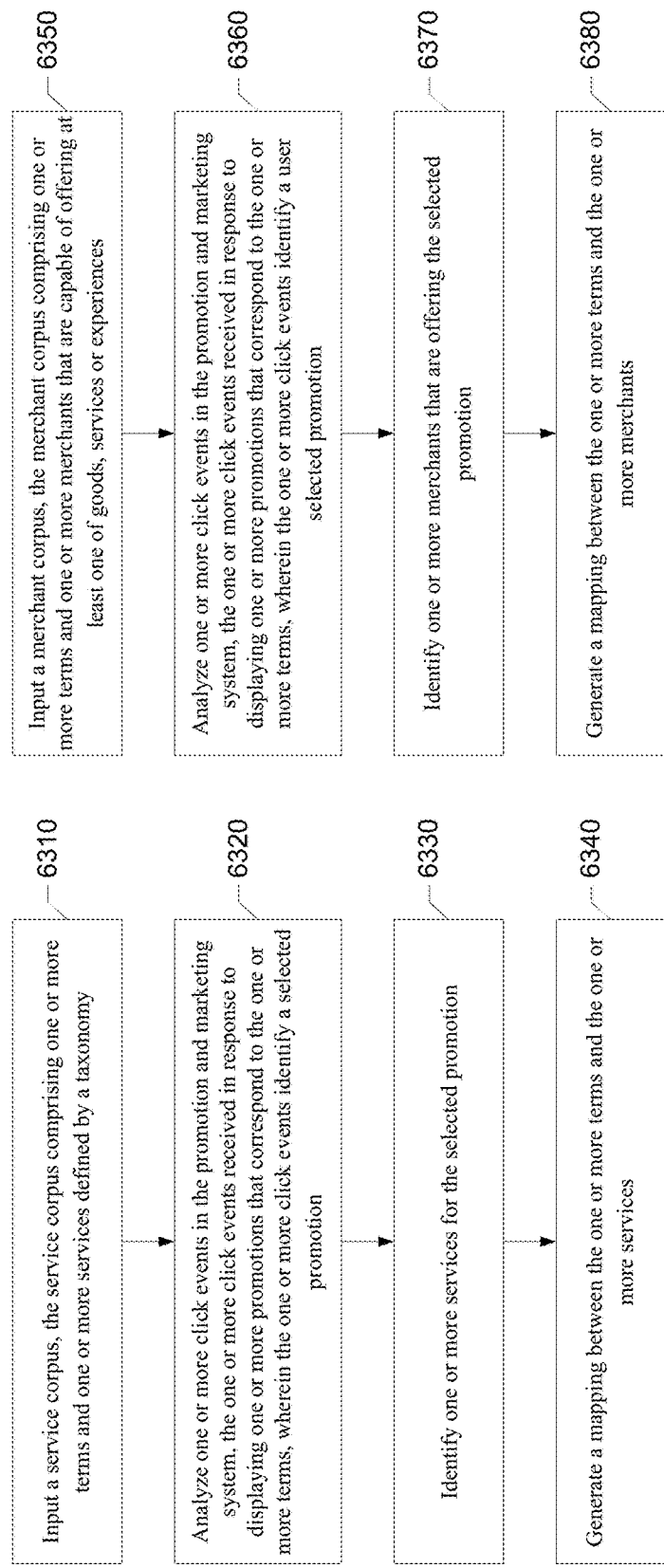
Figure 6F:
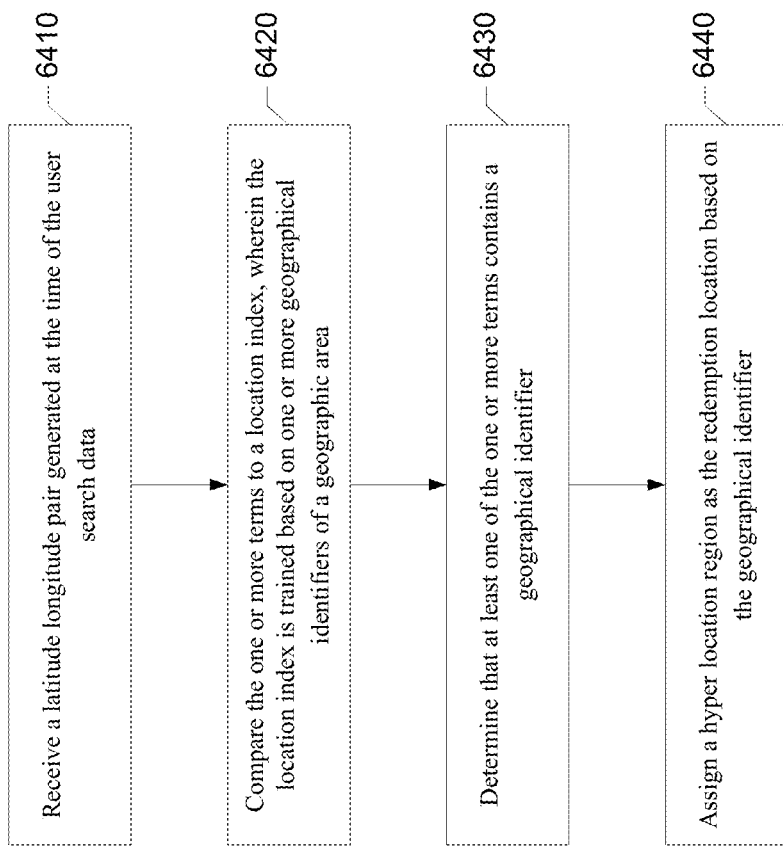
Figure 6G:
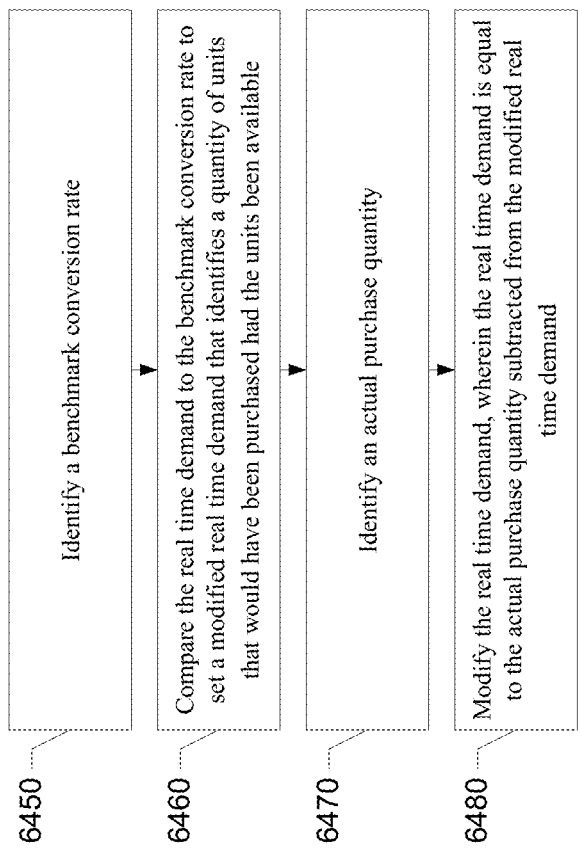
Figure 6H:
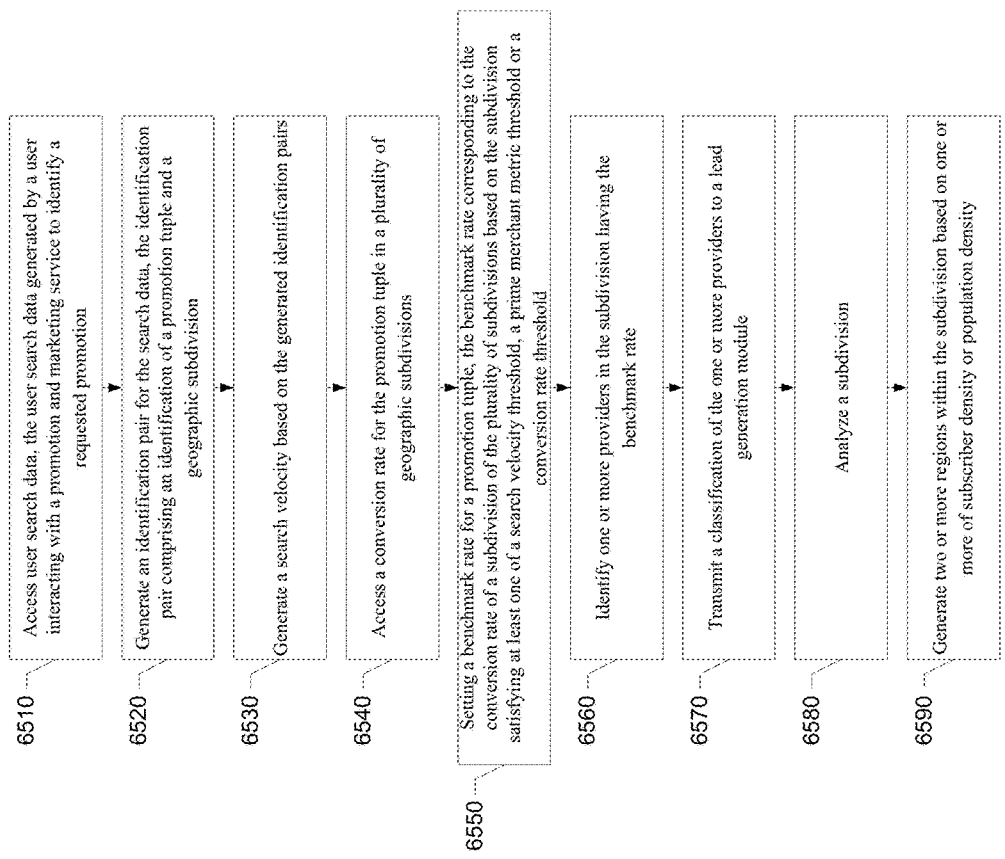
Figure 6I:
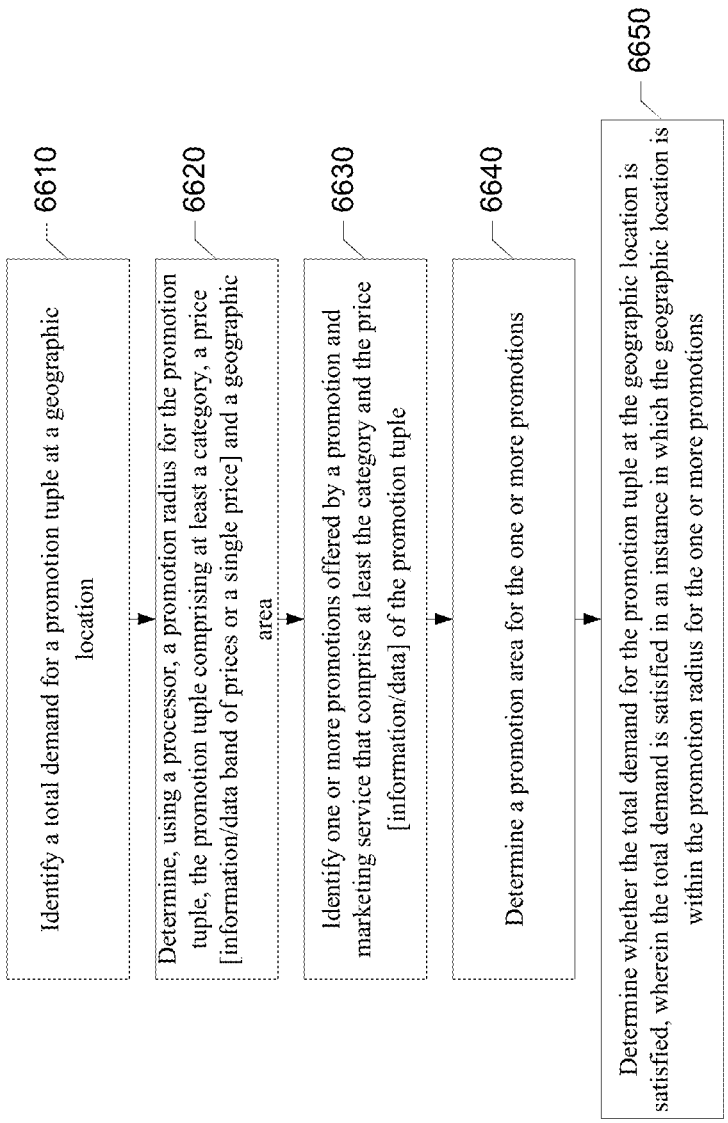
Figure 6J:
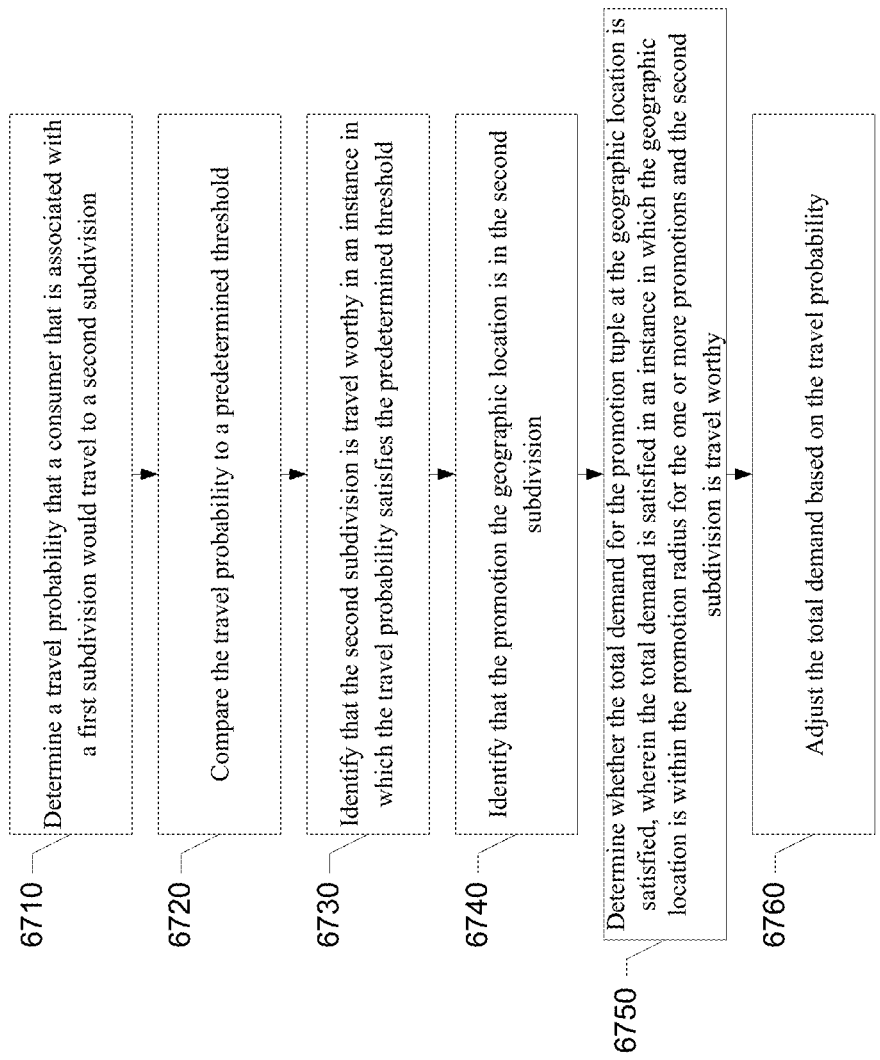
Figure 6K:
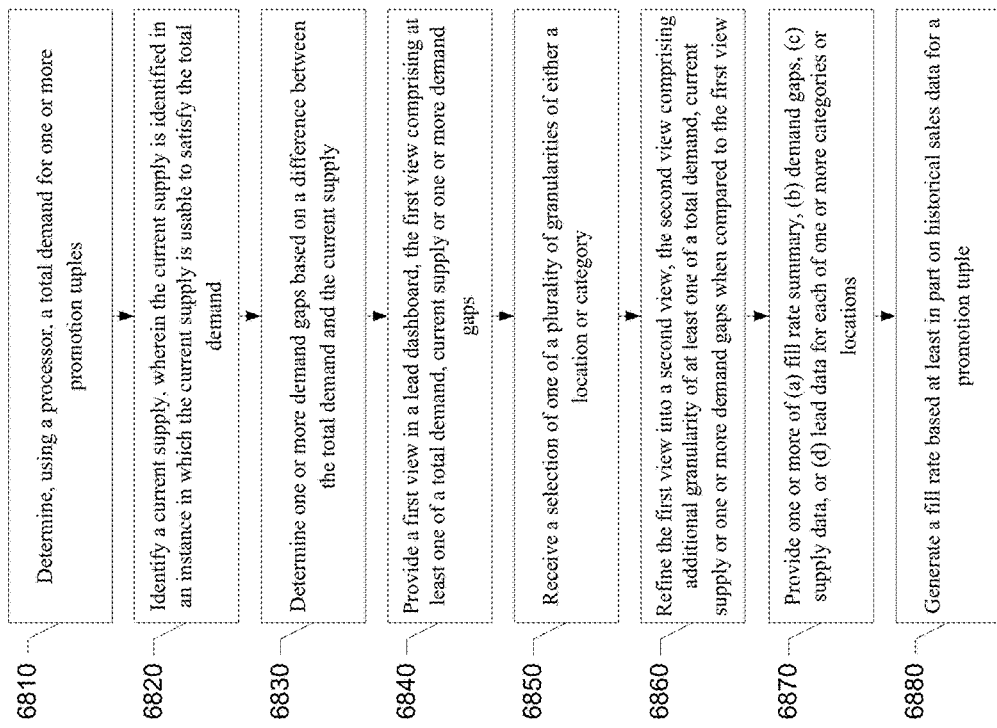
Figure 6L:
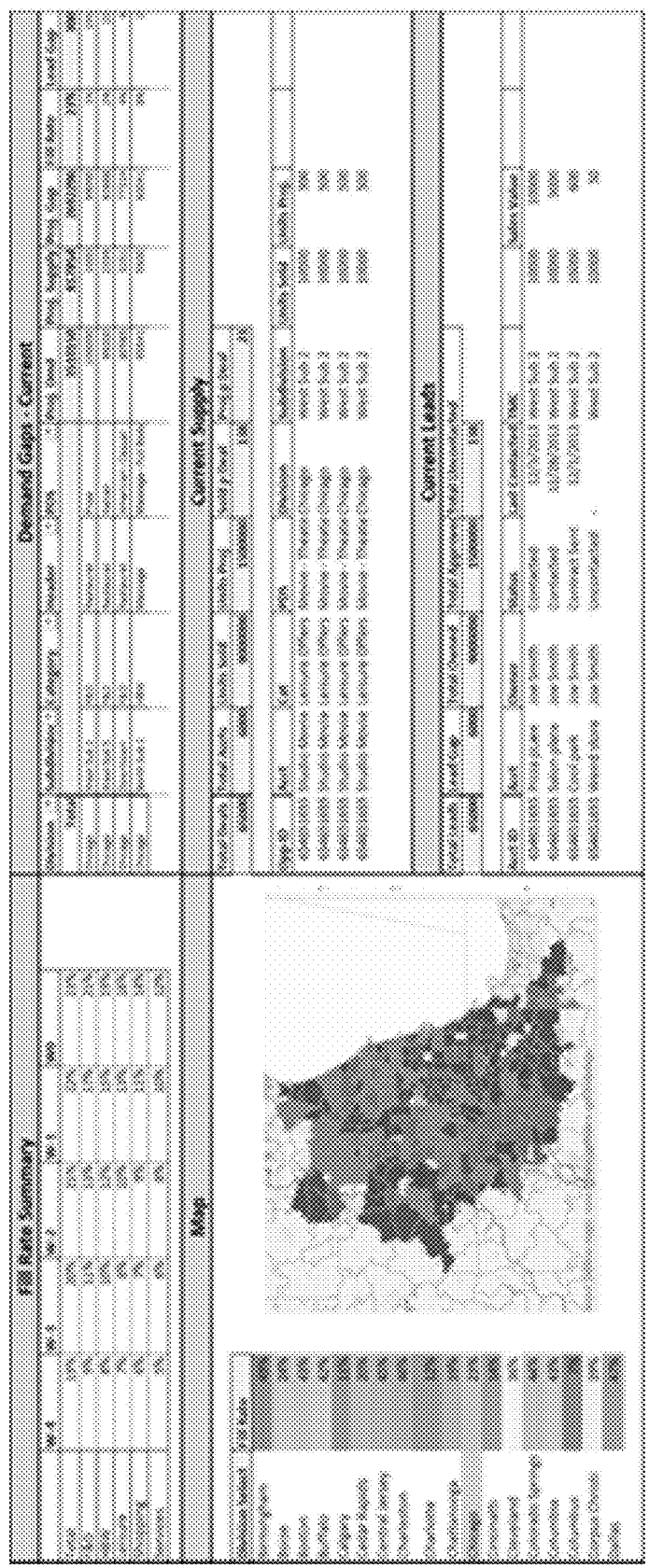
Figure 7:
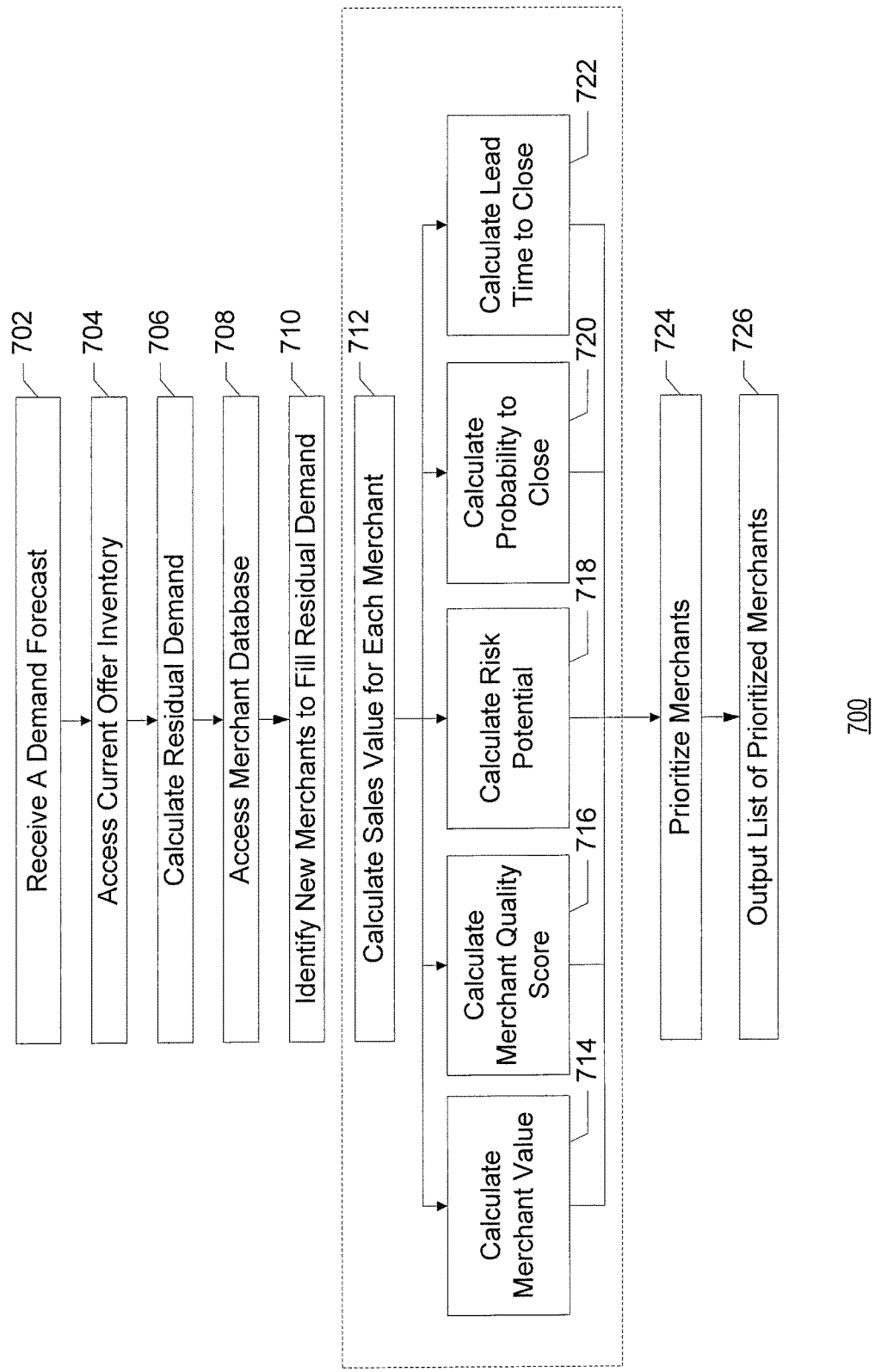
Figure 8:
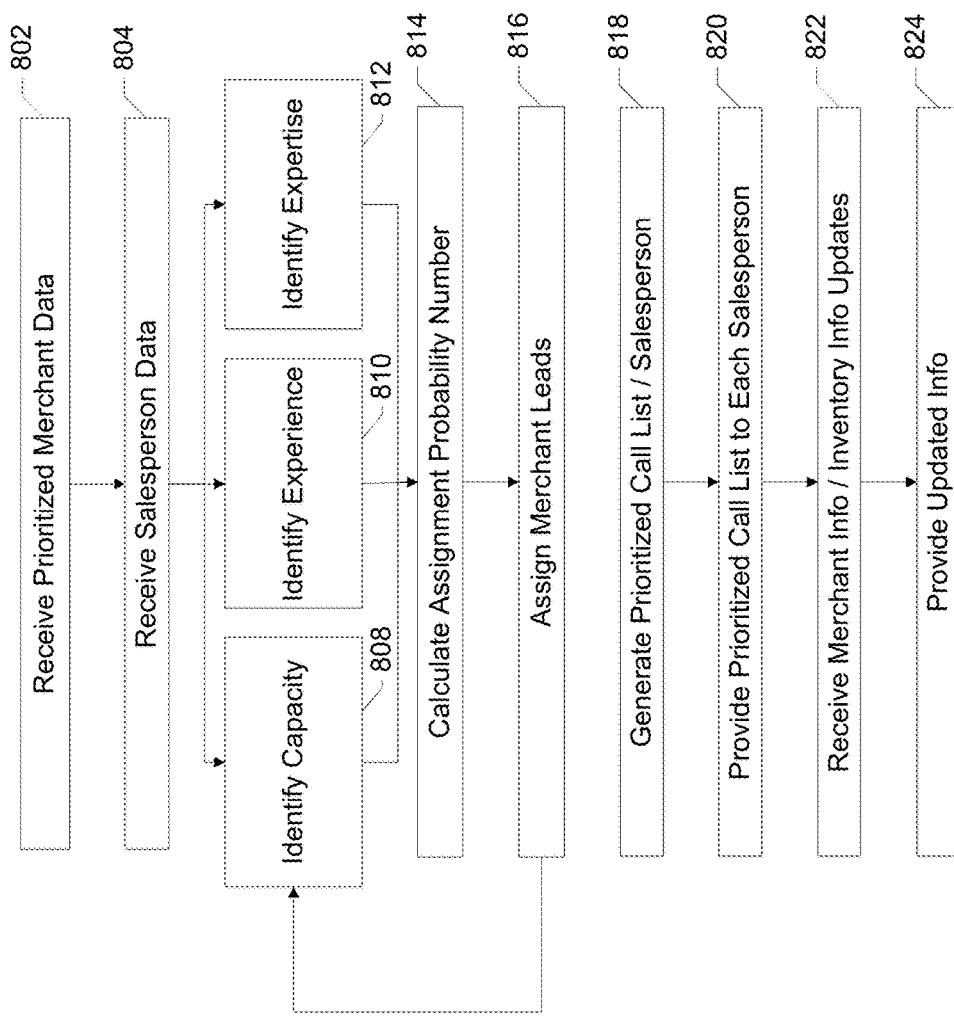
Figure 10:
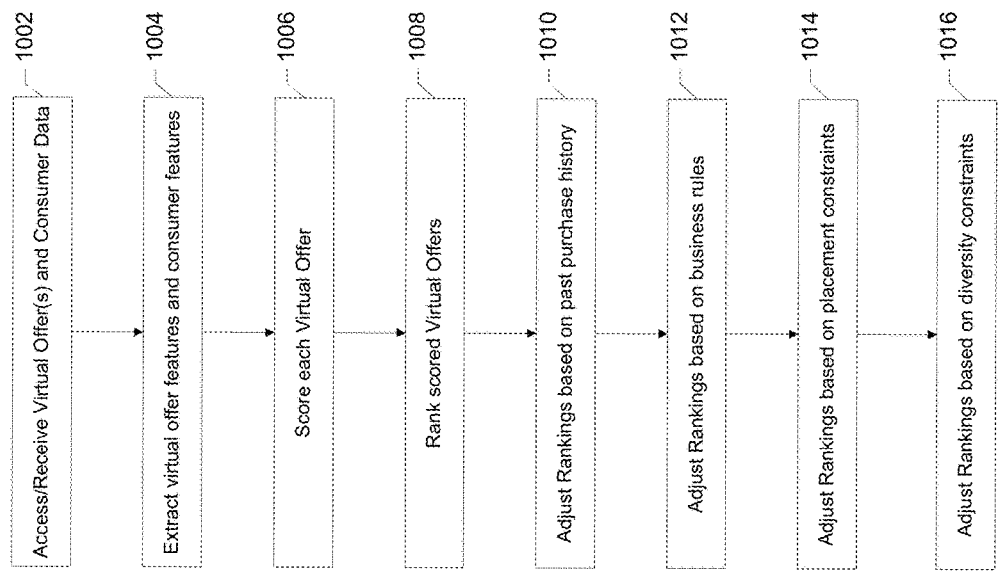
Figure 11:
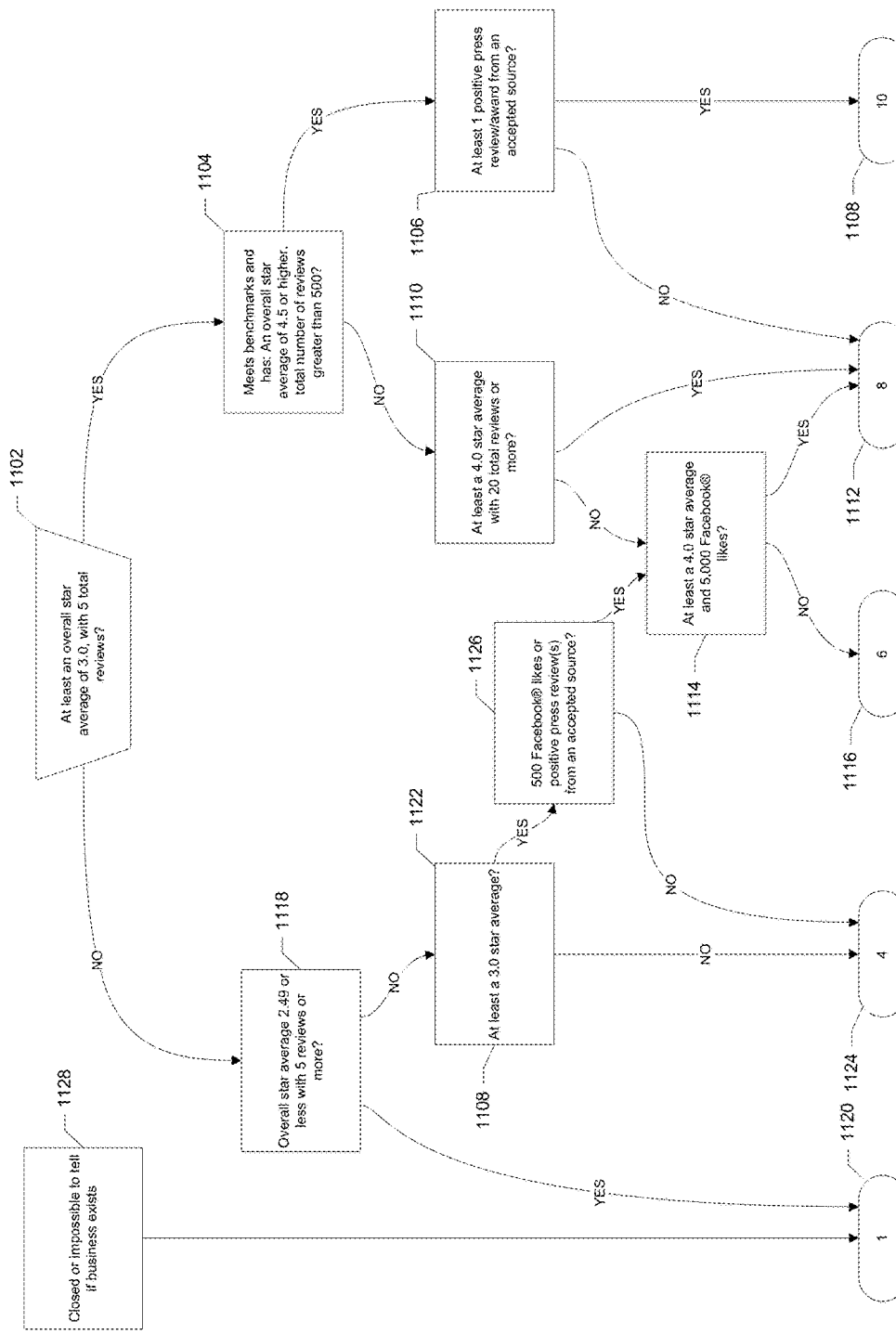
Figure 12:
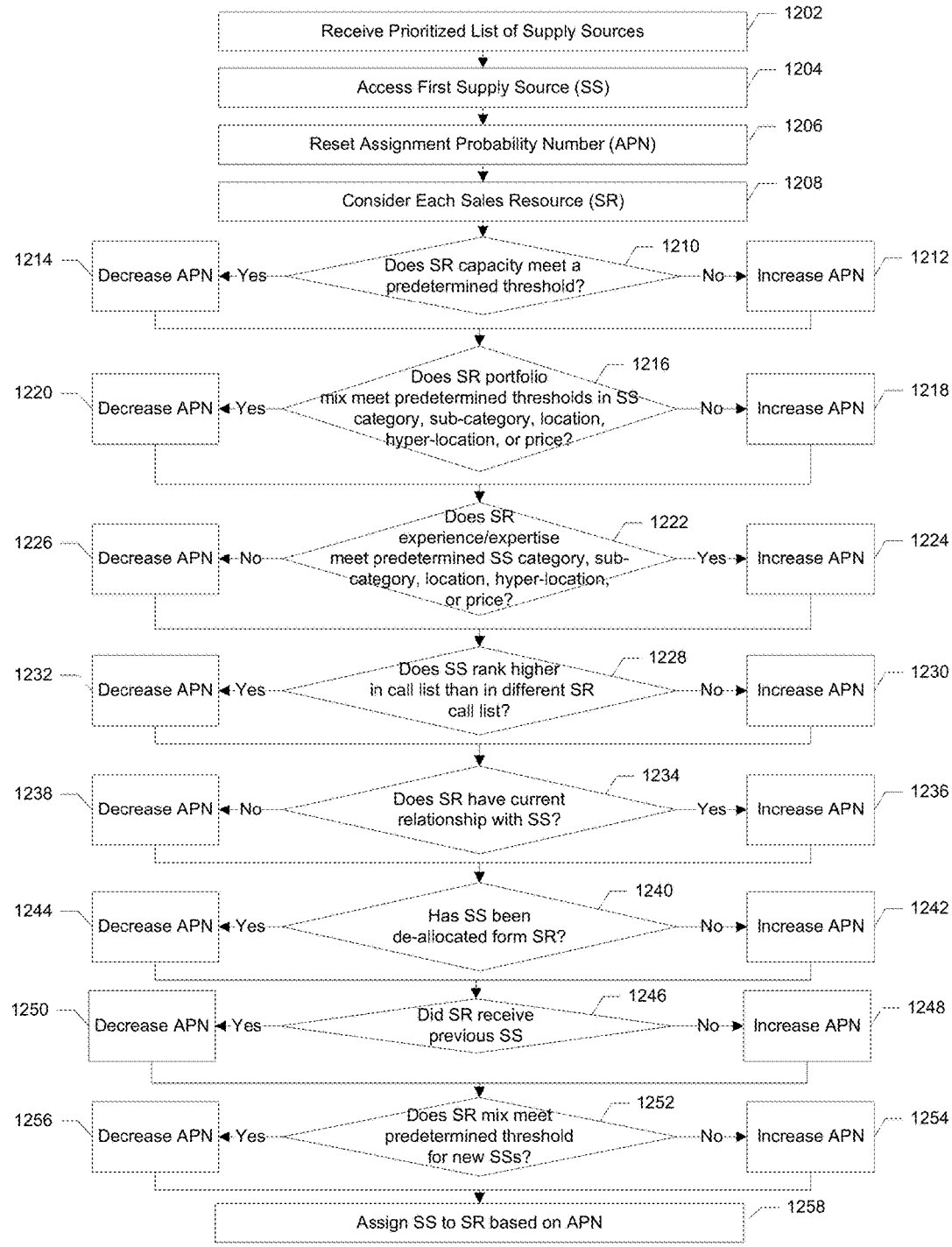
Figure 13:
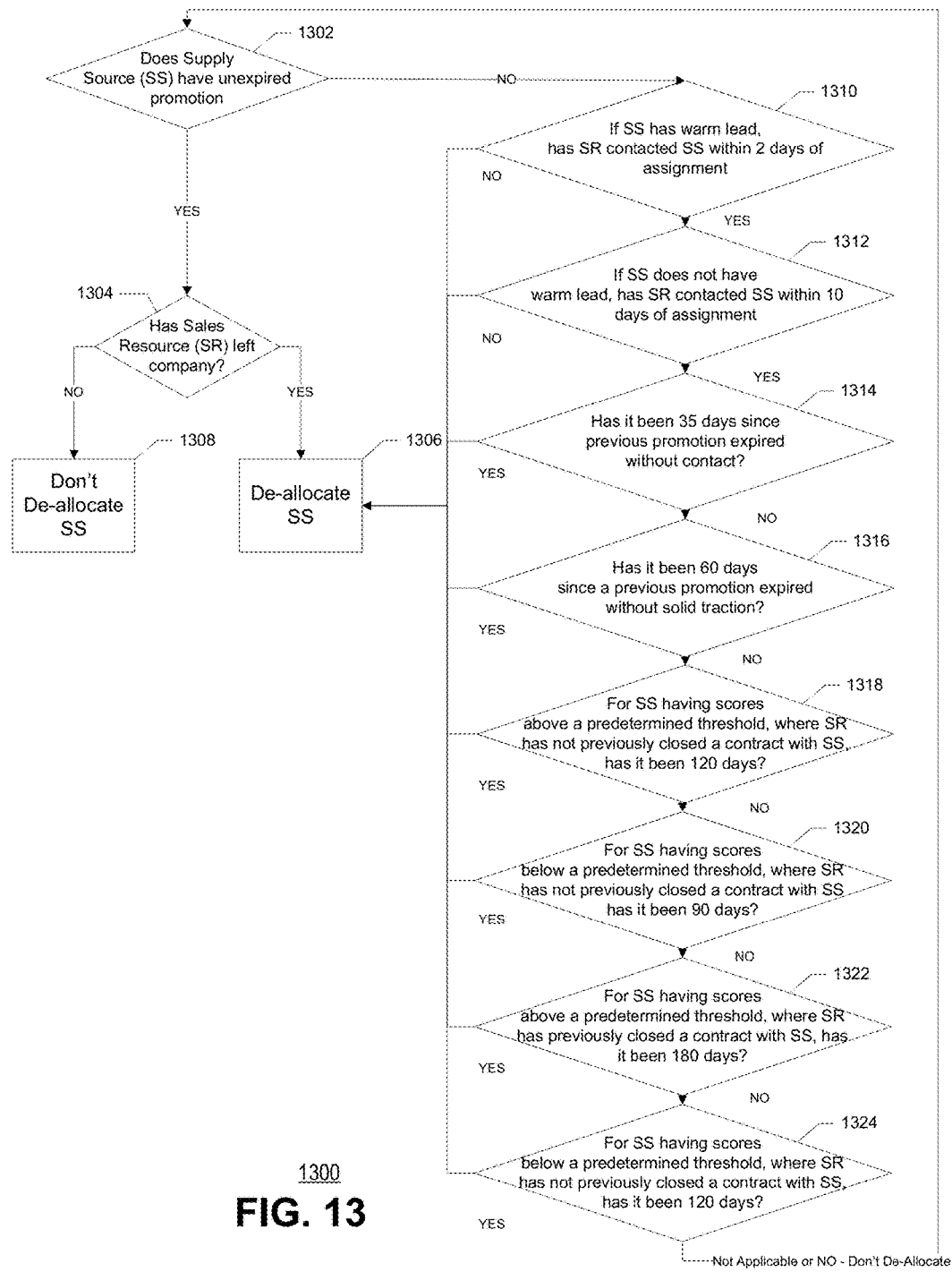
Figure 14:
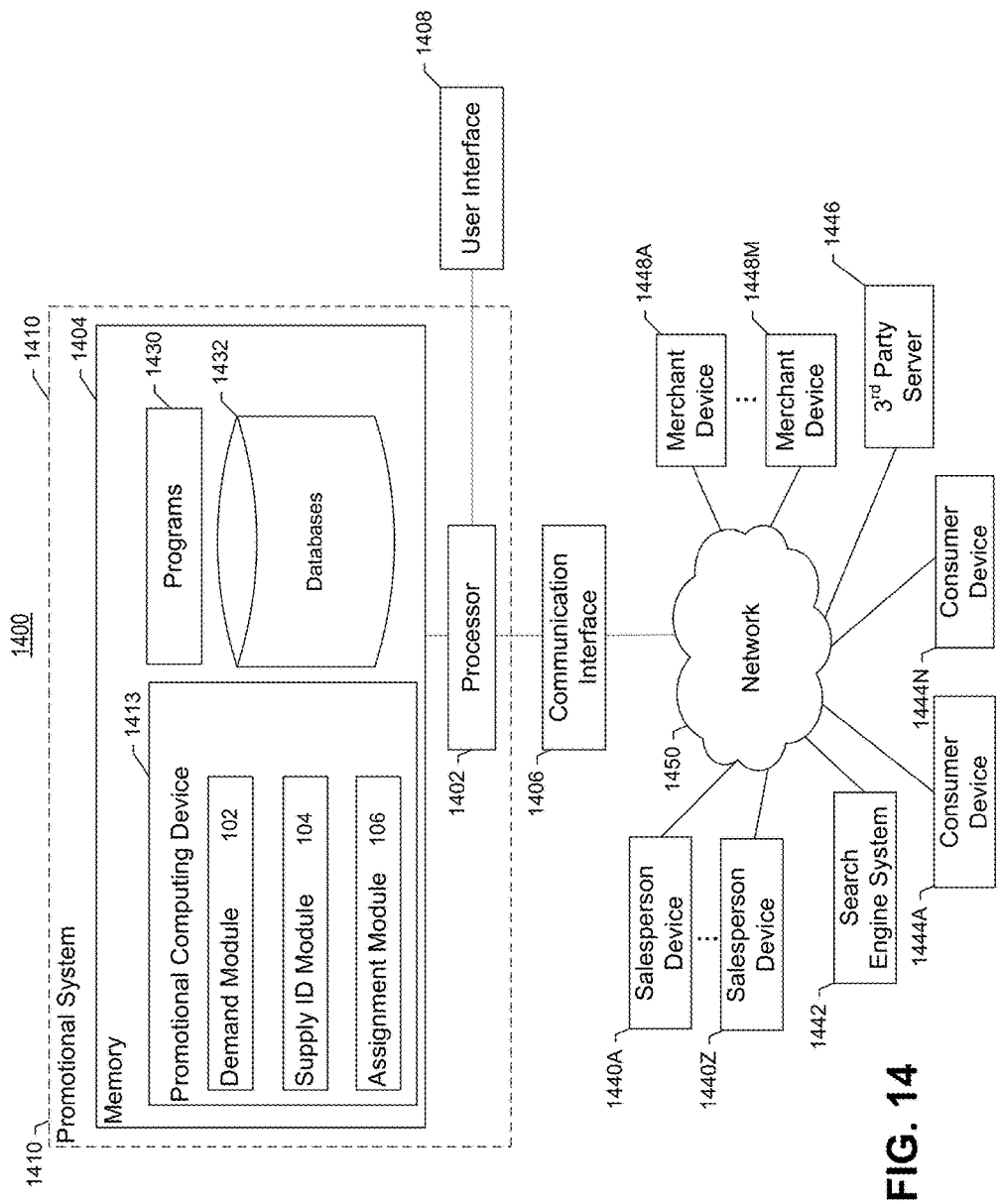

FIG. 6B then shows an example method, namely process 650, that may be executed by one or more machines (some examples of which are discussed in connection with FIGS. 1, 2a, and/or 3) for generating demand based on real time demand and predicted demand;

FIG. 6C then shows an example method, namely process 650, that may be executed by one or more machines (some examples of which are discussed in connection with FIGS. 1, 2a, and/or 3) for utilizing consumer search data for generating a real time demand indication, in accordance with some embodiments discussed herein;

FIGS. 6D and 6E show example methods that may be executed by one or more machines (some examples of which are discussed in connection with FIGS. 1, 2a, and/or 3) for utilizing a search index, and in particular a taxonomy search index and a merchant search index, respectively, in accordance with some embodiments discussed herein;

FIG. 6F shows an example method that may be executed by one or more machines (some examples of which are discussed in connection with FIGS. 1, 2a, and/or 3) for assigning a hyper location using a latitude longitude pair generated at the time of user search data, in accordance with some embodiments discussed herein;

FIG. 6G shows an example method that may be executed by one or more machines (some examples of which are discussed in connection with FIGS. 1, 2a, and/or 3) for modifying the real time demand in accordance with a conversion rate, in accordance with some embodiments discussed herein;

FIG. 6H shows an example method that may be executed by one or more machines (some examples of which are discussed in connection with FIGS. 1, 2a, and/or 3) for determining the conversion rate, in accordance with some embodiments discussed herein;

FIG. 6I shows an example method that may be executed by one or more machines (some examples of which are discussed in connection with FIGS. 1, 2a, and/or 3) for identifying whether there is sufficient inventory to meet existing demand;

FIG. 6J shows an example method that may be executed by one or more machines (some examples of which are discussed in connection with FIGS. 1, 2a, and/or 3) for determining the promotion area for the one or more promotions;

FIG. 6K shows an example method that may be executed by one or more machines (some examples of which are discussed in connection with FIGS. 1, 2a, and/or 3) for providing a dashboard;

FIG. 6L shows an exemplary screenshot of the dashboard, in accordance with some embodiments discussed herein;

FIG. 7 shows a flow chart showing an exemplary process of facilitating Quantum Lead that includes identifying new supply in accordance with some embodiments discussed herein;

FIG. 8 shows a flow chart showing an exemplary process of facilitating Quantum Lead that includes assigning leads in accordance with some embodiments discussed herein;

FIG. 9 shows an exemplary screenshot of a prioritized call list;

FIG. 10 shows a flowchart showing an exemplary process for calculating a probability that a consumer may buy a particular virtual offer and generating a ranked list of virtual offers, in accordance with some embodiments discussed herein;

FIG. 11 shows a flowchart showing an exemplary process for calculating a supply source quality score, in accordance with some embodiments discussed herein;

FIG. 12 shows a flowchart showing an exemplary process for calculating an assignment probability number for each of one or more sales resources, in accordance with some embodiments discussed herein;

FIG. 13 shows a flowchart showing an exemplary process for determining whether and when to de-allocate a supply source from a sales resource, in accordance with some embodiments discussed herein; and FIG. 14 shows a schematic block diagram of circuitry that can be included in a computing device in accordance with some embodiments discussed herein.

DETAILED DESCRIPTION

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

Definitions

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

In some embodiments, a host system may be implemented as a promotional system to offer promotions to a consumer. A promotion and marketing service may utilize a host system, such as a promotional system, to offer such promotions. A "promotion and marketing service" may provide promotion and/or marketing services on behalf of one or more providers (e.g., one or more merchants, retailers, etc.) that are offering one or more instruments that are redeemable for goods, services, experiences and/or the like. The promotion and marketing service is further configured to illustrate or otherwise inform one or more consumers of the availability of one or more instruments in the form of one or more impressions. In some examples, the promotion and marketing service may also take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

A "promotion" may be a deal purchased by a consumer from a promotional system, and may be considered an agreement for a particular provider to provide a service or good (e.g., a discounted service or good) to the consumer. A promotion may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion may be a deal offer whereby a running shoes company or intermediary (e.g., promotion provider) offers $50 of value toward the purchase of running shoes in exchange for $25. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. For example, and using the running shoes company promotion as an example, the accepted value is $25 and the promotional value is $50. In this example, the residual value may be equal to the accepted value.

An "instrument" associated with a promotion may include, but is not limited to, any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as an accepted value, a promotional value and/or a residual value. For example, using the aforementioned running shoes company as the example provider, an electronic indication in a mobile application that shows $50 of value to spend at the running shoes company. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

A "provider" may be considered a merchant, retailer, or other provider of goods or services that offers a promotion, as agreed upon with the promotion and marketing service affiliated with the promotional system. A provider may include, but is not limited to, a merchant, business owner, consigner, shopkeeper, tradesperson, vender, operator, entrepreneur, agent, dealer, retailer, organization or the like that is in the business of a providing a good, service or experience to a consumer, facilitating the provision of a good, service or experience to a consumer and/or otherwise operating in the stream of commerce. For example, a provider may take the form of a running shoes company that sells attire that is generally used by a person who runs or participates in athletic activities.

An "impression" may be considered a communication advertising an offer to purchase a promotion from a promotional system. An impression may include a communication, a display, or other perceived indication, such as a flyer, print media, e-mail, text message, application alert, mobile applications, other type of electronic interface or distribution channel and/or the like, of one or more promotions. For example, and using the aforementioned running company as the example provider, an e-mail communication sent to consumers that indicates the availability of a $25 for $50 toward running shoes promotion.

Impressions are therefore provided to "consumers," including, but not limited to, a client, customer, purchaser, shopper, user of the promotional system or the like who may be in the position to or does exchange value for one or more instruments under the terms defined by the one or promotions. For example, and using the aforementioned running shoes company as the example provider, an individual who is interested in purchasing running shoes. A "consumer" may be identified by one or more profiles, or sub-profiles, where each profile or sub-profile includes one or more consumer attribute that describes the consumer. Consumer attributes may include, but are not limited to, the consumer's name, consumer's age, consumer's location (e.g., "home", "work", or other visited places such as future vacation locations, cities that friends and/or family live in locations, business trip locations and the like), consumer's gender, consumer's tenure using the promotion system, consumer's email domain, consumer's IP address, consumer's occupation, consumer's educational background, consumer's previously accepted and/or rejected promotion program offerings, consumer's gender and the like. The consumer attributes may be inputted into the consumer's profile by the consumer, or collected by components within the promotion system 100 and inputted into the consumer's profile.

"Forecasting demand" may include or otherwise enable a prediction of those offers that a consumer (e.g., a client, customer, purchaser, shopper, user or the like who may be in the position to or does exchange value for one or more offers) will likely purchase, if offered, and, as such, enables the prioritization of promotions associated with such offers. Forecasting demand may further facilitate the prediction of those promotions or associated offers which may result in greater interest, revenue, higher margin, offer diversity and/or the like.

A "virtual offer" may be an offer that is constructed, for example, by a computer algorithm, but may not be offered for sale by a seller nor offered to a consumer. A virtual offer, in some embodiments, may include a category and/or a sub-category, (e.g., massage as a category and/or shoulder massage as a sub-category. The offer may further include a location and/or a hyper-local region (e.g., a location of Chicago, Ill. and/or hyper-local region of Wrigleyville). The virtual offer may further include a type of offer (e.g., two for one).

A "forecasted demand", which may be referred alternatively as a demand forecast or a projected demand, may be calculated by calculating a probability that a particular user would buy a particular offer in a particular time frame for at least a portion of a plurality of users and for at least of a portion of the one or more virtual offers. An estimated number of units to be sold may then be determined, or projected, for at least a portion of the one or more virtual offers as a function of at least the probability associated with each of the one or more virtual offers. The probability may be based on associated consumer data related to, for example, at least one of a location, a gender, prior purchase history, personalization signals, seasonality or any combination thereof and by simulating a plurality of virtual offers in a plurality of hyper-local regions, using for example a virtual offer construction algorithm, and applying the associated consumer data to the virtual offers. The output, forecasted demand, may comprise at least one or more virtual offers and a demanded quantity of at least a portion of the one or more virtual offers.

"Adjusted Demand" is the forecasted demand adjusted based on external factors (e.g., seasonality etc.).

Analyzing "explicit data," such as user-provided data in user profiles, preferences, and/or promotion purchase history, for example, may allow the promotional system to better target promotion types or impressions to consumers. A consumer may be more likely to purchase a promotion if the impression advertising the promotion is of interest to the consumer than if the associated promotion was selected at random.

Additionally or alternatively, accessing "implicit data," data that may be user-provided for a purpose other than for use on the promotional system and/or detected by the promotional system, may allow a promotional system to gather information on consumer behaviors, preferences and preferred locations. Example implicit data may include data indicative of a consumer's browsing and/or search history, detected location, or the consumer's social network profile information, for example.

A "client device" may be a device or module operable to access a website (e.g., perhaps using a web browser) or execute a mobile application, such as a laptop, mobile phone, tablet, personal computer, or the like. A client device may place a request, such as in response to a consumer activity facilitated by a user interface such as, without limitation, clicking a link, selecting particular text or image data, and/or inputting or entering data.

A "search" may include operations performed by a consumer or other user via a client device, wherein text, parameters, tags, or other terms are searched against one or more electronically stored documents, data entries, records, files, or the like. In some embodiments, a "search" may be performed by navigating a hierarchical data structure, such as a data structure organized by location/hyper-location or category/sub-category. In some embodiments, portions of a search string may be pre-populated (e.g., a location or hyper-location portion) by the client device or other processing circuitry. In some embodiments, a search may be performed using a single field or any array of fields.

The search may be executed by a "search system" running on the client device, which may include a search engine configured to search for information on the World Wide Web (www) or on a remote server. In some embodiments, the "search engine" may be configured to search for information hosted via a website or a web server of an application, and to provide "search results." "Search results" may be transmitted or otherwise provided for display to the consumer or other user via the client device as a list of information (e.g., list of web pages, images or the like) related to the search.

The search system may be configured such that particular promotions may be offered to consumers based on relevance determinations. For example, in U.S. patent application Ser. No. 13/829,581, which is entitled "Promotion Offering System", was filed Mar. 14, 2013, and which is hereby incorporated by reference in its entirety, algorithms are disclosed for providing consumers relevant promotions in response to consumer initiated searches.

"Consumer search data" may include one or more search terms (e.g., text, characters, etc.) that are input by consumers into an interface (e.g., one or more fields displayed by a graphical user interface) of the search system. The consumer search data is used by the search system, perhaps in connection with other data or terms (e.g., pre-populated data, categories, etc.), to execute the search. In some embodiments, consumer search data is stored with an association to consumer identification information (e.g., a consumer ID).

Consumer search data may be translated or otherwise identified by the search system as "searched attributes". "Searched attributes" may be parts of a promotion to which the consumer search data is translated or converted to. For example, if a consumer searches "Chinese restaurant", "Chinese restaurant" may be the consumer search data. Embodiments of the present invention may store a "searched attribute" for one or more of a category (e.g., "food and drink"), a sub-category (e.g., "Asian cuisine"), a deal type (e.g., "date night") or the like. In some embodiments, translation to "searched attributes" is performed in the case of misspellings (e.g., "cinese restaurant"), partial input (e.g., "Chinese rest"), or the like.

A "consumer ID" may include information or data for identifying a consumer such as, for example, a username, password, user ID, login name, sign-in name, unique name, email address, pin number, account number, identification number, IP address, and the like.

"Aggregation" refers to processes whereby data is gathered, consolidated, formatted, stored, and expressed in summary form or a common format. "Aggregation" by consumer or "consumer aggregation" may refer to gathering, consolidating, formatting, storing, and expressing data (e.g., searched attributes) associated to a particular consumer or consumer ID. For example, consumer aggregation may include accessing or expressing consumer search data or searched attributes associated with the consumer (or consumer ID) received from the search system or from a particular client device. Similarly, aggregation by location or location aggregation may refer to gathering, consolidating, formatting, storing, and expressing data (e.g., consumer search data or searched attributes) associated with a particular location (e.g., Chicago) or hyper-location (e.g., Wrigleyville neighborhood of Chicago).

"Determining relevance" may include determining which of a plurality of consumer promotions to present to a consumer. The plurality of consumer promotions may be for goods and or for services.

A "promotion tuple" may comprise at least a category, price information (e.g., a price, prices, band of prices, or the like), and information indicative of a location (e.g., a geographic area). In some embodiments, the promotion tuple may comprise price information indicative of one or more bands of prices or a single price.

An "identification pair" may be comprised of at least two searched attributes or, in some embodiments, a first classification and a second classification, the first classification identifying a category, subcategory, service or merchant, and the second classification identifying a location, sub-location, promotion area, or any geographic indication. In some embodiments, an identification pair may comprise a category (of a product, service or experience) and a location, the identification pair indicative of one or more promotions. For example, in some embodiments, the user search data may be received and a category specific data and location specific data may be extracted or otherwise identified. The location specific data and category specific data may be indicative or able to be associated with a promotion, promotion tuple in the context of calculating a real time demand, or a virtual offer in the context of forecasting a predicted demand.

Overview

The methods, apparatus and computer program products described herein are operable to automate a sales pipeline by implementing and/or otherwise executing a demand module, a supply identification module, an assignment module and/or the like. In some examples, the demand module may be configured to determine a forecasted demand for offers (e.g., any type of presented or otherwise indicated reward, discount, coupon, credit, deal, incentive, discount, media or the like that is indicative of an offered value or the like that upon purchase or acceptance results in the issuance of an instrument that may be used toward at least a portion of the purchase of particular goods, services and/or experiences defined by the offer). The forecasted demand provides or otherwise enables a prediction of those offers that a consumer (e.g., a client, customer, purchaser, shopper, user or the like who may be in the position to or does exchange value for one or more offers) will likely purchase if offered, and, as such, enables the prioritization of the sales of the forecasted or demanded offers, which may result in greater interest, revenue, higher margin, offer diversity and/or the like.

In some examples, however, one or more demanded offers may already be present in an inventory. In such examples, the method, apparatus and computer program product described herein is operable to modify or otherwise adjust the demand to account for a current inventory of offers. Other adjustments may also be performed, based on seasonality, economic conditions, geography, climate and/or the like.

Once a set of adjustments has been performed, in some example embodiments, one or more merchants (e.g., a provider, business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce) may be identified that may provide the demanded offer. Merchants that provide the same or similar goods, services or experiences may be matched or otherwise assigned to the demanded offers. As such, a merchant may be assigned zero or more virtual offers.

Using a series of ranking metrics described herein, the merchants may be ranked. In some examples, the ranking may be based on expected revenue, business objectives, sales timeline, sales probability, merchant diversity, offer diversity and/or the like. In some examples, the ranked list may provide an example ordering in which sales calls may be made.

The ranked list of merchants may then be programmatically assigned to one or more sales resources, such as a sales representative, a sales contractor, a marketing person or team, an email distribution list, a self-service tool, or the like. In some examples, the assignment may be dynamically modified based on current resources, need, diversity, probability to close, time to close, business objectives and/or the like, while in other examples an assignment may be removed in an instance in which there is no longer a demand for the particular service, good or experience provided by the particular merchant. Alternatively or additionally, each merchant or demanded offer may be assigned a value, in such cases the value may be suggestive of a bounty or reward system, such as a commission or a bonus for the sales resource.

Sales Process Automation

Figure 1:
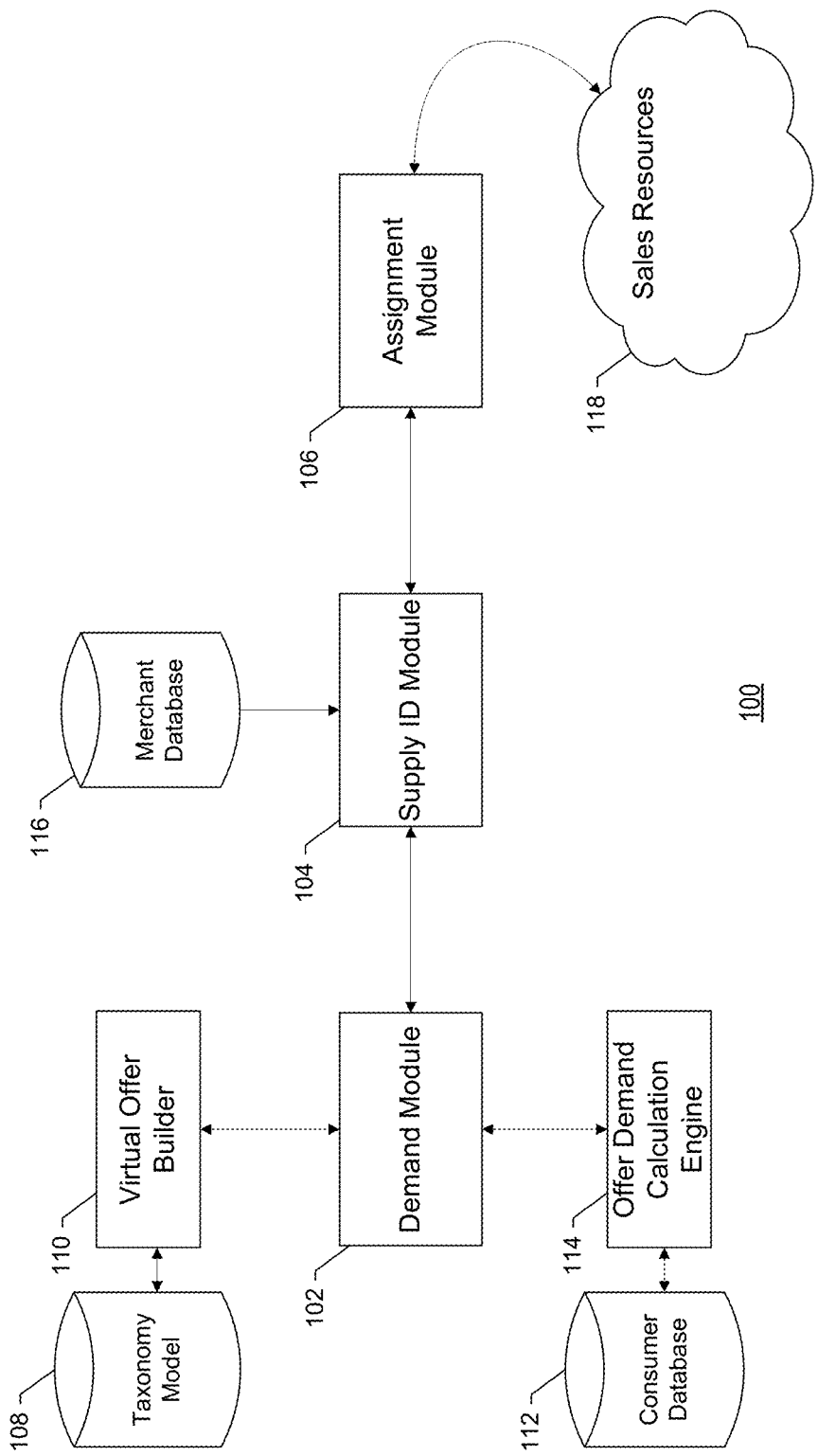

By way of further example, FIG. 1 is a block a diagram that illustrates an exemplary process for sales pipeline automation. In general, the process 100 may forecast or otherwise determine a demand via the demand module 102. The demand illustrates and/or otherwise identifies the promotions a consumer is willing to purchase in a local area (e.g., category and/or sub category of a good, service or experience, a price, a location, a time and/or the like). In some examples, the forecasted demand may be indicative of demanded promotions in the local area, however in other examples the demand may be indicative of a demanded good, service or experience in the local area irrespective of an offer.

In order to facilitate the forecasted demand, the demand module 102 is configured to generate one or more virtual offers, such as via the taxonomy model 108 and/or the virtual offer builder 110. Virtual offers are representative of one or more offers that could be offered in a local area. For example, $25 massages or $10 for $20 at a local clothing store. Additional description relating to the building the one or more offers is further described at least with respect to the virtual offer generation module 202 in FIG. 2a.

The virtual offers may then be analyzed to determine the probabilities that a particular consumer, such as a current or past subscriber, would purchase the particular virtual offer, such as via the demand calculation engine 114. The demand calculation engine 114 may be configured to generate or otherwise determine the probabilities based on for example past purchase history in a consumer database 112, historic demand for similar offers, search engine results, survey results, current market trends and/or the like. Using the probabilities (e.g., the probability that each of a plurality of consumers would buy each of a plurality of virtual offers), a forecasted demand may be generated. Additional description relating to determining the probability that a particular customer would purchase a particular offer is further described at least with respect to the probability generation module 204 in FIG. 2a.

In some example embodiments, the demand module 102 may adjust the forecasted demand based on factors, such as, but not limited to seasonality, economic conditions, holidays, weather and/or the like. Additional description relating to demand adjustment is further described at least with respect to the demand adjustment module 206 in FIG. 2a. Additionally or alternatively, with the introduction of search and browse functionality and the capture of data therefrom on a promotion and marketing service (e.g., as may be provided by the promotion system 1410 described later), demand may be inferred and real time demand may be calculated. Subsequently, the real time demand may be used in conjunction with the forecasted (or predicted demand) to determine a total demand. Additional description relating to the use of user search data in the determination of a total demand is further described in FIGS. 6A-6L. The demand module 102 is configured to output a forecasted demand to the supply ID module 104.

In some example embodiments, a supply identification (ID) module 104 is configured to ingest the forecasted demand, adjusted demand or a combination thereof. Using the forecasted demand, the supply ID module 104 is further configured to reduce or otherwise further modify the forecasted demand based on current offers in an inventory to determine a residual demand. Additional description relating to residual demand calculation is further described at least with respect to the residual demand calculation module 224 in FIG. 2b.

Using the residual demand, the supply ID module 104 is configured to assign each offer defined by the residual demand to one or more merchants in an instance in which the merchant is able to provide the same or similar goods, services and/or experiences as defined by the forecasted demand. In some examples, the one or more merchants may be determined based on a global listing of merchants stored in a merchant database. As such, to the extent the merchant provides a good, service or experience that matches or is related to a demanded offer, the demanded offer may be assigned or otherwise linked to that merchant. Each merchant may therefore be assigned zero or more demanded offers as defined by the residual demand. As such, each demanded offer may be assigned to zero or more merchants.

The supply ID module 104 may then further be configured to assign a sales value score to each of the merchants. In some examples, the sales value score may be determined according to one or more criteria, such as expected bookings, quality, risk, a time and/or probability to close a contract and/or the like. Based on the scores, the merchants may be prioritized and output to an assignment module 106. Further description of the sales value score is further described at least in sales value score calculation module 228 in FIG. 2b. Using the sales value score, the supply ID module 104 may output a ranked list of merchants to the assignment module 106.

In some example embodiments, the assignment module 106 is configured to receive a ranked list of merchants. Using the ranked list of merchants, the assignment module 106 may further be configured to assign the merchants in the ranked list of merchants to one or more sales resources. The assignment module 106 may also be configured to re-prioritize and/or re-assign merchants to sales resources according to a predetermined time period, such as daily, weekly or the like. Further description of lead assignment is further described at least with respect to lead assignment module 246 in FIG. 2c.

The assignment module 106 may also be configured to provide a prioritized sales call list for one or more sales resources. In some examples, the prioritized list may be based on a current business objective, a portfolio mix, a priority, a commission and/or the like. In some examples, the sales list may be dynamically reprioritized based on current sales, a change in business objectives, an inventory change, a demand change and/or the like. Further description of generating a prioritized sales call list is further described at least with respect to prioritized list generation module 258 in FIG. 2c.

The assignment module 106 may also be configured to provide feedback and/or updates to one or more of the demand module 102, the supply ID module 104, the assignment module 106 or the like. The feedback and/or updates may be related to a contract being closed, time to close, a number of calls, a contact person or the like. Further description of feedback and/or updates is further described at least with respect to the feedback and update module 270 in FIG. 2c.

Demand Forecasting

Figure 2A:
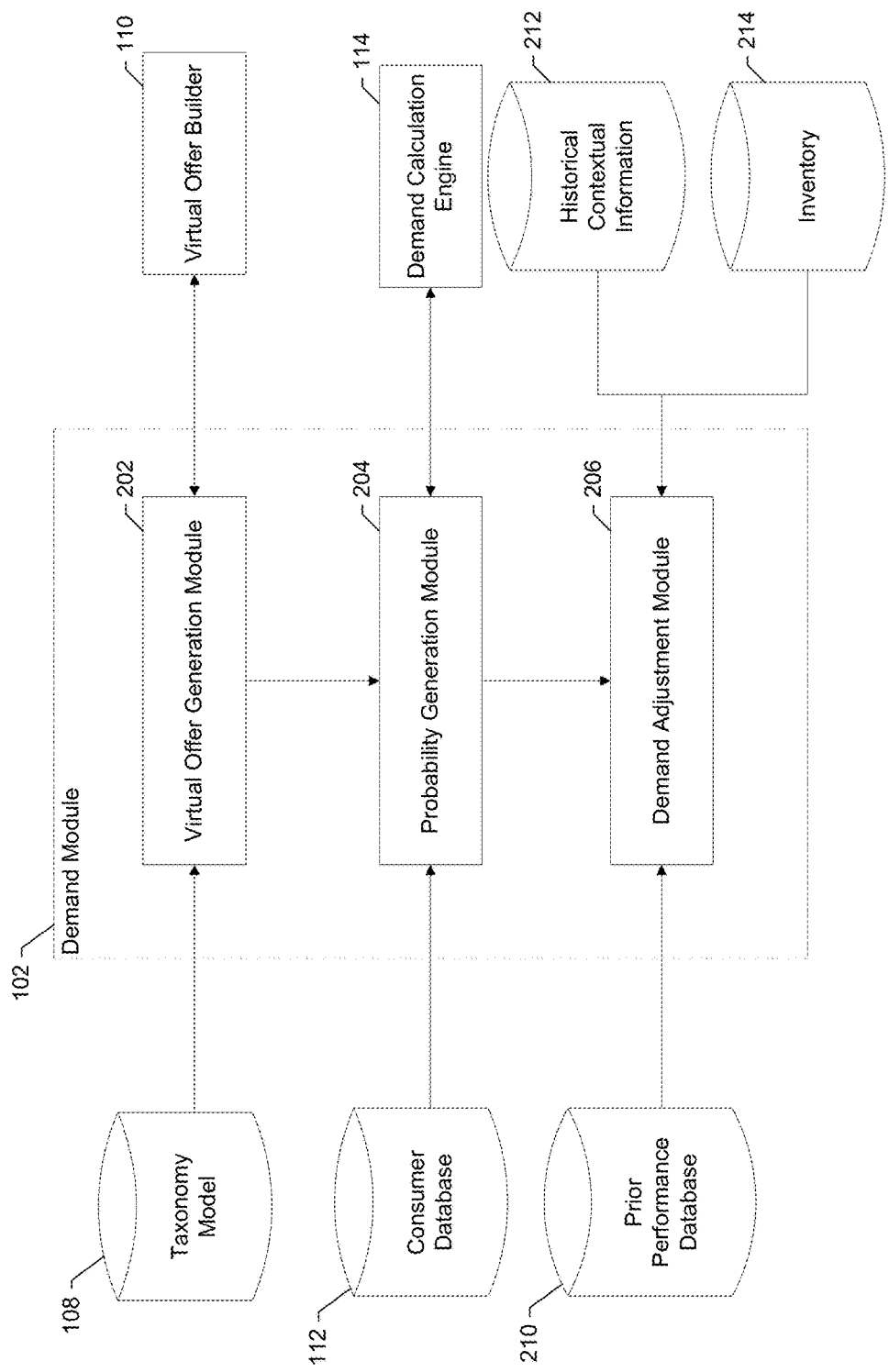

FIG. 2a shows a schematic block diagram of circuitry that can be included in a computing device in accordance with demand module 102 shown, for example, in process 100. Demand module 102 may include virtual offer generation module 202, a probability generation module 204, a demand adjustment module 206 and/or the like to generate a forecasted demand or one or more virtual offers. Each block of the circuit diagrams, and combinations of blocks in the circuit diagrams, may be implemented by special purpose hardware-based computer systems that perform the specified functions or steps, or combinations of special purpose hardware and computer instructions.

The virtual offer generation module 202 may utilize input from or otherwise embody a taxonomy model 108 and/or a virtual offer builder 110 to generate a virtual offer. In some example embodiments, the taxonomy model 108 defines a hierarchical structure of service categories and sub-categories that may be found in one or more local or hyper-local areas. For example, the taxonomy model 108 may define "food and dining" as a category and "Italian" as a sub-category. Alternatively or additionally, the taxonomy model 108 may define a hierarchical structure that is based on location, sub-locations, and/or hyper-local regions, such as any of country, state, county, city, zip code, neighborhood, or street. For example, a location may be "Chicago" and a hyper-local region may be "north side". Alternatively or additionally, the taxonomy model 108 may define a hierarchical structure that is based on target consumer categories such as "family fun" or "high octane adventures." One or more of the sub-categories may then be specific to the target consumer category, for example, "children under 5" or "high speed" respectively. Additional sub-categories may be general, such as "dining" or "in your neighborhood". In another embodiment, the taxonomy model 108 may define a hierarchical structure that is based on service. For example, "wine/food" or "Swedish massage". Virtual offer builder 110 may generate a virtual offer based on such hierarchical structure, such that a virtual offer may comprise a service, a category and sub-category. For example, "wine/food", "food and dining" and "Italian" may be service, category and sub-category of a virtual offer.

In some example embodiments, the virtual offer builder 110 may be configured to construct one or more virtual offers. In some examples, every combination of virtual offers that may be constructed, as defined by a taxonomy model, is constructed. Alternatively or additionally, the virtual offer generation module 202 may be configured to generate virtual offers according to a set of guidelines or rules. The guideline may be operable to provide limitations on prices or price ranges that one or more sub-sets of categories and/or sub-categories may be paired within a virtual offer. For example, the virtual offer generation module 202 may be configured to limit the generation of a first category and/or first sub-category to a first sub-set of price ranges. For example, a virtual offer comprising a category of "food and dining" and a sub-category of "pizza" may be limited to prices and/or price ranges under a predetermined limit, e.g., $100. Whereas a virtual offer comprising a category of "food and dining" and a sub-category of "fine dining" may be limited to prices and/or price ranges over a predetermined limit, e.g., $50.

In another example embodiment, the limitations on the generation of virtual offers may be made according to prior performance of the virtual offers at each of one or more prices or price ranges, prior performance of certain categories and/or the like. Alternatively or additionally, the virtual offer generation module 202 may limit virtual offer generation to a specific time period (e.g., "spring", "February", "next 60 days"), a specific location and/or hyper-local region (e.g., "Chicago" and/or "60602"). In further examples, the virtual offers may be limited to categories and/or sub categories having merchants in a given area.

In some example embodiments, the virtual offer generation module 202 may provide one or more generated virtual offers to the probability generation module 204. The probability generation module 204 may be configured to determine a probability that a particular consumer may purchase a particular virtual offer. The probability generation module 204 may be configured to access consumer data in a consumer database 112. The consumer database 112 may comprise one or more users and user data related to each of the one or more users that may be used to calculate a probability that a particular user would buy a particular offer in a particular time frame for at least a portion of the plurality of users and for each of the virtual offers. In one example embodiment, the probability generation module 204 may determine a probability that a first consumer, second customer, an $n^{th}$ customer would buy a first virtual offer.

In some example embodiments, the probability generation module 204 may further be configured to generate a ranked user list for each of the one or more users comprising each of the one or more virtual offers and an associated calculated probability. In some examples, the probability generation module 204 may be operable to cast a vote for a particular offer. For example, a vote may be cast for the top t offers in the ranked list. Alternatively or additionally, the vote value may be assigned based on the area in the ranked list and/or the like.

In some examples, a union of the top t offers for each user, the top x offers based on votes or the like may be used to select demanded offers from the set of virtual offers. Given a specific list of demanded offers, each of the demanded offers may be matched with a forecasted demand (e.g., in terms of quantity of units, revenue or the like) by aggregating the probabilities that each of the users would purchase the offer as output by the demand calculation engine 114. Alternatively or additionally, the output may be ranked, prioritized, diversified, and/or trimmed. In some example embodiments, a projected revenue value may be calculated for each virtual offer based on prior performance data per unit and an estimated number of units to be sold. Based on the revenue calculation, the one or more virtual offers by the projected revenue.

The demand adjustment module 206 may be configured to input the list of demanded offers and provide one or more adjustments based on diversity, portfolio mix, price mix, hyper-local constraints, prior performance, context information or the like using a prior performance database 210, a historical contextual information 212. In some example embodiments, the demand adjustment module 206 may apply a diversity adjustment. The diversity adjustment may comprise user-level diversity adjustment (e.g., individual consumer probabilities are adjusted based on predetermined constraints, such as user may have a 40% "food and dining" maximum), aggregated output level (e.g., forecasted demand is adjusted to predetermined constraints, such as a maximum of 40% food and dining, 30% health and beauty and/or the like) and/or the like. Alternatively or additionally, the adjustment may take into account a category mix, such as by selecting a certain percentage of offers based on the ranked list according to a set percentage, a price mix or the like.

In some example embodiments, the demand adjustment module 206 may be configured to adjust the forecasted demand according to prior performance. For example, specific offers may have outperformed or underperformed calculated demand of a related virtual offer in a past offering, indicating that the demand for the related virtual offer may be more accurately represented by a higher or lower demand. In such cases, the demand adjustment module 206 may adjust the forecasted demand based on the historic data.

In some example embodiments, the demand adjustment module 206 may be configured to adjust a demand of one or more virtual offers according to context information, such as seasonality, discrete weather events, economic conditions and/or other recurring events. For example, demand for one or more categories or sub-categories may be adjusted according to seasonality or a specific season (e.g., adjust "ski" virtual offers upward in late fall or winter and adjust down in spring), rainfall (e.g., adjust "outdoor virtual offers during above average rainfall periods) and/or the like. In some example embodiments, specific events may cause adjustment (e.g., adjust "golf" virtual offers during time periods when golf events are happening, such as the U.S. Open and/or in locations or hyper-local regions where golf events are taking place, such as Rochester, N.Y. during the PGA championship 2013).

The demand adjustment module 206 may therefore be configured to output one or more virtual offers, each with a corresponding demand. The corresponding demand may include demand amounts that may have been adjusted based on any one or more of the aforementioned factors. The corresponding demand may also include demand amounts that have not adjusted by any of the aforementioned factors. As such, the collective demand information output by probability generation module 204 is referred to as forecasted demand herein.

Alternatively or additionally, demand may be forecasted using historical conversion rates for each potential virtual offer and each known consumer, top categories or sub categories rank ordered by performance metrics such as Engaged User Profit Per Thousand (ePPM) or the like, search engine data, use of a website that provides the one or more offers, subscription data, historical sales, sales in the market place and/or the like. In some examples, offer related keywords on search engines click through to an offer can be leveraged as a signal of demand (e.g., a model that translates or otherwise correlates searches to offers sold). In some examples, the use of a website or mobile application that displays or otherwise advertises available offers may be tracked as an exogenous source of demand and can be used in identifying not only the current demand, but also for identifying high demand offers that are not currently stocked. Each of these demand forecasting methods may be used in conjunction with each of the other demand forecasting methods as well as may be used alone.

Additionally or alternatively, in some example embodiments, with the introduction of search and browse functionality and the capture of data therefrom on a promotion and marketing service (e.g., as may be provided by the promotion system 1410 described later), demand may be inferred and a real time demand may be calculated. In some embodiments, a search feedback system may be configured to capture user search data. For example, modules allowing for a search volume and a search conversion rate may be included in a demand forecasting model (e.g., demand module 102)

Additionally or alternatively, in some example embodiments, in determination of whether a demand is fulfilled or in calculating what a minimum number of promotions are necessary to consider demand fulfilled, a fill rate may be calculated. Fill rate may be used to identify whether a demand for a particular promotion in a particular location is met by adding (1) a portion of inventory of the particular promotion in the particular location and (2) a portion of an inventory of the particular promotion or a related promotion whose effective location encompasses the particular location.

Supply Identification

Figure 2B:
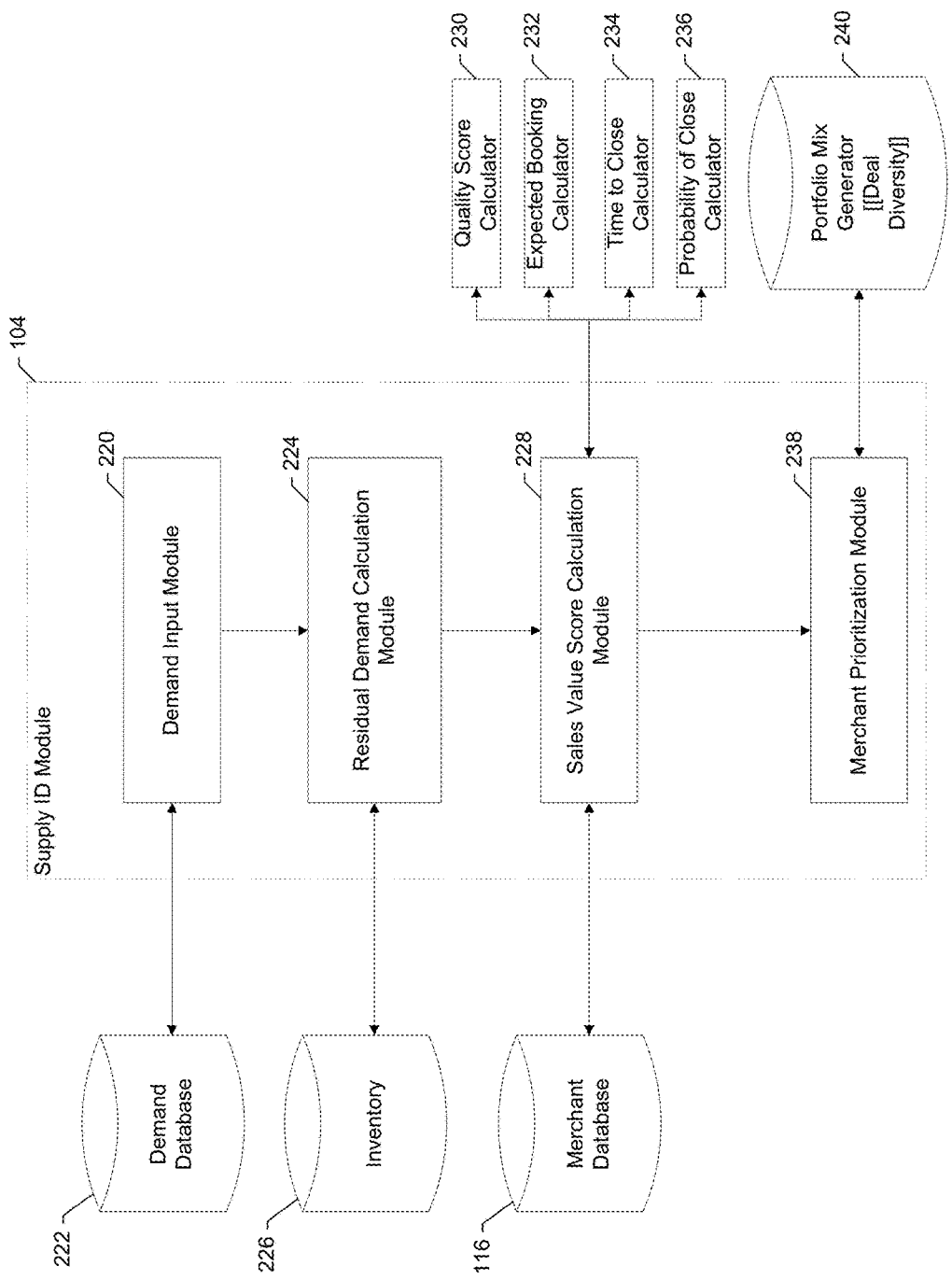

FIG. 2b shows a schematic block diagram of circuitry that can be included in a computing device in accordance with Supply ID module 104 of process 100 that is configured to identify one or more merchants that are able to provide goods, services or experiences to meet a forecasted demand. In some example embodiments, the supply ID module 104 may comprise a demand input module 220, a residual demand calculation module 224, a sales value score calculation module 228, and/or a merchant prioritization module 238. Each block of the circuit diagram, and combinations of blocks in the circuit diagram, may be implemented by special purpose hardware-based computer systems that perform the specified functions or steps, or combinations of special purpose hardware and computer instructions.

In some example embodiments, the demand input module 220 may be configured to receive a forecasted demand, which may be input from one of the demand module 102, a demand database 222 and/or the like. The forecasted demand may be one or more virtual offers and an associated demanded quantity, a demand for one or more goods, services or experiences and/or the like. In some examples, the associated demanded quantity may be in units, revenue, profits, or the like.

In some example embodiments, the residual demand calculation module 224 may be configured to receive a forecasted demand that is input via the demand input module 220 and calculate a residual demand by subtracting existing inventory from the forecasted demand. In some example embodiments, only those offers in inventory matching each of the category, sub-category, location, and price or price range may be subtracted from the demand. Alternatively or additionally, predetermined substitutions may be made (e.g., where one or more of category, sub-category, location, hyper-local region, and price range may be different) and the predetermined substitutions may specify specific allowable substitution for particular categories, sub-categories, locations, hyper-local regions, and/or price ranges. In some examples, similar categories or sub-categories or any other facet of the virtual offer may also reduce demand.

In some example embodiments, specific guidelines may be utilized in determining which particular offers in a current inventory may be considered. In some example embodiments, when determining residual demand, only those offers in current inventory that are available for an entire time frame of forecasted demand may be considered. For example, if a first virtual offer comprises a first demand where demand was calculated for one month, only those offers in current inventory available for the one month period are considered in calculating a residual demand. Alternatively or additionally, when an offer is in current inventory, a determination may be made to calculate how many units of the offer are likely to be sold, using for example prior purchase history, other historic data, current offers and/or the like, and only that number calculated may be utilized when calculating residual demand. For example, if 200 units of an offer featuring "personal training sessions" in a local area are available in local inventory, but based on prior purchase history, only 100 are determined as likely to sell, residual demand may be calculated using the 100 units likely to sell instead of the 200 units in the current inventory.

In some example embodiments, penalties may be applied to offers in current inventory based on a time frame that they have been available or sitting in inventory. Penalties may also be applied based on prior exposure or seasonality also. For example, 400 units of offer for "American Food" with a sub-category "Burgers" may be in current inventory. The 400 units may be utilized in calculating residual demand, or the 400 units may be discounted based on the time spent in inventory (e.g., 20% per 3 months), prior exposure (e.g., 20% discount for each month it's been featured), and/or seasonality (20% discount in the summer). After applying the penalties, less than the 400 available units may be considered when calculating residual demand.

Alternatively or additionally, in some example embodiments, before calculating a residual demand based on current inventory, the merchants in the current inventory are provided to the sales value score calculation module 228. In an instance in which a sales value score for a merchant satisfies a predetermined threshold or ranking, then the inventory provided by that merchant would be considered in calculating residual demand.

Using the residual demand, the supply ID module 104 is configured to assign each offer defined by the residual demand to one or more merchants in an instance in which the merchant is able to provide goods, services and/or experiences as defined by the merchant demand. In some examples, the one or more merchants may be determined based on a global listing of merchants stored in a merchant database. As such, to the extent the merchant provides a good, service or experience that matches or is related to a demanded offer, the demanded offer may be assigned or otherwise linked to that merchant. Each merchant may therefore be assigned zero or more demanded offers as defined by the residual demand.

In some example embodiments, a sales value score calculation module 228 is configured to input the listing of merchants and then may calculate one or more scores related to a merchant. In some examples, the sales value calculation module may be configured to calculate a merchant quality score, a risk potential, a probability to close, a time to close and/or the like. The sales value score calculation module 228 may also be configured to calculate one or more of a quality score, an expected booking amount, a risk potential, a time to close, or a probability to close for one or more merchants. The sales value score calculation module 228 may utilize a quality score calculator 230 to calculate the quality score, an expecting booking calculator 232 to calculate the expecting bookings, a time to close calculator 234 to calculate a time to close, and a probability of close calculator 236 to calculate a probability to close. The sales value score calculation module 228 may be configured to access a merchant database, including one or more factors related to one or more merchants in order to calculate the sales value score of a respective merchant.

In some examples, a merchant quality score indicates a predicative value that is indicative of how well a merchant would perform during an offer and how consumers would react to the offer. The merchant quality score may include factors such as reviews from a plurality of internet sites (e.g., Yelp®, etc.), likes (e.g., Facebook® likes), quality of website, prior offer performance(s), competitor offers, prior performance of related merchants, and/or Hotspots. For example, a decision model may be used to generate a merchant quality score. As such, if a merchant has at least an average of 3.0 stars over five reviews, then a merchant may receive a merchant quality score of between 6-10 depending on the overall star average, number of reviews and social media like. In other examples, a merchant without 3.0 stars over five reviews may receive a high merchant quality score (e.g. 8) if that merchant has a large number of likes, a positive review from a predetermined acceptable source and/or the like.

In some examples, a risk potential may indicate the risk that a merchant may pose, such as to refund rate, complaints and/or the like. Risk potential may be calculated based on the business type, credit score, age, capacity, judgments, Better Business Bureau rating, etc. Risk Potential may also predict a refund or return rate of a potential merchant offering. In one embodiment, providers may be classified as "good" providers defined as those likely to have return rates less than a predetermined amount (e.g., 10%) and "bad" providers defined as those providers likely to have return rates greater than a predetermined amount. In general, the process of classifying the providers may access and/or capture internal, external and web data related to a provider including existing return rates. The data may then be normalized and supplied to a classifying model as attribute data. The process may then include training the classifying model to recognize one or more patterns indicative of a return rate of a provider in accordance with the attribute data. When given a provider and corresponding attribute data, the process may then identify a class of the provider in accordance with a plurality of corresponding attribute data, wherein the identification is determined based on one or more patterns determinative of a return rate by the classifying model. The corresponding attribute data may comprise one or more of category data, sub-category data, competitor feature data, time data, financial stability risk data, median credit data, count of judgment data, risk level data, or web data (e.g., reviews, review scores, "likes" or the like).

The probability to close represents a probability of a merchant committing their inventory, such as signing a contract. Probability to close and time to close may be based on in combination, but not limited to, a lead source, such as for example a "warm lead" versus a "cold call", quality of the lead source, merchant attributes, stage of close, interface time, talk time, past feature history data, past feature performance(s), high prior satisfaction, an upcoming expiration of an offer, whether the merchant is a new or existing customer, and/or whether the merchant has adopted other services. A probability to close and/or a time to close may be calculated based on a logistic regression tool, a model and/or the like. In one example, a probability to close indicates the probability that a particular provider of the one or more providers will contract with a promotion service to offer a promotion, wherein the promotion is offered to a consumer for purchase from the promotion service in exchange for an instrument. The time to close may be calculated as a number of days from a current date, or date of receipt of the sales lead, for example In one embodiment, in order to facilitate a calculation of a probability to close and/or a time to close, the promotional system may be configured to receive a sales lead comprising an indication of a provider, and at least one of a provider category, a lead source, or historical data relating to the one or more providers as well as receive, calculate or otherwise generate a series of metrics about a providers, a good, a service, an experience, a category, a sub-category, a location, a time period and/or the like. A sales lead may, in some embodiments, be generated or received from a third party system or the like. The sales lead may include any of a provider name, an individual contact at the provider (e.g., manager), address, category and/or subcategory of the provider and/or services offered by the provider (such as food and drink, or salon services) and/or the like. Additionally or alternatively, in some embodiments, the sales lead may include information regarding a specific promotion with which to target the provider. As such, the sales lead may include a promotion specifically designed for the provider, or a provider may be specifically targeted to honor a preconceived promotion.

In some examples, the sales value score calculation module 228 may calculate a prioritization score that is a function of one or more of the merchant quality score, the risk potential, a probability of closing and a time to close for each demanded offer. A sales value score may then be calculated, which is a function of the prioritization score, an expecting bookings amount and/or urgency. For example, a provider that is identified as able to provide more bookings (e.g., meet more residual demand), may have a higher sales value score than a second provider who scores higher on prioritization.

In some example embodiments, a merchant prioritization module 238 may be configured to receive a listing of one or more merchants identified as able to meet a portion of the residual demand and a corresponding sales value score for each merchant from the sales value score calculation module 228.

In some example embodiments, the merchant prioritization module 238 may be configured to receive one or more merchants, a corresponding sales value score and a list of each virtual offer that each of the merchants is identified as able to meet at least a portion of the demand for and what portion. The merchant prioritization module 238 may be configured to determine a priority of the one or more merchants. The one or more merchants may then be rankable based on the priority score within a specific virtual offer or by the sales value score given a list of virtual offers that may be fulfilled. In some example embodiments, the merchant prioritization module 238 may prioritize the merchants and apply an adjustment based on a portfolio score. The portfolio score may be a diversity constraint from the portfolio mix generator 240. The merchant prioritization module 238 may be configured to receive input from or access the portfolio mix generator 240 regarding offer diversity. Offer diversity may comprise a predetermined mix. The portfolio score may give pre-determined weight to specific categories, sub-categories, locations, or price ranges based on one or more predetermined business objectives. The sales value score calculation module 228 is therefore configured to output a ranked list of merchants.

Assignment

Figure 2C:
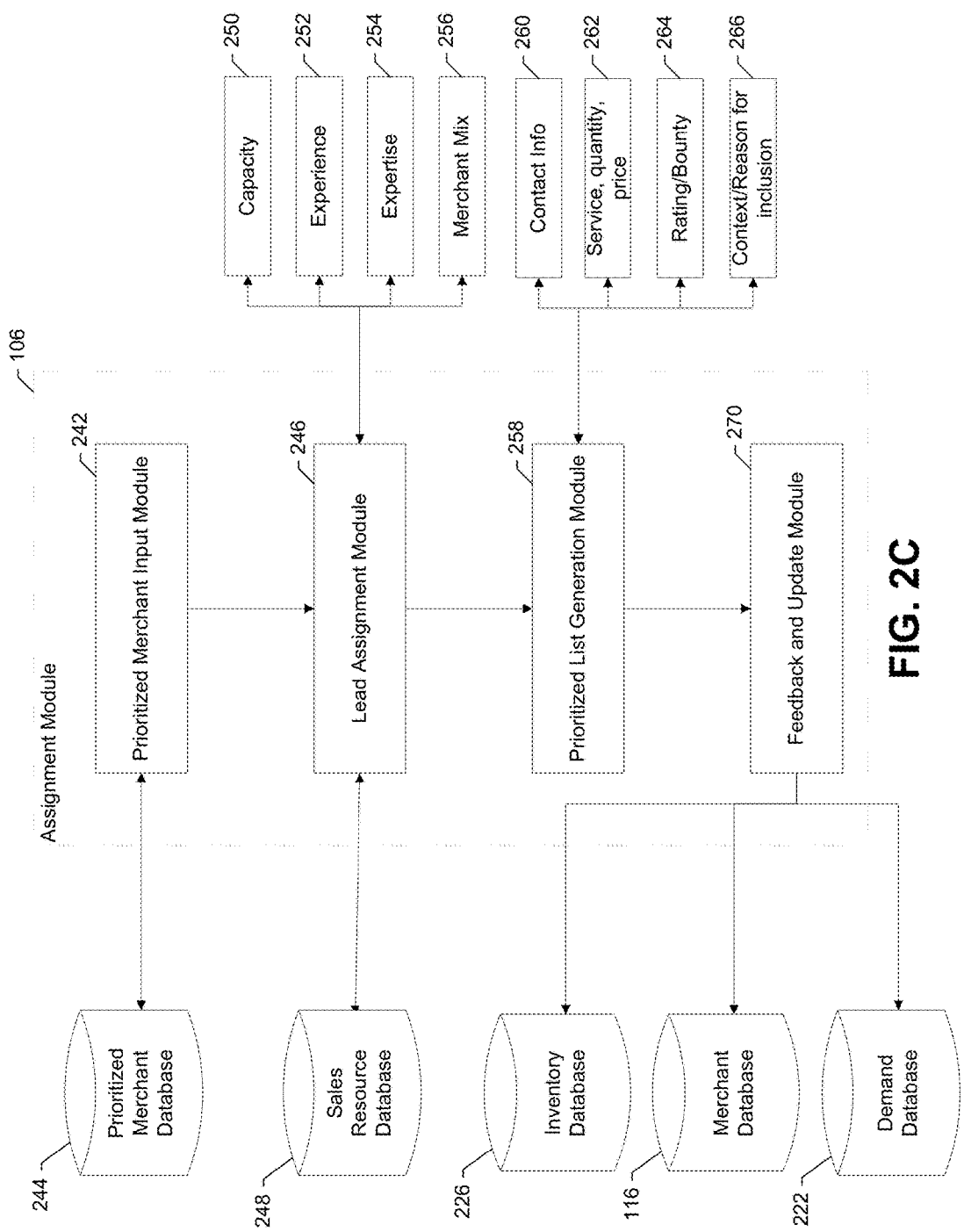

FIG. 2c shows a schematic block diagram of circuitry that can be included in a computing device in accordance with assignment module 106 in process 100. The assignment module 106 may comprise a prioritized merchant input module 242, a lead assignment module 246, a prioritized list generation module 258, a feedback and/or an update module 270. Each block of the circuit diagrams, and combinations of blocks in the circuit diagrams, may be implemented by special purpose hardware-based computer systems that perform the specified functions or steps, or combinations of special purpose hardware and computer instructions.

In some example embodiments, the prioritized merchant input module 242 may be configured to receive a prioritized or otherwise ranked list comprising one or more merchants. The prioritized list may be received from a prioritized merchant database 244, the supply ID module 104 and/or the like. The prioritized list may comprise the listing of merchants and one or more of a sales value score, a priority score, a quality score, a risk potential, an expected booking score, a time to close score, a probability to close score, an expected revenue and/or the like. The prioritized list may also comprise a list of each of one or more virtual offers associated with one or more of the merchants.

In some example embodiments, the lead assignment module 246 may be configured to ingest the prioritized list and further may be configured to access sales resource data (e.g., resources, capacity, efficiency, a sales resource expertise score for at least one of: category, sub-category, or location, etc.) to assign the merchants to the sales resources. In some examples, the lead assignment module 246 may be configured to utilize a sales resource database 248 to access the sales resource data. Alternatively or additionally, the lead assignment module 246 may also be configured to access information related to an associated capacity 250, an associated experience 252, an associated expertise 254 and/or an associated merchant mix 256 of one or more sales resources.

In some example embodiments, the lead assignment module 246 may also be configured to assign one or more sales resources an assignment probability number, wherein an assignment probability number represents a probability that a sales resource will be randomly assigned to a next merchant in an assignment process. The assignment probability number may be calculated or assigned based on at least one of the associated capacity, the associated experience, the associated expertise, the associated merchant mix of a sales resource, or any combination thereof. As such, the lead assignment module 246 may assign merchants to sales resources based on a weighted random allocation, such as based an assignment probability number associated with each of one or more sales resources.

In some example embodiments, the lead assignment module 246 may be configured to adjust an assignment probability number based on the associated capacity, the associated experience, the associated expertise, the associated merchant mix, the merchant, an offer or the like. Alternatively or additionally, before an assignment is made and/or after a merchant is assigned to a sales resource, the associated capacity, the associated experience, the associated expertise, and/or the associated merchant mix of a sales resource may be updated, re-calculated, and/or re-assigned by the lead assignment module 246. The assignment probability number may then also be updated, re-calculated, and/or re-assigned.

The lead assignment module 246 may also be configured to assign at least a portion of the one or more merchants according to at least the assignment probability number of the one or more sales resources, the sales value of the one or more merchants and/or the like. As described above, after an assignment is made, the associated capacity, the associated experience, the associated expertise, the associated merchant mix of a sales resource, and/or any combination thereof may be updated, re-calculated, and/or re-assigned. The assignment probability number may then be updated, re-calculated, and/or re-assigned.

As such and by way of example, in some example embodiments, the lead assignment module 246 may be configured to assign a first merchant to a first sales resource at random based on the assignment probability of the first sales resource, decrease the assignment probability number of the first sales resource and adjust the capacity of the first sales resource. In some example embodiments, after a first merchant is assigned to a first sales resource, a second merchant may need to be assigned. The lead assignment module 246 may be configured to assign a second lead to a second sales resource based on the assignment probability number of the second sales resource. The lead assignment module 246 may then decrease the assignment probability of the second sales resource and adjust at least one of the associated capacity, the associated experience, the associated expertise, the associated merchant mix of the second sales resource, or any combination thereof.

In some example embodiments, the lead assignment module 246 may be configured to adjust the assignment probability number of one or more sales resources based on a predetermined portfolio mix and/or assigned merchants. For example, where a first sales resource is assigned a first merchant and the merchant is associated with an ability to supply a portion of a virtual offer in a first category and/or a first sub-category, the assignment probability number of the first sales resource may be adjusted when an subsequent merchant is being assigned so as to keep the portfolio mix of the first sales resource compliant with a predetermined portfolio mix. In some example embodiments, the lead assignment module 246 may be configured adjust the assignment probability number of one or more sales resources based on merchant relationship information. For example, where a first sales resource has prior experience with a first merchant, the assignment probability number may be adjusted based on the outcome of that experience (e.g., upward if the experience was positive and downward if the experience was negative).

In some example embodiments, the prioritized list generation module 258 may be configured to generate a prioritized call list for one or more sales resources. The prioritized call list of one or more merchants. In some examples, a merchant is only assigned to a single sales resource. Alternatively or additionally, the prioritized list generation module 258 may be configured to access and/or include, in the prioritized list, at least one of contact information 260, a specific offer (including one or more of category, sub-category), quantity, price, and/or price range, a rating or bounty score, context or a reason for inclusion or any combination thereof.

In some example embodiments, the prioritized list generation module 258 may be configured to receive merchant information and/or inventory information, and the prioritized call list may be updated based on the merchant information or inventory information. For example, in an instance in which a sales resource contacts a merchant and learns that the contact person, the merchant hours, phone number or the like has changed, the sales resource may update the information accordingly.

In some example embodiments, the prioritized list generation module 258 may be configured to re-assign merchants according to predetermined metrics. For example, a merchant may be de-allocated from a first sales resources and re-assigned (1) if a sales resource has made no contact and/or has no activity with a merchant for a predetermined period of time, the predetermined period of time may be based on merchant information such as lead source; (2) if a sales resource has made no contact and/or made no activity within a predetermined period of time from a previous activity; and (3) if a sales resource has no traction activity (e.g., 5 minutes of contact) within a predetermined period of time. A merchant may also be reassigned if a sales resource has not closed a contract within a predetermined period of time, the predetermined period of time based on a merchant ranking A merchant may also be reassigned if a sales resource has closed a first contract, but has not closed a second contract within a predetermined period of time from expiration, the predetermined period of time based on a merchant ranking.

In some example embodiments, the feedback and update module 270 may be configured to receive feedback and/or updated information from the sales resources. The feedback and update module 270 may be configured to provide that information to other sources. For example, when a contract is closed, information related to the process and/or the contract details may be provided to the inventory database 226, the merchant database, the demand database 222, or any other information source. Specifically, for example, the feedback and update module 270 may provide a units value for a specific service related to an offer (e.g., 300 units for a category "massage", sub-category "back", location "28202", and price range "$50-$75") to the inventory database. The feedback and update module 270 may provide information related to time, a number of calls, a contact person or the like to the merchant database, which may later be accessed in re-calculating, re-adjusting, or re-assigning a sales value score, a probability to close, a time to close, or any combination thereof.

In some examples, the feedback and update module 270 module may be configured to track metrics that measure the overall improvement made in the pipeline. Such metrics may include, but are not limited to purchase order fill rate, lead time for filing a purchase order, lead conversion rate, demand fulfillment error, demand forecast error, gross revenue, aggregate conversion rate, number of unique purchasers and/or the like.

Flowcharts

FIGS. 3, 4, 6B-6K, 7, 8, 10, 11, 12, and 13 illustrate example flowcharts of the example operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 1404 of an apparatus employing an embodiment of the present invention and executed by a processor 1402 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIGS. 3, 4, 6B-6K, 7, 8, 10, 11, 12, and 13, when executed, convert a computer or processing circuitry into a particular machine configured to perform an example embodiment of the present invention. Accordingly, the operations of FIGS. 3, 4, 6B-6K, 7, 8, 10, 11, 12, and 13 define an algorithm for configuring a computer or processing to perform an example embodiment. In some cases, a general purpose computer may be provided with an instance of the processor which performs the algorithms of FIGS. 3, 4, 6B-6K, 7, 8, 10, 11, 12, and 13 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included. It should be appreciated that each of the modifications, optional additions or amplifications below may be included with the operations above either alone or in combination with any others among the features described herein.

Process for Sales Automation

Figure 3:
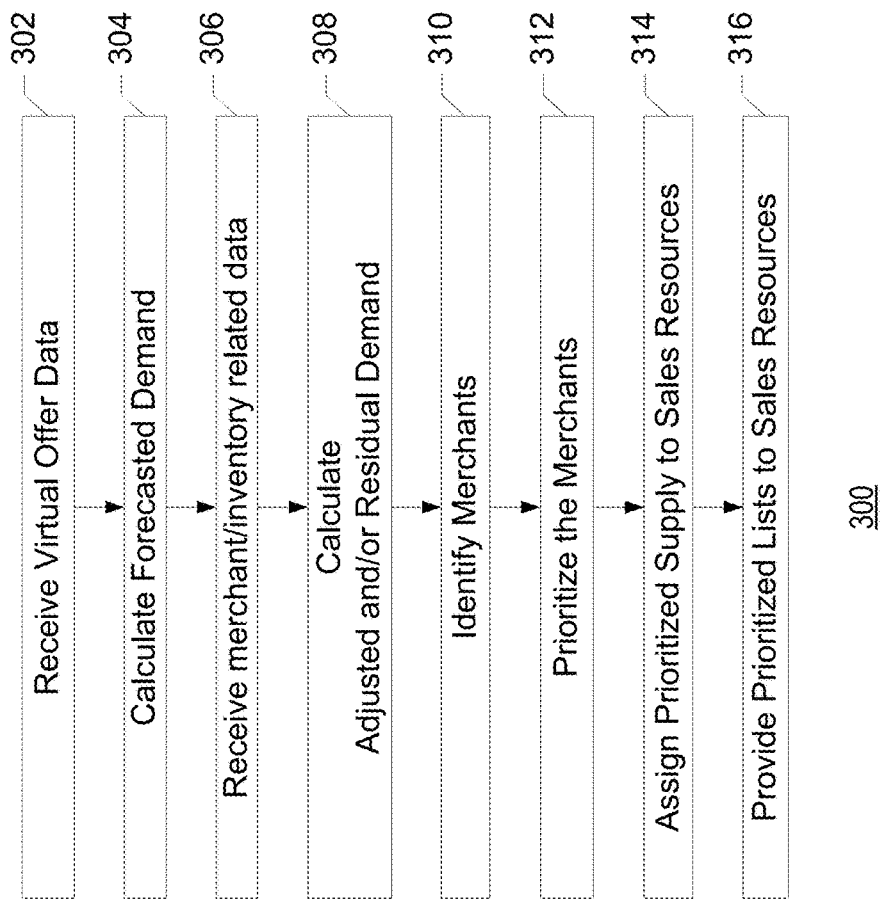
FIG. 3 shows a flow chart showing an exemplary process of Quantum Lead that includes analyzing demand and merchant data and providing prioritized merchant data in accordance with some embodiments discussed herein.

FIG. 3 shows an example method, namely process 300, that may be executed by one or more machines (some examples of which are discussed in connection with FIGS. 1, 2a, 2b, 2c, and/or 14) to calculate a forecasted demand, identify new supply and prioritize and assign leads, in accordance with some embodiments discussed herein. As shown in block 302 of FIG. 3, an apparatus, such as the promotional system 1410, may include means, such as the demand module 102, the processor 1402, the communications interface 1406 or the like, for receiving virtual offer data. For example, a virtual offer may include a category and/or a service sub-category, (e.g., massage as a category and/or shoulder massage as a sub-category. The offer may further include a location and/or a hyper-local region (e.g., a location of Chicago, Ill. and/or hyper-local region of Wrigleyville). The virtual offer may further include a type of offer (e.g., two for one). A virtual offer, in the context of the aforementioned example, may be an offer that is constructed, for example, by a computer algorithm, but may not be offered for sale by a seller nor offered to a consumer.

As shown in block 304 of FIG. 3, the promotional system 1410, may include means, such as the demand module 102, the processor 1402 or the like for calculating a forecasted demand. In general, a forecasted demand, which may be referred alternatively as a demand forecast or a projected demand, may be calculated by calculating a probability that a particular user would buy a particular offer in a particular time frame for at least a portion of a plurality of users and for at least of a portion of one or more virtual offers. An estimated number of units to be sold may then be determined, or projected, for at least a portion of the one or more virtual offers as a function of at least the probability associated with each of the one or more virtual offers. The probability may be based on associated consumer data related to, for example, at least one of a location, a gender, prior purchase history, personalization signals, seasonality or any combination thereof and by simulating a plurality of virtual offers in a plurality of hyper-local regions, using for example a virtual offer construction algorithm, and applying the associated consumer data to the virtual offers. The output, forecasted demand, may comprise at least one or more virtual offers and a demanded quantity of at least a portion of the one or more virtual offers.

As shown in block 306 of FIG. 3, the promotional system 1410, may include means, such as the supply ID module 104, the processor 1402, the communications interface or the like for receiving or otherwise accessing inventory data. As shown in block 308 of FIG. 3, the promotional system 1410 may include means, such as the supply ID module 104, the processor 1402 or the like for adjusting the forecasted demand and/or calculating an adjusted demand or residual demand. An adjusted demand is the forecasted demand adjusted based on external factors (e.g., seasonality etc.). In some examples, a residual demand is the forecasted demand reduced by current inventory; such as the inventory received at block 406.

As shown in block 310 of FIG. 3, the promotional system 1410 may include means, such as the supply ID module 104, the processor 1402 or the like for identifying one or more merchants. The one or more merchants are determined as able to supply a portion of the adjusted demand. In general, the merchants may include any potential source of an offer. For example, the one or more merchants may include new merchants identified by, for example, a web crawler, or, alternatively or additionally, may include merchants with whom, contracts have been previously closed. In some examples, the list of merchants may come from a database of merchants that is maintained for the purposes of sales leads.

As shown in block 312 of FIG. 3, the promotional system 1410 may include means, such as the supply ID module 104, the processor 1402 or the like for prioritizing the one or more merchants. Prioritizing may be may be accomplished based on a calculated determination, such as a sales value score and/or the like. The sales value score may be calculated for the one or more merchants and may be a function of at least one of: expected bookings, a merchant quality score, a probability to close, a time to close, and a merchant return rate. In one embodiment, for providers who have offered promotions in the past, prior performance data may also be utilized. For example, total bookings, number of activations, refunds, customer satisfaction, or the like may be used.

As shown in block 314 of FIG. 3, the promotional system 1410 may include means, such as the assignment module 106, the processor 1402, or the like for assigning the prioritized supply to sales resources. In some examples, the promotional system 1410 may assign the one or more merchants to one or more sales resources in accordance with at least the sales value score of the one or more merchants, a capacity of a sales resource, experience of a sales resource, expertise of a sales resource or the like. As shown in block 316 of FIG. 3, the promotional system 1410 may include means, such as the assignment module 106, the processor 1402, or the like for providing prioritized lists that may include each of one or more merchants from the prioritized merchants that were assigned in block 314. The sales resource may be responsible for converting one or more sources of the prioritized merchants to inventory. The prioritized list may be configured in such a way as to provide a sales resource with one or more sources that may, for example, represent the highest earning potential. The earning potential may be calculated for the sales resource, the merchants, and/or the promotional system 1410.

In some example embodiments, the prioritized list comprises contact information and a suggested offer including a service, a quantity and a price. The prioritized list may also provide contact reason which provide context to make the sales resource more effective. For example, the prioritized list may provide a sales resource with a suggested product/service and desired supply, a price range, and/or hyper-local region (e.g., 550+ units/month from $26-$50 for seafood in Middlesex). Alternatively or additionally, the prioritized list may comprise a rating or a bounty. The rating or bounty may be related to a reward or compensation system which may provide incentive for the sales resource to close a specific merchant.

In some example embodiments, the prioritized list is generated based on sales resource related data, such that each prioritized list may be unique to a specific sales resource. The one or more merchants may be allocated to resources identified as best equipped to close them. For example, important sources may be divided equally in order to ensure each source is given priority by the assigned resource. In some example embodiments, particular sources may be allocated based on a relationship status with a specific resource. In some example embodiments, sources may be allocated based on an expertise of a resource. For example, a specific sales representative may be identified as having a higher close rate for health and beauty as compared to other sales representatives. In some example embodiments, sources may be allocated based on capacity of the resource.

Further discussion related calculating a demand forecast, identifying new supply, and prioritizing and assigning leads can be found in U.S. Provisional Patent Application No. 61/730,046, titled "METHOD AND APPARATUS FOR MATCHING SUBSCRIBER DEMAND WITH MERCHANT/INVENTORY SUPPLY" filed on Nov. 26, 2012", U.S. Provisional Patent Application No. 61/682,762, filed Aug. 13, 2012, titled "UNIFIED PAYMENT AND RETURN ON INVESTMENT SYSTEM", and U.S. Provisional patent application Ser. No. 13/460,745, filed Apr. 30, 2012, titled "SALES ENHANCEMENT SYSTEM", each of which is hereby incorporated by reference.

Process for Forecasting Demand

Figure 4:
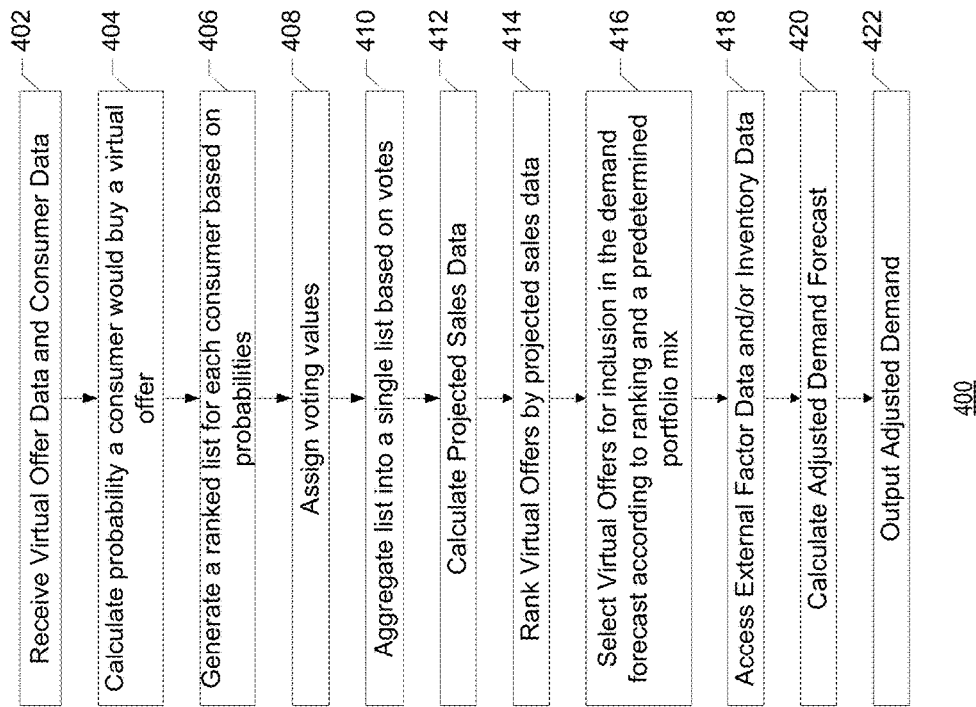
FIG. 4 shows a flow chart showing an exemplary process of facilitating Quantum that includes generating an adjusted demand to a remote device in accordance with some embodiments discussed herein.

FIG. 4 shows an example method, namely process 500, that may be executed by one or more machines (some examples of which are discussed in connection with FIGS. 1, 2a, and/or 14) to calculate a forecasted demand, in accordance with some embodiments discussed herein. As shown in block 402 of FIG. 4, an apparatus, such as the promotional system 1410, may include means, such as the demand module 102, the processor 1402, the communications interface 1406 or the like, for receiving virtual offer data and consumer data.

In some example embodiments, consumer data is stored in memory, such as memory 1404, and the consumer data is accessed from memory (e.g., a local memory, a remote memory or the like) by, for example, a demand module 102 or processor 1402. Consumer data may include, for example, age, gender, location, hyper-local region, and/or past purchase history including specific offers, dates, cost expenditures, offer types, offer structures, etc. Consumer data may be the accumulation of information related to each of or some portion of a current subscriber database. In another embodiment consumer data may comprise income information. In one embodiment, wherein income information may not be available, consumer data may comprise predicted income information. Predicted income information may be a function of one or more of an age, gender, location, hyper-local region, and past purchase history.

As shown in block 404 of FIG. 4, an apparatus, such as the promotional system 1410, may include means, such as the demand module 102, the processor 1402 or the like, for calculating a probability that a consumer would buy a virtual offer. In some examples, the consumer data may be used as an input signal to a virtual offer generation system that is configured to use the consumer data to model the likelihood that a consumer would buy a particular virtual offer. For example, based on information such as demographic, area, historical stats, gender, income and/or the like, the model may output a probability that one or more consumer would purchase a particular virtual offer. In one embodiment, characteristics (e.g., mean or median income) of an area, demographic, or gender associated with a consumer may factor into the calculation of the probability that a consumer would buy a virtual offer. For example, if a consumer is associated with an area with a mean income of a predetermined threshold (e.g., $150,000), increased probabilities may be calculated for particular virtual offers related to particular categories, sub-categories, or prices.

As shown in block 406 of FIG. 4, an apparatus, such as the promotional system 1410, may include means, such as the demand module 102, the processor 1402 or the like, for generating a ranked list for each consumer comprising each of one or more virtual offers and associated probability that the consumer would purchase the virtual offer. In some examples and by using an example pivot table or the like, the list of consumers and their associated probabilities for each of the virtual offers may be converted into a listing of virtual offers and related probabilities for each consumer.

In one embodiment, a demand calculation engine 114 may be utilized for calculating the probability a consumer would buy a virtual offer, as shown in block 404, and generating a ranked list as shown in step 406. FIG. 10 shows an exemplary process for generating a ranked list of virtual offers.

Further discussion may be found in U.S. patent application Ser. No. 13/411,502, filed Mar. 2, 2012, titled "RELEVANCE SYSTEM FOR CONSUMER DEALS", and U.S. Provisional Patent Application No. 61/730,046, titled "METHOD AND APPARATUS FOR MATCHING SUBSCRIBER DEMAND WITH MERCHANT/INVENTORY SUPPLY" filed on Nov. 26, 2012", each of which is incorporated by reference in its entirety.

As shown in block 408 of FIG. 4, an apparatus, such as the promotional system 1410, may include means, such as the demand module 102, the processor 1402 or the like, for assigning voting values to one or more virtual offers on one or more of the ranked lists generated in block 506. In some example embodiments, a first voting value is assigned to a predetermined number of virtual offers. For example, a voting value of 1 may be assigned to each of the top 5 virtual offers on each consumer's ranked list. In some example embodiments, a first voting value is assigned to a first virtual offer and a second voting value is assigned to a second virtual offer, e.g., a voting value of 1 is assigned to the virtual offer with the highest probability and a voting value of 0.8 is assigned to the next highest. Alternatively or additionally, descending voting values may be assigned to each of a predetermined number of virtual offers, e.g., a voting value of 1 is assigned to the highest, a voting value of 0.8 to the second highest, a voting value of 0.6 to the third highest, etc. In some example embodiments, assignment of voting values may be limited to a predetermined amount of any one of a category, sub-category, location, hyper-local region or price range. For example, a voting value may only be assigned to a predetermined number (e.g., 2 virtual offers in "food and dining").

As shown in block 410 of FIG. 4, an apparatus, such as the promotional system 1410, may include means, such as the processor 1402, communications interface 1406 or the like, for aggregating the ranked lists for each consumer into a single list using the voting values. For example, the voting values that a first virtual offer received for each consumer are summed and the virtual offer is added to the single list with summed number.

As shown in block 412 of FIG. 4, an apparatus, such as the promotional system 1410, may include means, such as the demand module 102, the processor 1402 or the like, for calculating projected sales data. In some examples, the projected sales volume, revenue, profit, or the like may be calculated based on a calculation of how many or much of a virtual offer will be sold to a subscriber base. In some examples, and as shown in block 414 of FIG. 4, an apparatus, such as the promotional system 1410, may be configured to rank the virtual offers by sales projected sales data. In one example embodiment, projected sales data may be calculated for each of one or more virtual offers on the single list, based on the summed voting values. For example, virtual offers appearing on a plurality of user lists are going to have a plurality of voting values that will be summed. The summed total of voting values then may appear on the single list and the summed total may then be used to calculate one or more of a projected sales volume, revenue, profit or the like.

As shown in block 414 of FIG. 4, an apparatus, such as the promotional system 1410, may include means, such as the demand module 102, the processor 1402 or the like, for selecting virtual offers for inclusion in a forecasted demand according to the ranking and/or a predetermined portfolio mix. As shown in block 416 of FIG. 4, an apparatus, such as the promotional system 1410, may include means, such as the demand module 102, the processor 1402 or the like, for accessing external factor data and/or inventory data. For example, inventory data may include information related to current and/or available inventory. Current and/or available inventory may include information related to closed contracts, unprocessed offers, unsold inventory, and/or recurring inventory.

In some example embodiments, available inventory data may also include potential offers related to merchants that are not currently under contract, but there is a high probability that they could be under contract based on a calculated probability to close. Probability to close represents a probability of a merchant committing their inventory, such as signing a contract and maybe generated based on a regression that takes into account, but not limited to, a lead source, such as for example a "warm lead" versus a "cold call", quality of the lead source, merchant attributes, stage of close, interface time, talk time, past feature history data, past feature performance(s), high prior satisfaction, an upcoming expiration of an offer, whether the merchant is a new or existing customer, and/or whether the merchant has adopted other services. For example, a representative may have a higher probability to close if the offer in question is the same or similar to a past offer offered by the merchant. In the aforementioned instance, the probability to close may be above a threshold and the offer may be included in the available inventory.

Further description related to current inventory is found in U.S. Ser. No. 13/460,745, filed Apr. 30, 2012, and titled "SALES ENHANCEMENT SYSTEM", which is hereby incorporated by reference. Further description related to recurring inventory is found in U.S. Ser. No. 61/639,067, filed Apr. 26, 2012 titled "DEAL METER", which is hereby incorporated by reference.

External factor data may include similar data that may be used in generating a forecasted demand, including for example, past offer performance data, internal signal data, and/or external signal data. Past offer performance data may include, but is not limited to, specific categories and/or sub-category performance within a location and/or hyper-local region, as well as specific offer structure, offer type, and/or price range performance in one or more categories, sub-categories, locations, and/or hyper-local regions. Internal signals may include consumer, subscriber, and/or merchant feedback, such as surveys, velocity data related to specific transactions, consumer search data, and consumer click through data and/or the like. External signals may include third party search engine consumer search data, third party click through data, market data, consumer data, and/or merchant transaction data. Market data may include predicted market conditions or the like. Examples of predicted market condition information for a given market may include predicted population growth, predicted income growth, predicted inflation and predicted promotion system growth in a given location. The predicted market data may factor in demographic data and/or socio-economic data.

As shown in block 420 of FIG. 4, an apparatus, such as the promotional system 1410, may include means, such as the demand module 102, the processor 1402 or the like, for calculating an adjusted forecasted demand. In some examples, one or more adjustments based on offer diversity, portfolio mix, price mix, hyper-local constraints, prior performance, context information or the like may be made to the forecasted demand. For example, in an instance in which market data may indicate income growth, aging population, or the like in a location or hyper-local region, forecasted demand for particular virtual offers associated with corresponding income growth, aging or the like may be adjusted accordingly.

Further discussion related calculating offer diversity can be found in U.S. Ser. No. 61/709,623, filed Oct. 4, 2012, titled "MERCHANT SIDE CROSS-CATEGORY DEAL DIVERSITY", which is hereby incorporated by reference.

As shown in block 422 of FIG. 4, an apparatus, such as the promotional system 1410, may include means, such as the demand module 102, the processor 1402 or the like, for outputting a forecasted demand. In some example embodiments, outputting of the adjusted forecasted demand may include exporting the adjusted projected sales data to a spreadsheet document for display and organizing, storing the adjusted projected sales data to a memory for archiving and/or sending the adjusted projected sales data to a processor of the like for further use. It should be noted that even though the term "adjusted" is used, the forecasted demand may be equal to the adjusted forecasted demand and the projected sales data may be equal to the adjusted projected sales data if, for example, units of a specific offer are not available.

Forecasting Demand Using Search Feedback

In some embodiments, additionally or alternatively, a total demand may be calculated using, in part, consumer activity (e.g., consumer search data or user search data) to identify, for example, additional sales that may have occurred if adequate supply was available to purchase. For example, in an exemplary embodiment, consumer activity, such as performing a search or browsing through the website/app, may be used to infer an intent to buy a promotion if, for instance, an acceptable promotion were found (e.g., available for purchase). In some embodiments, to do this, the consumer search data may be captured, parsed, and/or classified. For example, consumer search data may be captured in the form of text, characters, or the like input by a consumer or, in some examples, in the form of a browsing pattern.

Subsequently, in order to identify relevant promotions, it may be useful to make a determination of the location (e.g., geographical area), merchant, and/or category of product, service, or experience to which a requested promotion may be associated with. As such, in some embodiments, one or more classifiers (e.g., one or more location specific classifiers, one or more category specific classifiers, one or more merchant specific classifiers, or the like) may be queried, the query result used to determine an association to one or more of a location, category, or merchant of the consumer request (e.g., what type of promotion is requested and a location where the promotion is to be redeemed). In some embodiments, each of one or more classifiers may be a trainable classifier adapted using a supervised learning method, each classifier may be associated with the particular location, category, merchant or the like and adapted based on a training data set.

In general, the consumer search data may be used to determine one or more of a location (e.g., a city, neighborhood, zip code or the like) and/or a category of a product, service, or experience, a merchant, or the like for a promotion or in the context of real time demand, an identification pair.

FIG. 6A is a block diagram showing an exemplary search feedback system for receiving consumer search data and providing searched attributes associated with a location (e.g., location specific data) and/or with a category (e.g., category specific data). As described earlier, "searched attributes" may be parts of a promotion to which the consumer search data is translated or converted to. For example, one or more of the location, category, or price range of a promotion tuple may be a searched attribute. In some embodiments, any particular characteristic or combination of characteristics may be captured, parsed and/or classifieds (e.g., merchants, price points, price ranges, subdivisions or the like). The depicted system 600 is configured to include a consumer search aggregation module 602 disposed in communication with a search system 626 and/or various client devices 624a and 624b, for example, via a network. The depicted consumer search aggregation module 602 may comprise a consumer search data receiver 604 configured to receive consumer search data from the search system 626, a search data database 606 configured to store the consumer search data, a consumer aggregation module 608 and a first database 610 for storing searched attributes associated with a category, and a location aggregation module 612 and a second database 614 configured to store searched attributes associated with a location.

In some embodiments, consumer search data, such as in one exemplary embodiment, searched attributes associated with a category and searched attributes associated with a location, or in another exemplary embodiment, a first classification and a second classification, may be stored in a single database, such as for example, search data database 606. As such, as will be apparent to one of ordinary skill in the art in view of this disclosure, the depicted system may be configured to receive consumer search data, aggregate the search data by both category (or sub-category) and location (or hyper-location), in some examples in a single database having appropriate tags, store searched attributes associated with a category and a location, and provide the searched attributes to a demand forecasting module 116. Further discussion regarding utilizing consumer search data in demand forecasting may be found in U.S. patent application Ser. No. 14/106,203, filed Dec. 13, 2013, titled "METHOD, APPARATUS, AND COMPUTER PROGRAM PRODUCT FOR PROVIDING A SEARCH FEEDBACK SYSTEM", which is incorporated by reference in its entirety.

In some embodiments, the search system may be configured, for example, to receive consumer search data that is indicative of search performed by a consumer. The consumer search data may comprise, for example, one or more search terms and, in some embodiments, at least one of a consumer location or a consumer ID. In some embodiments, the search system may be configured, for example, to receive selection criteria for one of category of promotions or promotion type, search a promotion database for one or more results that match the selection criteria, arrange another of categories of promotions or promotion types based on the selection criteria, and communicate the one or more results and the arranged another of categories of promotions or promotion types for selection. In U.S. patent application Ser. No. 13/842,379, filed Mar. 15, 2013, titled "PULL-TYPE SEARCHING SYSTEM", which is hereby incorporated by reference in its entirety, a promotion searching system, method and computer program product are provided for receiving consumer search data and providing search results.

In some embodiments, the search data receiver 604 is configured to receive explicit and implicit data, including, for example, consumer login information, client device ID and other data indicative of a particular consumer or a particular hyper-location and provide such data to the search data database 606. For example, in some embodiments, consumer search data may be attached to or associated with a particular consumer or consumer ID or the like, by utilizing a system for tracking, storing and retrieving consumer related data. In U.S. patent application Ser. No. 14/039,473, filed Sep. 27, 2013, titled "METHOD, APPARATUS, AND COMPUTER PROGRAM PRODUCT FOR CONSUMER TRACKING", which is hereby incorporated by reference in its entirety, a promotion searching system, method and computer program product are provided for identifying, tracking, storing and retrieving of consumer related data in order to monitor or identify mobile application and web browser activity of a consumer.

The demand forecasting module 616 may be configured to access or receive searched attributes associated with a category and/or location and calculate a probability that a particular user would buy a particular offer in a particular time frame for at least a portion of the plurality of users and for each of the virtual offers.

In some embodiments, the demand forecasting module 116 may comprise an adjustment module, which may be configured to provide one or more adjustments based on the searched attributes, or in other embodiments, diversity, portfolio mix, price mix, hyper-local constraints, prior performance, context information or the like using, for example, a prior performance database and historical contextual information.

The demand forecasting module 616 may be configured to provide the calculated demand to a system configured for enabling the prioritization of promotions for sale to merchants and/or for offering to consumers. As such, the demanded promotions are generated and stored in a promotion inventory 620, and may then be offered back to the consumers via client device 624*a*. Client device 624*a* may then submit a search for a promotion or the like to the search system 620.

Generating Demand Based on Real Time Demand and Predicted Demand

FIG. 6B shows an example method, namely process 650, that may be executed by an apparatus for generating demand based on real time demand and predicted demand. For example, as discussed above, consumer activity may be used to determine a real time demand. Subsequently, in some embodiments, as will be discussed in more detail below, the real time demand may be summed with a predicted demand to determine a total demand. Similar to FIG. 4, as shown in block 6110 of FIG. 6B, an apparatus, such as the promotional system 1410, may include means, such as the processor 1402, the communications interface 1406 or the like, to generate a virtual promotion. The virtual promotion may comprise a combination of a category or sub-category, a location, and a price range.

Subsequently, as shown in block 6120 of FIG. 6B, an apparatus, such as the promotional system 1410, may include means, such as the processor 1402, the communications interface 1406 or the like, to calculate a probability that a particular consumer would buy the virtual offer in a predetermined time period. In some embodiments, the probability may be generated at least based on historical data related to the particular consumer and one or more related consumers. Once one or more probabilities are calculated, a predicted demand in, for example, units, may be calculated. As such, as shown in block 6130 of FIG. 6B, an apparatus, such as the promotional system 1410, may include means, such as the processor 1402, the communications interface 1406 or the like, to determine an estimated number of units to be sold for the virtual offer as a function of at least the probability, the estimated number of units representing a predicted demand.

Independent, serially, or in parallel to blocks 6110-6130, a real time demand may also be calculated. Thus, as shown in block 6140 of FIG. 6B, an apparatus, such as the promotional system 1410, may include means, such as the processor 1402, the communications interface 1406 or the like, to calculate a real time demand. In some embodiments, the real time demand may be generated based on a plurality of generated identification pairs for a predetermined time period. An identification pair may comprise a first classification (e.g., a category) and a second classification (e.g., a location). Further details related to the calculation of real time demand and the determination of each of the classifiers are further described with reference to FIG. 6C.

Once a predicted demand has been calculated and a real time demand has been calculated, the results of each may be summed to determine a total demand. Accordingly, as shown in block 6150 of FIG. 6B, an apparatus, such as the promotional system 1410, may include means, such as the processor 1402, the communications interface 1406 or the like, to determine, using a processor, total demand by summing the predicted demand and the real time demand.

With a total demand having been calculated, it may be helpful to distribute the total demand to, for example multiple hyper-locations and/or multiple sub-categories. In other words, because some promotions or virtual offers may be identified by or otherwise include high level locations or categories (e.g., a location that includes sub-locations or a category that includes sub-categories), the total demand may be distributed accordingly among the sub-locations (e.g., among the cities in a state, neighborhoods in a zip code or the like) and/or among the sub-categories. Additionally or alternatively, the distribution among hyper-locations and/or sub-categories may be performed on the real time demand.

In some embodiments, the predicted demand may be sales velocity driven and forecasted for all combinations of service, location, and price range, with some portion of services forecasted at the subdivision level and some distance-independent services forecasted at a division level. The real time demand may be added to the predicted demand forecast structure and distributed per a current distribution of units across price points. Example demand adjustments (recent sales, recently closed deals, actively purchased inventory) may then be applied. In some embodiments, the promotion and marketing system may then match the consolidated demand forecast with a merchant inventory, apply metrics such as sales value score, which may be a function of one or more of a merchant quality score, a merchant value score, a risk potential, a probability to close and a time to close, and provide the highest scoring merchants to, for example, sales representatives. As such, in some embodiments, because for example, some promotions or virtual offers include similar locations and categories as others and only vary on price, real time demand for one or more 'identification pairs' may be distributed among two or more price points.

As such, as shown in block 6160 of FIG. 6B, an apparatus, such as the promotional system 1410, may include means, such as the processor 1402, the communications interface 1406 or the like, to distribute the real time demand across one or more predetermined price points. As shown in block 6170 of FIG. 6B, an apparatus, such as the promotional system 1410, may include means, such as the processor 1402, the communications interface 1406 or the like, to distribute the real time demand across a plurality of hyper-local regions in an instance in which the second classification comprises a region that contains two or more hyper-local regions. As shown in block 6180 of FIG. 6B, an apparatus, such as the promotional system 1410, may include means, such as the processor 1402, the communications interface 1406 or the like, to distribute the real time demand across a plurality of sub-categories in an instance in which the first classification comprises a category that contains two or more sub-categories In some embodiments, the apparatus may be configured to access and/or consider historical data to determine a distribution across a given range of categories or services. For example, the apparatus may receive 1,000 searches for 'massage' over particular time period. A predetermined percentage of the real time demand subsequently calculated may be distributed to the identification pair comprising the primary deal service (e.g., 'massage—full body' may be the primary PDS in the massage header). Furthermore, based on historical data, a second percentage of the real time demand may be distributed to one or more additional identification pairs (e.g., those comprising 'Massage—Swedish', 'Massage—Hot Stone', etc.).

Furthermore, in some embodiments, the promotion and marketing system may be configured to account for seasonality of services. For example, while prior search volumes may typically be representative of future search volumes, seasonality of services may affect which (e.g., a predetermined time period) past search volume may affect particular future search volumes. For instance, a large proportion of searches in October were for "Tour—Haunted House" may not be expected to indicate the same in November. An example seasonality matrix may be applied to appropriately meter the demand forecast for seasonal services Utilizing Consumer Search Data for Generating Real Time Demand As discussed earlier with reference to block 6140 of FIG. 6B, a real time demand may be calculated using consumer activity (e.g., consumer search data or user search data) to identify, for example, additional sales that may have occurred if adequate supply was available to purchase. FIG. 6C shows an example method that may be executed by one or more machines for utilizing consumer search data for generating a real time demand indication. The following discussion provides an example embodiment where a real time demand may be determined by capturing user search data from, for example, user activity (e.g., user input data entered into a search engine, user searches on website/app or by monitoring browsing through a website/app).

As shown in block 6205 of FIG. 6C, an apparatus, such as the promotional system 1410, may include means, such as the processor 1402, the communications interface 1406 or the like, to access user search data, the user search data generated by a user interacting with a promotion and marketing service to identify a requested promotion. User search data may be captured in the form of text and/or characters input by a consumer or, in some examples, additionally or alternatively, in the form of a browsing pattern. In some examples, two primary pieces of information may be received from each search, at varying levels of specificity: (1) where (e.g., a location) the user is looking for a promotion. This may be a division (Chicago), neighborhood (Wicker Park), specific zip code (60647), specific address, or the like; and (2) what (e.g., a category, sub-category, a service, an experience, a specific merchant or the like) the user is looking for. In some embodiments, this may be a category ("food"), subcategory ("restaurants"), service ("pizza"), or specific merchant ("lou malnati's"). In some embodiments, the information may be misspelled ("midevil times") or not promotion related ("My Groupons").

Subsequently, in some embodiments, the user search data may be classified into a particular location or category of service, product, or experience in the taxonomy to be useful in approximating demand. For example, in an exemplary embodiment, the user search data or searched attributes associated therewith, may be determined to be semantically related to a particular service if the service-specific classifier corresponding to that service generates a positive output in response to input of a data representative of the user search data. In some embodiments, each classifier is a trainable classifier that has been adapted based on a training data set of exemplary data representing exemplary terms previously determined to be semantically related to particular service categories.

Accordingly, as shown in block 6210 of FIG. 6C, an apparatus, such as the promotional system 1410, may include means, such as the processor 1402, the communications interface 1406 or the like, to determine, using a processor, a first classification of the user search data by parsing the user search data into one or more terms. As shown in block 6215 of FIG. 6C, an apparatus, such as the promotional system 1410, may include means, such as the processor 1402, the communications interface 1406 or the like, to apply one or more terms within the user search data to a search index. In some embodiments, a first classification may be configured to generate a mapping from the one or more terms within the user search data to at least one of a service or merchant.

In some examples, the classifiers may only cover a portion of searches or user search data, whereas, remaining user search data may be irrelevant to one or both of the location, category, or merchant classifiers. In some embodiments, the promotion and marketing system may be configured to increase the accuracy of merchant search classification by leveraging other external sources. For example, the classifier may count a search for 'Statesville' as a service (e.g., a service related to 'academic course' due to there being several schools that match the search term 'Statesville'), or because the top result on an external site or in an external database is for the Haunted House, this information may be used for more accurate categorization of specific merchant searches. In some embodiments, the promotion and marketing system may be configured for increasing accuracy merchant level search classification by using location and click data. For example, there are generic merchant names that could cover a variety of services (ex. 'Joe's', 'Pure') that may be accurately pinned to the correct merchant with location and click data Accordingly, as shown in block 6220 of FIG. 6C, an apparatus, such as the promotional system 1410, may include means, such as the processor 1402, the communications interface 1406 or the like, to generate the taxonomy search index, the taxonomy search index comprising a mapping of one or more terms with at least one category or sub-category defined by a taxonomy. The generation and utilization of the taxonomy search index is further described in reference to FIG. 6D. Additionally or alternatively, as shown in block 6225 of FIG. 6C, an apparatus, such as the promotional system 1410, may include means, such as the processor 1402, the communications interface 1406 or the like, to generate the merchant search index, the merchant search index comprising a mapping of one or more terms to at least one merchant. Generation and utilization of the merchant index is further described with reference to FIG. 6E.

In some embodiments, the user search data may be utilized to determine a location, such as for example, a requested redemption location. As shown in block 6230 of FIG. 6C, an apparatus, such as the promotional system 1410, may include means, such as the processor 1402, the communications interface 1406 or the like, to determine, using the processor, a second classification of the user search data. In some embodiments, the second classification identifies a requested redemption location for the requested promotion. In some embodiments, location specific data may be generated by extracting one or more searched attributes associated with a location from the consumer search data.

As shown in block 6235 of FIG. 6C, an apparatus, such as the promotional system 1410, may include means, such as the processor 1402, the communications interface 1406 or the like, to generate an identification pair for the search data that is representative of a promotion tuple, the identification pair comprising the first classification and the second classification. In some embodiments, an identification pair may comprise a location and a category. In some embodiments, the identification pair may be indicative of one or more promotions. For example, as described above, in some embodiments, the user search data may be received and a category specific data and location specific data may be extracted or otherwise identified.

In some embodiments, the apparatus may be configured to store data indicative of the number of times a particular promotion or virtual offer is requested or otherwise identified by user search data. For example, a running tally of searches that may be associated with one or more particular promotions or identification pairs may be kept. In some embodiments, each search or each instance of received user search data may be associated with one or more promotions, virtual offers, identification pairs, or the like. In some embodiments, depending on the category specific data (e.g., depending on the category, sub-category, service(s), merchant(s) or the like associated with the consumer search data), a particular location(s) or distance(s) may be implicated, thus forming relevant identification pairs. For example, some categories, sub-categories, services, and merchants implicate more or less local locations (e.g., a division or zip code versus a neighborhood or street). For example, a search for 'hot air balloons' may be received with a latitude and longitude pairing that may be reverse geo-coded to a location (e.g., a city, state, zip code) whereas if the search were for 'pizza', a hyper-location (e.g., a particular neighborhood) may be necessary as pizza restaurants are much more ubiquitous than hot air balloon experiences.

As shown in block 6240 of FIG. 6C, an apparatus, such as the promotional system 1410, may include means, such as the processor 1402, the communications interface 1406 or the like, to aggregate a plurality of generated identification pairs for a predetermined time period. As shown in block 6245 of FIG. 6C, an apparatus, such as the promotional system 1410, may include means, such as the processor 1402, the communications interface 1406 or the like, to generate a real time demand indication for a geographic area by ranking the first classification of the plurality that have a second classification within the geographic area. As shown in block 6250 of FIG. 6C, an apparatus, such as the promotional system 1410, may include means, such as the processor 1402, the communications interface 1406 or the like, to display the real time demand indication.

As shown in block 6255 of FIG. 6C, an apparatus, such as the promotional system 1410, may include means, such as the processor 1402, the communications interface 1406 or the like, to receive a latitude longitude pair generated at the time the user search data is received. In other words, the user search data may be received with an associated latitude and longitude pair. This latitude longitude pair may then be used to determine a location and/or hyper location. Accordingly, as shown in block 6260 of FIG. 6C, an apparatus, such as the promotional system 1410, may include means, such as the processor 1402, the communications interface 1406 or the like, to assign a hyper location region based on the latitude longitude pair. In some embodiments, other indicators, such as a zip code, IP address, location information associated with a user profile, or the like may be used for location.

In some embodiments, the apparatus may be further configured to receive and/or identify division-level searches and/or distance independent searches. For example, a portion or a percentage of searches may be default searches where the user does not change the location or division already populated in, for example, the search "bar." For example, while this could mean that a user in Chicago wants to actively search in the Chicago-Downtown subdivision (zip code 60604), it may also mean that they are searching for services in the broader area (e.g., 'Tour—Haunted House' in the surrounding areas), or want to further filter after their initial search. In some embodiments, these searches may be assigned to the division, and in other embodiments, the apparatus may disregard or eliminate default searches if they are replaced by a more specific geographic search for the same term. In some examples, the apparatus may record the distance of each result and each purchase in the search record such that where to allocate the demand from division-level searches may be analyzed.

In some examples, distance independent services may include searches for services that users are willing to travel for (e.g., skydiving, haunted house) and may not mapped or associated with a hyper-location or a subdivision, but instead be applied to the overall division. Once the consumer search data is received, demand may be calculated using a taxonomy that describes services offered by a promotion and marketing service. An example current classifier may attempt to match the search to a merchant name and extrapolate the primary service that the merchant offers. Determination of a promotion area for one or more promotions is further described with reference to FIG. 6K.

The promotion and marketing system may be further configured to consider additional context. In some examples, the promotion and marketing system may aggregate services of a searched merchant as part of the demand for that service. In some embodiments, the promotion and marketing system may include merchant search data into a merchant quality score for that specific merchant. In some embodiments, searches for specific services, subcategories or categories (ex. 'Food', 'Massage') may be run through a merchant classifier and/or top level searches may be handled separately from specific merchant searches, such that consumer search data from top level searches may be distributed across one or more services belonging to that subcategory or category.

Generation of a Taxonomy Search Index and a Merchant Search Index

In some embodiments, each of the classifiers may be a trainable classifier that is adapted using supervised learning or unsupervised learning. For example, in some embodiments, a separate binary classifier may be trained for each of a plurality of locations, each of a plurality of categories of products, services, experiences or the like, and each of a plurality of merchants. Specifically, in some embodiments, positive examples for each classifier may be sampled from terms (e.g., from for example, searched attributes) annotated as relevant to the location, category, or merchant associated with the classifier, including high level locations and categories and/or more specific locations and categories, and in some embodiments, negative examples may be sampled from those terms annotated as relevant to the parent of the classifier's location or category but not relevant to the classifier's location or category. For example, when training a classifier for Austin, positive examples may be sampled from the terms annotated as relevant to Austin, East Austin, North Austin, Allandale, etc., and negative examples may be sampled from the terms annotated as relevant to Texas but not Austin (including Houston, Dallas, etc.). Subsequently, when training a classifier for North Austin, positive examples may be sampled from the terms annotated as relevant to North Austin, Allandale, etc., and negative examples may be sampled from those terms relevant to Austin but not North Austin (including East Austin, etc.).

Accordingly, FIGS. 6D and 6E show example methods that may be executed by one or more machines for utilizing a search index, and in particular a taxonomy search index to determine one or more services, products, experiences, or the like from the user search data, a merchant search index to determine a merchant, respectively, in accordance with some embodiments discussed herein. As shown in block 6310 of FIG. 6D, an apparatus, such as the promotional system 1410, may include means, such as the processor 1402, the communications interface 1406 or the like, to input a service corpus, the service corpus comprising one or more terms and one or more services defined by a taxonomy. In some embodiments, the corpus may be related to categories, sub-categories, experiences or the like.

As shown in block 6320 of FIG. 6D, an apparatus, such as the promotional system 1410, may include means, such as the processor 1402, the communications interface 1406 or the like, to analyze one or more click events in the promotion and marketing system. In some embodiments, the one or more click events may be received in response to displaying one or more promotions that correspond to the one or more terms. In some embodiments, the one or more click events identify a selected promotion.

As shown in block 6330 of FIG. 6D, an apparatus, such as the promotional system 1410, may include means, such as the processor 1402, the communications interface 1406 or the like, to identify one or more services for the selected promotion. As shown in block 6340 of FIG. 6D, an apparatus, such as the promotional system 1410, may include means, such as the processor 1402, the communications interface 1406 or the like, to generate a mapping between the one or more terms and the one or more services. Additionally or alternatively, an apparatus, such as the promotional system 1410, may include means, such as the processor 1402, the communications interface 1406 or the like, to generate category specific data from the user search data. In some embodiments, the category specific data may be generated by extracting one or more searched attributes associated with at least one of a category, a sub-category, a service, an experience, or a specific merchant from the user search data.

Turning next to FIG. 6E, an example method is shown that may be executed by one or more machines for utilizing a search index, and in particular a merchant search index, in accordance with some embodiments discussed herein. As shown in block 6350 of FIG. 6E, an apparatus, such as the promotional system 1410, may include means, such as the processor 1402, the communications interface 1406 or the like, to input a merchant corpus, the merchant corpus comprising one or more terms and one or more merchants that are capable of offering at least one of goods, services or experiences.

As shown in block 6360 of FIG. 6E, an apparatus, such as the promotional system 1410, may include means, such as the processor 1402, the communications interface 1406 or the like, to analyze one or more click events in the promotion and marketing system, the one or more click events received in response to displaying one or more promotions that correspond to the one or more terms, wherein the one or more click events identify a user selected promotion. As shown in block 6370 of FIG. 6E, an apparatus, such as the promotional system 1410, may include means, such as the processor 1402, the communications interface 1406 or the like, to identify one or more merchants that are offering the selected promotion. As shown in block 6380 of FIG. 6E, an apparatus, such as the promotional system 1410, may include means, such as the processor 1402, the communications interface 1406 or the like, to generate a mapping between the one or more terms and the one or more merchants.

Assigning a Hyper Location

FIG. 6F shows an example method that may be executed by one or more machines for assigning a hyper location using the latitude longitude pair generated at the time of user search data, in accordance with some embodiments discussed herein. For example, the latitude and longitude pair may be reverse geocoded to a particular location. For example, the latitude and longitude pair may be reverse geocoded to a zip code, which, in some embodiment, may then be assigned to a geographic subdivision or hyper-location. Hyper-local subdivisions may be defined, in some examples, by locating commercial centers with a high concentration of merchants and/or aggregating surrounding subscribers. Location specific data may include one or more of a state, a city, a metro area, a zip code, a specific street or address, a corner, etc.

Accordingly, as shown in block 6410 of FIG. 6F, an apparatus, such as the promotional system 1410, may include means, such as the processor 1402, the communications interface 1406 or the like, to receive a latitude longitude pair generated at the time of the user search data. As shown in block 6420 of FIG. 6F, an apparatus, such as the promotional system 1410, may include means, such as the processor 1402, the communications interface 1406 or the like, to compare the one or more terms to a location index, wherein the location index is trained based on one or more geographical identifiers of a geographic area. For example, similar to FIGS. 6D and 6E, the location index may be a trainable classifier that is adapted using supervised learning. For example, in some embodiments, a separate binary classifier may be trained for each of a plurality of locations.

Accordingly, as shown in block 6430 of FIG. 6F, an apparatus, such as the promotional system 1410, may include means, such as the processor 1402, the communications interface 1406 or the like, to determine that at least one of the one or more terms contains a geographical identifier. Subsequently, as shown in block 6440 of FIG. 6F, an apparatus, such as the promotional system 1410, may include means, such as the processor 1402, the communications interface 1406 or the like, to assign a hyper location region as the redemption location based on the geographical identifier.

Modifying Real Time Demand

FIG. 6G shows an example method that may be executed by one or more machines for modifying the real time demand in accordance with a conversion rate, in accordance with some embodiments discussed herein. In some examples, the demand prediction algorithm may use the same or similar signals as real time demand, thus, in some embodiments, double counting may be performed. As such, in some embodiments, double counting may be avoided. Accordingly, in some embodiments, a benchmark conversion rate may be identified (e.g., the historical conversion rate in areas with good supply). This may be calculated, for example, using a percentile, such as the 75th percentile conversion rate, of one or more subdivisions in a peer group for each identification pair over, for example, a predetermined period (e.g., a three month period). Alternatively, in some embodiments, a benchmark conversion rate may also be applied to the number of searches to yield the number of units that may have been purchased with adequate supply. Then, in some examples, the actual purchases may be subtracted to yield net additional demand due to unfilled searches.

Accordingly, as shown in block 6450 of FIG. 6G, an apparatus, such as the promotional system 1410, may include means, such as the processor 1402, the communications interface 1406 or the like, to identify a benchmark conversion rate. The identification of the benchmark conversion rate is further discussed with reference to FIG. 6H. Subsequently, as shown in block 6460 of FIG. 6G, an apparatus, such as the promotional system 1410, may include means, such as the processor 1402, the communications interface 1406 or the like, to compare the real time demand to the benchmark conversion rate to set a modified real time demand that identifies a quantity of units that would have been purchased had the units been available. For example, if a benchmark conversion rate for, for example, conversions on searches for 'pizza' convert at 5% in, for example, areas having an at least minimum threshold of supply relative to the demand, and if there are 1000 monthly 'pizza' searches in downtown San Francisco that convert at 3.5%, it may be estimated or determined that the net additional demand at 1000*(5%−3.5%)=15 units. In other words, a benchmark conversion rate may be selected by determining one or more other subdivisions in a given peer group and identifying at least one other subdivision with the highest reasonable conversion. In some embodiments, identifying the subdivision with the highest reasonable conversion comprises identifying a subdivision with enough supply and searches to ensure the conversion rate is not an outlier. Further discussion of use of a benchmark conversion rate is discussed below with reference to FIG. 6H. Additionally, the promotion and marketing system may further be configured to, as may be done with a sales velocity-based demand forecast, an exponential weighted moving average (EWMA) may be applied, in some examples, to the search volume to fill supply ahead of growing trends and growth of search feedback, because, for example, a lag may be present due to the time a sales representative contacts a merchant to when a deal closes.

As such, as shown in block 6470 of FIG. 6G, an apparatus, such as the promotional system 1410, may include means, such as the processor 1402, the communications interface 1406 or the like, to identify an actual purchase quantity. As shown in block 6480 of FIG. 6G, an apparatus, such as the promotional system 1410, may include means, such as the processor 1402, the communications interface 1406 or the like, to modify the real time demand, wherein the real time demand is equal to the actual purchase quantity subtracted from the modified real time demand.

Determining a Conversion Rate

FIG. 6H shows an example method that may be executed by one or more machines for determining a benchmark conversion rate that considers factors such as travel times, historical sales data, sales velocity and the like to determine the likelihood a consumer will purchase a particular promotion in a particular area. The benchmark conversion rate may be used to set a conversion rate a promotion and marketing system may achieve for a given promotion should proper supply be stocked.

Accordingly, as shown in block 6510 of FIG. 6H, an apparatus, such as the promotional system 1410, may include means, such as the processor 1402, the communications interface 1406 or the like, to access user search data, the user search data generated by a user interacting with a promotion and marketing service to identify a requested promotion. As shown in block 6520 of FIG. 6H, an apparatus, such as the promotional system 1410, may include means, such as the processor 1402, the communications interface 1406 or the like, to generate an identification pair for the search data, the identification pair comprising an identification of a promotion tuple and a location (e.g., a geographic subdivision). As shown in block 6530 of FIG. 6H, an apparatus, such as the promotional system 1410, may include means, such as the processor 1402, the communications interface 1406 or the like, to generate a search velocity based on the generated identification pairs.

As shown in block 6540 of FIG. 6H, an apparatus, such as the promotional system 1410, may include means, such as the processor 1402, the communications interface 1406 or the like, to access a conversion rate for the promotion tuple in a plurality of other location (e.g., different geographic subdivisions). As shown in block 6550 of FIG. 6H, an apparatus, such as the promotional system 1410, may include means, such as the processor 1402, the communications interface 1406 or the like, to setting a benchmark conversion rate for a promotion tuple. In some embodiments, the benchmark conversion rate may correspond to the conversion rate of a subdivision of the plurality of subdivisions based on the subdivision satisfying at least one of a search velocity threshold, a prime merchant metric threshold or a conversion rate threshold. In some embodiments, the benchmark conversion rate may correspond to the conversion rate of a subdivision of the plurality of subdivisions based on the subdivision satisfying an inventory threshold. For example, in some embodiments, the benchmark conversion rate may correspond to the conversion rate of a subdivision of the plurality of subdivisions based on the subdivision satisfying a prime merchant metric threshold in order to determine whether any subdivision has at least one high quality merchant. Subsequently, in some embodiments, using the information, the apparatus may be configured to make a determination about whether the conversion rate may be improved and, additionally or alternatively by how much the conversion rate may be improved in those subdivisions meeting the prime merchant metric threshold.

As shown in block 6560 of FIG. 6H, an apparatus, such as the promotional system 1410, may include means, such as the processor 1402, the communications interface 1406 or the like, to identify one or more providers in the subdivision having the benchmark conversion rate. As shown in block 6570 of FIG. 6H, an apparatus, such as the promotional system 1410, may include means, such as the processor 1402, the communications interface 1406 or the like, to transmit a classification of the one or more providers to a lead generation module.

As shown in block 6580 of FIG. 6H, an apparatus, such as the promotional system 1410, may include means, such as the processor 1402, the communications interface 1406 or the like, to analyze a particular location (e.g., a subdivision). As shown in block 6590 of FIG. 6H, an apparatus, such as the promotional system 1410, may include means, such as the processor 1402, the communications interface 1406 or the like, to generate two or more regions within the subdivision based on one or more of subscriber density or population density.

In some embodiments, the process described above with reference to FIG. 6H may be utilized in a process for generating promotions for redemption by consumers. Further discussion regarding generation of promotions for redemption by consumers may be found in U.S. patent application Ser. No. 14/038,629, filed Sep. 26, 2013, titled "AUTOMATED DEAL GUIDE STRUCTURE IDENTIFICATION", which is incorporated by reference in its entirety Additionally or alternatively, in some embodiments, since inventory may be sparse for many identification pairs, the identification pairs, as discussed above, comprising an identification of a promotion tuple and a location (e.g., geographic subdivision), the promotion and marketing system may be configured for establishing a benchmark conversion rate for each of one or more identification pairs to, for example, estimate the conversion rate that may be achieved in a given identification pair if that identification pair were stocked with adequate supply. In some embodiments, the benchmark methodology for an identification pair may use the maximum conversion rate from one of two approaches: (a) average conversion rate for the promotion tuple (or PDS) in peer group; or (b) 75th percentile tuple of all conversion rates for the promotion tuple (or PDS) across all subdivisions in a Peer Group. For example, to determine a benchmark conversion rate for {Pizza, City-West (Chicago)}, in this embodiment, the promotion and marketing system may be configured to consider the conversion rates for Pizza in all subdivisions for all other Group 1 cities, such as (New York, San Francisco, Los Angeles). In one example, a certain benchmark conversion rate for pizza (e.g., 5%) may be selected across all Peer Group 1 subdivisions since it may be, for example, the 75th percentile conversion rate of all subdivisions in that Peer Group and may be greater than the average conversion rate.

However, for an identification pair in which search data is sparse, the 75th percentile may actually be low, and in those instances the method may select (a) as the benchmark conversion rate. In some examples, there are two primary next steps for updating the benchmark conversion rate selection. The promotion and marketing system may be configured to (1) transition to using subdivision peer groups instead of division peer groups, for example, to better normalize for subdivisions that are similar to each other; and (2) update the benchmarking algorithm to seek identification pairs that may have a given set of supply conditions (e.g., at least 1 TMC/Top Quintile MVR/9,10 Hero Score "high quality" merchant).

For illustrative purposes, the supply condition of one high quality merchant from above will be used. In some examples, the primary means to select a benchmark would go from the "75th percentile of all conversion rates for a service across subdivisions in a peer group" to "the identification pair closest to the 100th percentile with at least 1 high quality merchant and a minimum # of searches across peer group subdivisions"

For example, in the following exemplary embodiment, using the supply condition as described above, the promotion and marketing system may be configured to select the 92nd percentile benchmark, an identification pair that is closest to 100% and meets the inventory minimum.

The additional example of a minimum level of inventory in a given identification pair may also comprise a fallback method to handle groups of subdivisions that have no identification pairs with the minimum inventory requirement. For example, if there aren't any identification pairs that meet a predefined threshold, the promotion and marketing system may be configured to fall back geographically to include subdivisions from the next lowest and highest peer groups.

| Subdivision | Conversion Rate | Percentile | # 'A' Merchants |
|---|---|---|---|
| SD2 (LA) | 0% | 8% | 0 |
| SD1 (NY) | 0.5% | 17% | 0 |
| SD1 (LA) | 1% | 25% | 0 |
| City-West (Chicago) | 1.5% | 33% | 0 |
| SD2 (SF) | 2% | 42% | 0 |
| SD3 (SF) | 2.5% | 50% | 1 |
| SD2 (LA) | 3% | 58% | 0 |
| SD3 (LA) | 4% | 67% | 2 |
| SD1 (Chicago) | 5% | 75% | 0 |
| SD1 (SF) | 8% | 83% | 1 |
| SD3 (NY) | 18% | 92% | 1 |
| SD2 (NY) | 90% | 100% | 0 |

The average search conversion rate per merchant at the benchmark conversion rate may be used to assess how many units each merchant in a given node will sell, and thus the number of merchants required to fill a given node. For instance, in the above example, the benchmark subdivision was selected as follows:

| Subdivision | Conversion Rate | Percentile | # 'A' Merchants |
|---|---|---|---|
| SD3 (NY) | 18% | 92% | 1 |

If there were 3 merchants in this benchmark subdivision:

| Merchant | Class | Searches | Sales | Conversion Rate |
|---|---|---|---|---|
| Merchant 1 | A | 1000 | 130 | 13% |
| Merchant 2 | B | 1000 | 40 | 4% |
| Merchant 3 | C | 1000 | 10 | 1% |
| Total | | 1000 | 180 | 18% |
| Average Merchant Conversion Rate | | | | 6% |

When this 6% conversion rate is applied to the following subdivision:

| Subdivision | Searches | Unit Gap | # of Merchants |
|---|---|---|---|
| City-West (Chicago) Pizza | 10000 | 10000 * 18% (benchmark) − 10000 * 10% (actual) = 1800 − 1000 = 800 units gap | 800/(10000 * 6%) = 800/600 = 1.33 merchants = 2 merchants to fill |

Alternatively or additionally, the promotion and marketing system may be configured to utilize the 95th percentile search conversion rate of merchants in the subdivision peer group to assess how many units an A merchant in a given node may sell, and thus the number of A merchants required to fill a given node. In some embodiments, the median may be used to assess how many B Merchants would reach the benchmark and report on both.

For instance, if the A Merchant conversion rate for Pizza in Peer Group 1 was 15% and the B Merchant conversion rate is 5%:

| Subdivision: | Searches | Unit .Gap | # of Merchants |
|---|---|---|---|
| City-West (Chicago) Pizza | 10000 | 10000 * 18% (benchmark) − 10000 * 10% (actual) = 1800 − 1000 800 units cap | 800/(10000 * 13%) = 800/1300 = 0.61 = 1 A Merchant OR 800/(10000 * 4%) = 800/400 = 2 = 2 B Merchants |

Identifying Whether there Exists Sufficient Inventory to Meet Demand

In some embodiments, consumers may buy or be expected to buy an amount of existing inventory or supply from one or more different locations based on the fact that people may travel. As such, inventory from a different location may be factored into the demand calculation of a particular location or sub-location. To avoid overstocking or at least ensure adequate stocking of promotions, the following process may be used to address the likelihood a consumer may travel for some promotion types. FIG. 6I illustrates an example method that may be executed by one or more machines for identifying whether there is sufficient inventory to meet existing demand.

As shown in block 6610 of FIG. 6I, an apparatus, such as the promotional system 1410, may include means, such as the processor 1402, the communications interface 1406 or the like, to identify a real time demand for a promotion tuple at a geographic location.

As shown in block 6620 of FIG. 6I, an apparatus, such as the promotional system 1410, may include means, such as the processor 1402, the communications interface 1406 or the like, to determine, using a processor, a promotion radius for the promotion tuple.

As shown in block 6630 of FIG. 6I, an apparatus, such as the promotional system 1410, may include means, such as the processor 1402, the communications interface 1406 or the like, to identify one or more promotions offered by a promotion and marketing service that comprise at least the category and the price information of the promotion tuple.

As shown in block 6640 of FIG. 6I, an apparatus, such as the promotional system 1410, may include means, such as the processor 1402, the communications interface 1406 or the like, to determine a promotion area for the one or more promotions. In some embodiments, the apparatus may be configured to determine a geographic target, a zip code, or the like.

As shown in block 6650 of FIG. 6I, an apparatus, such as the promotional system 1410, may include means, such as the processor 1402, the communications interface 1406 or the like, to determine whether the total demand for the promotion tuple at the geographic location is satisfied. In some embodiments, the total demand may be satisfied in an instance in which the geographic location is within the promotion area or radius for the one or more promotions.

Determining a Promotion Area

FIG. 6J shows an example method that may be executed by one or more machines for determining the promotion area for the one or more promotions. As discussed above with reference to FIG. 6I, the total demand may be satisfied in an instance in which the geographic location is within the promotion area for the one or more promotions. FIG. 6J provides determination of the promotion area.

While consumers are willing to travel, that willingness to travel is not unlimited. That is, a consumer may be willing to travel to some places and not others. Accordingly, in order to avoid over-stocking inventory, demand that may be met with inventory within the limits of this travel may, in some embodiments, be considered. The amount of inventory from a second location that may be considered in whether demand is met a first location may be determined by distance, direction, and/or a specific location. In other words, a consumer may be less and less likely to travel further and further for a promotion, may be more or less willing to travel in a particular direction, or may be more or less willing to travel to specific locations. As shown in block 6710 of FIG. 6J, an apparatus, such as the promotional system 1410, may include means, such as the processor 1402, the communications interface 1406 or the like, to determine a travel probability that a consumer that is associated with a first subdivision would travel to a second subdivision. In some embodiments, the first subdivision and/or the second subdivision may be identified by zip codes, neighborhoods, counties, cities, or the like. In some embodiments, natural or artificial landmarks may separate subdivisions and/or identify subdivision boundaries. As is discussed below in more detail, travel propensity may be category/service specific (e.g., people from the north suburbs may be willing to drive to the city of Chicago for food & drink and activities but not anything else).

Additionally or alternatively, in some embodiments, a method for determining whether a demand is fulfilled with existing supply may comprise determining an effective location for a promotion based on historical purchase data. In some embodiments, the effective location of the promotion may include one or more different locations from which consumers travel from to purchase the promotion. The determination may further include identifying whether a demand for the promotion in a particular location is met by adding (1) a portion of inventory of the promotion in the particular location and (2) a portion of an inventory of the promotion whose effective location encompasses or includes the particular location associated with the promotion. Accordingly, an apparatus, such as the promotional system 1410, may include means, such as the processor 1402, the communications interface 1406 or the like, for determining an effective location for a promotion based on historical purchase data. The effective location of the promotion may include one or more different locations from which consumers travel from to purchase the promotion (i.e., a promotion area).

As shown in block 6720 of FIG. 6J, an apparatus, such as the promotional system 1410, may include means, such as the processor 1402, the communications interface 1406 or the like, to compare the travel probability to a predetermined threshold. A second subdivision satisfying the predetermined threshold may be considered travel worthy. As such, as shown in block 6730 of FIG. 6J, an apparatus, such as the promotional system 1410, may include means, such as the processor 1402, the communications interface 1406 or the like, to identify that the second subdivision is travel worthy in an instance in which the travel probability satisfies the predetermined threshold.

As shown in block 6740 of FIG. 6J, an apparatus, such as the promotional system 1410, may include means, such as the processor 1402, the communications interface 1406 or the like, to identify that the promotion geographic location is in the second subdivision. As shown in block 6750 of FIG. 6J, an apparatus, such as the promotional system 1410, may include means, such as the processor 1402, the communications interface 1406 or the like, to determine whether the total demand for the promotion tuple at the geographic location is satisfied. In some embodiments, the total demand may be satisfied in an instance in which the geographic location is within the promotion area for the one or more promotions and the second subdivision is travel worthy. As shown in block 6760 of FIG. 6J, an apparatus, such as the promotional system 1410, may include means, such as the processor 1402, the communications interface 1406 or the like, to adjust the total demand based on the travel probability.

Additionally or alternatively, in some embodiments, the effective location may include one or more of (1) distances and/or (2) directions, (3) a specific location or (4) a corresponding set of locations (e.g., people in Newark may travel to Manhattan or Hoboken for pizza, people from Hoboken will travel to Manhattan but not Newark, people from Manhattan wouldn't travel to either).

In an example embodiment, the promotion and marketing system may be configured to determine the effective deal radius for each of one or more promotion tuples or identification pairs. An effective deal radius may be the $k^{th}$ percentile distance of users in the subdivision to the deals within the identification pair, promotion tuple or promotion they purchased. The parameter k can be set at, for example, 75% to start and tightened to, for example, 50% (median distance) if a stricter definition of fill-rate is desired, in some examples. The effective deal radius for each identification pair, promotion tuple or promotion may be determined using historical deal purchase data with the following considerations, in some examples: (1) implement fallback to average effective deal radius within the division or peer group when sufficient data is not available at an identification pair level; (2) outlier removal—filtering out of hero deals from the above calculation to ensure that the effective deal radius is not skewed by them.

Using this example, the fill-rate may be defined, in some examples, as follows: For each identification pair, there must be active deals within the effective deal radius of that identification pair to consider the demand filled. While this example approach takes into account the propensity of users to travel, it does not consider the direction of travel. For example, users in Schaumburg, Ill. might be willing to travel to Downtown Chicago for a particular promotion tuple but not to Naperville, Ill. even though Naperville, Ill. might be within the effective deal radius for <Schaumburg, category, pds>. However, direction of travel may also be considered.

In some embodiments, for each identification pair, the apparatus may be configured for determining a set T of subdivisions that are considered travel-worthy. As such, in some embodiments, for each subdivision S in a given division D, the promotion and marketing system may be configured to determine p(N|S, category, pds), which may be defined as the probability that a user in subdivision S will buy a promotion from a merchant in subdivision N in the given identification pair. Note that in this embodiment, it is assumed here that p(S|S, category, pds)=1. In some embodiments, p(S|S, category, pds) may be other values. The promotion and marketing system may be further configured to calculate the set T as those subdivisions N from above where p(N|S, category, pds) is above a certain threshold.

Using one of the approaches described above, the fill-rate may be defined as follows: For each identification pair, there must be active deals within the travel-worthy subdivision set T for that tuple to consider the demand filled. The promotion and marketing system may then be configured to determine the minimum number of promotions of a particular identification pair required to consider the demand fulfilled. In some embodiments, the minimum number of promotions required may be a function of the demand and the ability of the available promotions to satisfy that demand. For Example, consider that the demand for a particular identification pair is D units. This demand may be filled by the promotions available in the current inventory or via new promotions that will be closed. For promotions in the current inventory, the promotion and marketing system may be configured to calculate min(capacity, projected sales in the next month). Projected sales in the next month may be calculated using historical sales velocity of that promotion. For newly closed promotions, the promotion and marketing system may be configured to estimate the number of units of demand that can be fulfilled by the promotion based on historical sales of promotions within the same identification pair that have the same or similar (e.g., within a predefined threshold or within a predefined range) merchant quality score. The total projected demand fulfilled by current inventory and newly closed promotions must exceed the demand to consider the demand filled.

In some embodiments, an example incremental value may be considered. For example, the incremental value of closing the $(k+1)^{th}$ promotion in subdivision A versus the $(l+1)^{th}$ deal in subdivision B may be an important consideration given, for example, limited sales resources available to close new promotions.

In some embodiments, the promotion and marketing system may be configured to calculate an incremental value by determining the incremental bookings that a new promotion is projected to bring in based on the demand it will fulfill and the price point. The next promotion may be closed in the subdivision where the highest incremental booking may be realized. In some embodiments, the promotion and marketing system may be configured to factor in other considerations in determining the incremental value of a promotion, such as user search experience, reduction in the number of null searches, and/or improved user experience due to deal depth.

In some embodiments, the promotion and marketing system may be configured to consider (1) Price band—demand and propensity to travel might differ by price even within the same identification pair; (2) Avoid over-counting when considering how much of the demand for a particular identification pair is fulfilled by a particular promotion since that deal could fulfill multiple identification pair; and (3) Determining the number of merchants to prioritize based on the incremental value of each promotion.

Providing a Dashboard

FIG. 6K shows an example method that may be executed by one or more machines for providing a dashboard that allows users to see available data and trends in that data, such as varying fill rates, current demand gaps and the like. FIG. 6L shows an exemplary screenshot of the dashboard, in accordance with some embodiments discussed herein.

As shown in block 6810 of FIG. 6K, an apparatus, such as the promotional system 1410, may include means, such as the processor 1402, the communications interface 1406 or the like, to determine a total demand for one or more promotion tuples using, for example, the method shown in FIG. 6B. As shown in block 6820 of FIG. 6K, an apparatus, such as the promotional system 1410, may include means, such as the processor 1402, the communications interface 1406 or the like, to identify a current supply, for example, using the method shown in FIG. 6I. In some embodiments, the current supply may be identified in an instance in which the current supply is usable to satisfy the total demand.

As shown in block 6830 of FIG. 6K, an apparatus, such as the promotional system 1410, may include means, such as the processor 1402, the communications interface 1406 or the like, to determine one or more demand gaps based on a difference between the total demand and the current supply. As shown in block 6840 of FIG. 6K, an apparatus, such as the promotional system 1410, may include means, such as the processor 1402, the communications interface 1406 or the like, to provide a first view in a lead dashboard, the first view comprising at least one of a total demand, current supply or one or more demand gaps. As shown in block 6850 of FIG. 6K, an apparatus, such as the promotional system 1410, may include means, such as the processor 1402, the communications interface 1406 or the like, to receive a selection of one of a plurality of granularities of either a location or category. As shown in block 6860 of FIG. 6K, an apparatus, such as the promotional system 1410, may include means, such as the processor 1402, the communications interface 1406 or the like, to refine the first view into a second view. In some embodiments, the second view may comprise additional granularity of at least one of a total demand, current supply or one or more demand gaps when compared to the first view.

As shown in block 6870 of FIG. 6K, an apparatus, such as the promotional system 1410, may include means, such as the processor 1402, the communications interface 1406 or the like, to provide one or more of (a) fill rate summary, (b) demand gaps, (c) supply data, or (d) lead data for each of one or more categories or locations. As shown in block 6880 of FIG. 6K, an apparatus, such as the promotional system 1410, may include means, such as the processor 1402, the communications interface 1406 or the like, to generate a fill rate based at least in part on historical sales data for a promotion tuple.

In some embodiments, the dashboard may create an interface allowing various people to view and/or utilize specific information considering the available data and trends in that data, such as varying levels of location and parts of the service hierarchy. For example, the dashboard may be configured such that a user, such as a senior manager/executive may identify the largest supply gaps across the country—cut by any combination of category/header/PDS and country/division/subdivision for use in implementing strategies to fill the largest gaps across categories/geographies. In another example, the dashboard may be configured such that a user, such as a DSM or CP, may identify the largest supply gaps for a market and the status of the accounts that could fulfill those gaps for use in following up with the sales representatives that own those accounts. In another example, the dashboard may be configured such that a user, such as a member of a software development/Sales Ops team, may monitor and/or ensure that quality merchants that could fulfill the largest supply gaps are getting assigned out and ranked highly or that end-to-end QA on the algorithm may be performed. In another example, the dashboard may be configured such that a user, such as a member of merchant research, may identify areas with the highest lead gap, so that more merchants may be identified. In another example, the dashboard may be configured such that a user, such as a senior manager/executive, may understand the trend of fill rates, demand, and search conversion for use in prioritizing and/or allocating resources among competing initiatives to proactively shape and optimize the marketplace.

In some embodiments, providing a dashboard for the use cases described above may include a method to compute and scale a fill rate metric across multiple levels of geography and/or taxonomy. In some examples, the demand for a given identification pair may be estimated using search data, historical sales, and the probability of users from other subdivisions to travel to that division, for that promotion (e.g., product, service, or experience). Projected sales from existing promotions of the identification pair may then be used to compute a fill rate for the pair as min (Projected Supply, Projected Demand)/Projected Demand, which may then be aggregated to any level of geography or taxonomy.

In some embodiments, the dashboard may be configured to include the flexibility to cut the data across varying levels of granularity for both geography and level of taxonomy, the ability to provide an end to end view of the Demand Gap→Deal Supply→Lead Supply chain, the intelligence to consistently point users towards the areas of greatest opportunity, the speed to quickly move from cut to cut as discoveries are made. In some embodiments, the dashboard may comprise one or more of at least four primary sections. For example, the dashboard may include (1) a map view to visualize the divisions/subdivisions of greatest opportunity and further filter the existing data; (2) Fill Rate Summary to understand the trend of fill rate from week to week; (3) Demand Gap Data to provide information on the identification pairs with the highest opportunity; (4) Supply Data to provide information on the existing deals that satisfy the projected pull demand; and (5) Lead Data to provide information on the merchants we could close to fulfill the demand.

As such, a method may be provided comprising providing at least one of a first view configured to indicate a difference between demand and supply. In some embodiments, providing the first view may comprise receiving a selection of one of a plurality of granularities of either a location or category, accessing a corresponding demand and a corresponding supply, displaying an indication of the difference between the corresponding demand and the corresponding supply. (e.g., looking at map of Chicago, the neighborhoods may be colored based on gap size; or looking at looking at hierarchal structure of food and dining, sub-categories colored based on gap sizes).

In some embodiments, the first view comprises a map view. In some embodiments, the providing of the first view further may comprise, preceding the reception of a selection of a location granularity, displaying a first map view, and allowing selection of a selection of a further granularity.

In some embodiments, the method may further comprise providing one or more of (a) fill rate summary, (b) demand gaps, (c) supply data, or (d) lead data for each of one or more categories or locations. Providing the fill rate summary may comprise accessing a plurality of demands over a predetermined time period at predetermined interval (e.g., weekly for the last 8 weeks) and corresponding supply data, displaying an indication of the difference between the corresponding demand and the corresponding supply data over the predetermined time period. Providing the supply data comprises providing an indication of an amount of existing supply from one or more locations that satisfies demand. (e.g., it may helpful to see if demand is being satisfied by supply from other locations). Providing demand gaps comprises providing information related to unmet demand for one or more location and category pairs In some embodiments, the dashboard may comprise one or more of a demand, supply and leads section. Each section may be configured to provide one or more of summary statistics and/or a ranked and exportable list of one or more of Demand Gap information, promotion and/or supply information, and lead information. For example, demand gap information may include (1) summary metrics, such as a total demand, total supply, total gap; and/or (2) an exportable list, such as demand gap pairs sorted by total unit gap. Demand gap information may include one or more of the following fields: a subdivision, primary deal service (e.g., a category, sub-category, service, or experience), projected demand, projected supply, and projected gap. With demand gap information, additional functionality may be included, such as, for example, because the demand gaps may be a primary driver of insight, the demand gap information may be displayed anywhere on the dashboard, (e.g., a prominent place within the dashboard) and/or also function as a filter for both geography and taxonomy.

In some embodiments, the supply information may include (1) summary metrics, such as total promotions, total projected units; and/or (2) an exportable list (e.g., deals sorted by total forecasted sales); Supply information may include one or more of the following example fields: ID, merchant name, subdivision, and projected units. In some embodiments, lead information may include (1) summary metrics such as total leads, total owned leads, total approved leads, estimated lead gap; and/or (2) an exportable list that includes for example, leads sorted by sales value. Lead information may include one or more of the following exemplary fields: an account ID, account owner, merchant status, last contacted date, sales value.

Process for Supply Identification

FIG. 7 shows an example method, namely process 700, that may be executed by one or more machines (some examples of which are discussed in connection with FIGS. 1, 2, and/or 3) to identify merchants, in accordance with some embodiments discussed herein. As shown in block 702 of FIG. 7, an apparatus, such as the promotional system 1410, may include means, such as the supply ID module 104, the processor 1402, the communications interface 1406 or the like, for receiving a forecasted demand.

As shown in block 704 of FIG. 7, an apparatus, such as the promotional system 1410, may include means, such as the supply ID module 104, the processor 1402, the communications interface 1406 or the like for accessing current offer inventory. As shown in block 706 of FIG. 7, an apparatus, such as the promotional system 1410, may include means, such as the supply ID module 104, the processor 1402, or the like for calculating a residual forecasted demand. In some example embodiments, the residual demand calculation module 224 may be configured to receive a forecasted demand that is input via the demand input module 220 and calculate a residual demand by subtracting existing inventory from the forecasted demand. In one embodiment, existing inventory may be at least one of inventory related to offers closed within a predetermined time period (e.g., one day prior), offers closed within a second predetermined time period (e.g., one month), existing offer inventory adjusted for quality, which is described below, and recurring inventory. In some example embodiments, only those offers in inventory matching each of the category, sub-category, location, and price or price range may be subtracted from the demand. Alternatively or additionally, predetermined substitutions may be made (e.g., where one or more of category, sub-category, location, hyper-local region, and price range may be different) and the predetermined substitutions may specify specific allowable substitution for particular categories, sub-categories, locations, hyper-local regions, and/or price ranges. In some examples, similar categories or sub-categories or any other facet of the virtual offer may also reduce demand.

In some example embodiments, specific guidelines may be utilized in determining which particular offers in a current inventory may be considered. In some example embodiments, when determining residual demand, only those offers in current inventory that are available for an entire time frame the forecasted demand was calculated for may be considered. For example, in an instance in which a first virtual offer comprises a first demand and the first demand was calculated for specific time frame, such as for example one month, only those offers in current inventory available for the entire specific time period, e.g., one month, are considered in calculating a residual demand. Alternatively or additionally, when an offer is in current inventory, a determination may be made to calculate how many units of the offer are likely to be sold, using for example prior purchase history, other historic data, current offers and/or the like, and only that number calculated may be utilized when calculating residual demand. For example, if 200 units of an offer featuring "personal training sessions" in a local area are available in local inventory, but based on prior purchase history, only 100 are determined as likely to sell, residual demand may be calculated using the 100 units likely to sell instead of the 200 units in the current inventory.

In one embodiment, a dynamic deal optimization (DDO) score may be calculated. In order to facilitate calculation of a DDO score, the apparatus may be configured to access data related to a limited performance of an offer. The limited performance may be comprised of performance related to a limited sub-set of consumers. The limited sub-set of consumers may be for example 30,000 out of 1,000,000. The limited sub-set of consumers may be distributed in a predetermined fashion among consumers based on age, gender, location, hyper-local region, or the like. The apparatus may then be configured to access, calculate, and/or determine a conversion rate among a cross section of the limited sub-set of consumers. For example, a conversion rate may be calculated for females. Additionally or alternatively, a conversion rate may be calculated for one or more cross sections, such as for example, males between 22-30 years of age. Based on the conversion rate, the promotions may be offered to more of particular consumers. The apparatus may further be configured to calculate a portion of existing inventory that may be applied to demand in order to calculate residual demand based on a conversion rate. In one embodiment, the apparatus is configured to calculate a projected amount of the existing inventory that may sell based on the conversion rate and utilize the projected amount in a residual demand calculation.

In some example embodiments, penalties may be applied to offers in current inventory based on a time frame that they have been available or sitting in inventory. Penalties may also be applied based on prior exposure or seasonality also. For example, 400 units of offer for "American Food" with a sub-category "Burgers" may be in current inventory. The 400 units may be utilized in calculating residual demand, or the 400 units may be discounted based on the time spent in inventory (e.g., 20% per 3 months), prior exposure (e.g., 20% discount for each month it's been featured), and/or seasonality (20% discount in the summer). After applying the penalties, less than the 400 available units may be considered when calculating residual demand.

Alternatively or additionally, in some example embodiments, before calculating a residual demand based on current inventory, the merchants in the current inventory are provided to the sales value score calculation module 228. In an instance in which a sales value score for a merchant satisfies a predetermined threshold or ranking, then the inventory provided by that merchant would be considered in calculating residual demand. In another example embodiment, in an instance in which a sales value score for a merchant does not meet a predetermined threshold or ranking, the inventory provided by that merchant would not be considered in calculating residual demand.

As shown in block 708 of FIG. 7, an apparatus, such as the promotional system 1410, may include means, such as the supply ID module 104, the processor 1402, the communications interface 1406 or the like for accessing a merchant database. As shown in block 710 of FIG. 7, an apparatus, such as the promotional system 1410, may include means, such as the supply ID module 104, the processor 1402, or the like for identifying merchants to fill the residual demand. In an instance in which the merchant is able to provide good, services and/or experiences as defined by the merchant demand, the merchant may be identified as able to fill the residual demand. In some examples, the one or more merchants may be determined based on a global listing of merchants stored in a merchant database. As such, to the extent the merchant provides a good, service or experience that matches or is related to a demanded offer, the demanded offer may be assigned or otherwise linked to that merchant. Each merchant may therefore be assigned zero or more demanded offers as defined by the residual demand.

In one embodiment, an apparatus, such as the promotional system 1410, may be configured to identify new and/or additional goods, services, and/or experiences a merchant may provide. The apparatus may be configured, for example, to identify a merchant website, a review web-site, and/or a good, service or experience specific website, and determine, from data found on the website, one or more new or additional good, services, and/or experiences a merchant may provide. For example, a hotel may be identified to be able to fill a portion of demand related to "travel and tourism" or the like. The apparatus may then identify websites that identify the hotel as a subject, such as for example the hotel's website, a review website, a review website related to travel, tourism or hotels, or the like. The apparatus may then identify information on the website related to other services, goods, or experiences the hotel may be able to provide. For example, the hotel's website may provide information for breakfast, dinner and/or drinks or a review website may include a review about a spa service offered by the hotel. In one embodiment, additional virtual offers may be associated with a merchant where new or additional goods, services, and/or experiences are identified. In another embodiment, information relating new or additional goods, services, and/or experiences identified as able to be provided by a particular merchant may be stored in the merchant database.

As shown in block 712 of FIG. 7, an apparatus, such as the promotional system 1410, may include means, such as the supply ID module 104, the processor 1402 or the like for calculating a sales value score for one or more merchants. The sales value score may be a function of one or more of a merchant quality score, a merchant value score, a risk potential, a probability to close and a time to close, each discussed in more detail below. In some example embodiments, a sales value score may be calculated using a research ranking, current stage in the sales funnel, the source of the merchant, category information, location information, what, if any, historical relationship each merchant has with the promotional system 1410, or any combination thereof. In one embodiment, for providers who have offered promotions in the past, prior performance data may also be utilized. For example, total bookings, number of activations, refunds, customer satisfaction, or the like may be used.

In some example embodiments, one or more of a merchant value, a merchant quality score, a risk potential, a probability to close and a time to close are used to calculate a prioritization score. The prioritization score is then used, along with demand information, such as a number of units of a virtual offer and expected revenue to compute the sales value score.

As shown in block 714 of FIG. 7, an apparatus, such as the promotional system 1410, may include means, such as the supply ID module 104, the processor 1402 or the like for calculating a merchant value. The merchant value may be calculated by estimating a value of a next offer the merchant may offer, a chance of working with the merchant (e.g., probability of closing), a value of future offers with the merchant (e.g., all offers in next month, 6 month, year or the like), the chance of closing one or more of the future offers, a merchant goodwill score, a relationship cost, and an ongoing value. The merchant goodwill score may represent a "wow" factor and may be calculated as a function of consumer's reaction to offering a service. This factor may be measured by, for example, likes, reviews above a predetermined threshold on any one or more of review websites. The merchant goodwill score, alternatively or additionally may represent a value of future recommendation from the merchant, which may be generated through for example, word of mouth, direct relationships, and/or via leveraging the relationship to approach and/or close other merchants. One example formula that may be utilized in calculating a merchant value may be Merchant Value=(probability of closing merchant)*(Value of next offer)+(probability of closing subsequent offers)*(Value of subsequent offers)+mechant_goodwill+ongoing_value−relationship_cost As mentioned above, merchant value may be a function of an offer value. In some example embodiments, offer value may indicate or be a function of one or more of profit, discounts used, number of activated consumers, number of re-activated consumers, refunds, engagement value, net goodwill.

The engagement value may be a value that can be associated to users who (1) click on an offer from a particular merchant, (2) visit an offer page and don't purchase, (3) search for the offer, (3) tell their friends about the promotion system, (5) "like" the offer on social media. Net goodwill may be indicative of (1) good experiences and/or (2) bad experiences. One example formula that may be utilized in calculating an offer value is:

Offer Value=profit−discounts+#activations*activation value+# of reactivations*reactivation value−refunds+engagement_value+net_goodwill In one example embodiment, offer value may be relative to a quantity sold, units sold to new consumers, units refunded and/or the like.

As shown in block 716 of FIG. 7, an apparatus, such as the promotional system 1410, may include means, such as the supply ID module 104, the processor 1402 or the like for calculating a merchant quality score. In some example embodiments the merchant quality score is generated based on a predicted value of how well (e.g. revenue, new business, etc.) a merchant will do on an offer and the customer reaction (e.g. based on historical data, similar results, demand etc.) to the particular offer. FIG. 11 shows an example method that may be used to calculate a merchant quality score.

As shown in block 718 of FIG. 7A, an apparatus, such as the promotional system 1410, may include means, such as the supply ID module 104, the processor 1402 or the like for calculating a risk potential. Risk potential may be calculated based on a merchant return rate. For example, if a merchant return rate is 10%, the risk potential may be calculated to be greater than a merchant with a return rate of 2%.

As shown in block 720 of FIG. 7, an apparatus, such as the promotional system 1410, may include means, such as the supply ID module 104, the processor 1402 or the like for calculating a probability to close. In some example embodiments, probability to close may be calculated as a function of (1) stage in sales pipeline, e.g., not wanted, unknown, uncontacted, contacted, negotiating, contract sent, closed; (2) source of merchant, e.g., cold call, web to lead, other; (3) history e.g., ran a promotion, ran a feature using a different promotional system, has not run; (4) category; (5) sub-category; or some combination thereof. Probability to close may be calculated based on a particular time window (i.e. 30 days or 60 days). In some example embodiments, probability to close may be calculated using a mathematical tool, such as a logistical regression model.

As shown in block 722 of FIG. 7, an apparatus, such as the promotional system 1410, may include means, such as the supply ID module 104, the processor 1402 or the like for calculating a time to close. In some example embodiments, time to close may be a function of (1) the average time to close for each of a plurality of stages of a sales pipeline; (2) stage in sales pipeline, e.g., not wanted, unknown, un-contacted, contacted, negotiating, contract sent, closed; (3) source of merchant, e.g., cold call, web to lead, other; (4) history e.g., ran a promotion, ran a feature using a different promotional system, has not run; (5) category; (6) sub-category; or some combination thereof. Alternatively or additionally, time to close may be calculated under the assumption that the merchant will be closed. In some example embodiments, time to close may be calculated using a mathematical tool, such as a logistical regression model.

Alternatively or additionally, business rules may be configured to override or otherwise adjust a merchant score. Business rules include, but are not limited to, does the merchant have an expiring offer (e.g. call regarding a re-feature), any contact from the merchant, did the merchant recently start an offer, is the merchant running offers in the market, is the merchant on a targeted list, is the merchant a former merchant, is the merchant on another list that is indicative of a positive or negative and/or the like. In some cases the business rules may be set based on a desire to attract new business, attract new consumers, increase margin, increase portfolio diversity and/or the like.

As shown in block 724 of FIG. 7, an apparatus, such as the promotional system 1410, may include means, such as the supply ID module 104, the processor 1402 or the like for prioritizing merchants. In some example embodiments, the one or more merchants may be prioritized by sales values score. As shown in block 726 of FIG. 7, an apparatus, such as the promotional system 1410, may include means, such as the supply ID module 104, the processor 1402 or the like for outputting a list of prioritized merchants. In some example embodiments, the supply ID module 104 transmits prioritization data to the assignment module 106. Alternatively or additionally, outputting of the merchant prioritization information may include exporting the data to a spreadsheet document for display and organizing, storing the data to a memory for archiving and/or sending the data to a processor of the like for further use.

Process for Lead Assignment

FIG. 8 shows an example method, namely process 800, that may be executed by one or more machines (some examples of which are discussed in connection with FIGS. 1, 2, and/or 3) to assign leads, in accordance with some embodiments discussed herein. In some example embodiments, leads are programmatically assigned so as to eliminate subjectivity and favoritism from the allocation process, reduce attrition, maintain established relationships between resources and merchants they have made contact with, properly plan for the capacity of each resource to maximize sales value, provide leads to resource best suited to close them (e.g., using specialization and capacity), continually grow each resource book of business and/or the like. In some example embodiments, sales resources may be provided a target that may be based on the % of that division's assets (accounts) that they own and a target for new leads. In another example embodiment, sales resources may be provided a target that may be based on the number of bounties to be collected by acquiring inventory from one or more marked. As such, a basic portfolio for a rep may include a number of merchants, based on an average of reps that a particular resource may handle, a set of new merchants, a portfolio mix of different categories, sub-categories or the like. In some examples, a new resource may be issued a set new resource basket.

As shown in block 802 of FIG. 8, an apparatus, such as the promotional system 1410, may include means, such as the assignment module 106, the processor 1402, the communications interface 1406 or the like for receiving prioritized merchant data. In some example embodiments, the lead assignment process 800 may receive one or more leads.

As shown in block 804 of FIG. 8, an apparatus, such as the promotional system 1410, may include means, such as the assignment module 106, the processor 1402, the communications interface 1406 or the like for receiving sales resource data. For example, process 800 may receive information related to salespersons responsible for closing contracts with merchants that offer services that fulfill at least a portion of the forecasted demand.

As shown in block 808 of FIG. 8 an apparatus, such as the promotional system 1410, may include means, such as the assignment module 106, the processor 1402 or the like for identifying capacity. In one embodiment, in order to facilitate the capacity calculation, the average number of unique providers contacted per "normal" day over a period of, for example two weeks, may be calculated and outliers may be excluded. The Lead Assignment module may place the highest value leads as high on a sales rep's list as possible relative to the number of unique merchant contacts they make, thus minimizing time to contact for the highest value leads. In some example embodiments, the promotional system 1410 is configured to identify or access data indicating a capacity of one or more sales resources. In one embodiment, the promotional system 1410 may be configured to track and/or store information related to each contact a sales resources makes or attempts to make (e.g., a phone call or email). The promotional system 1410 may also be configured to calculate sales resource activity data. For example, the promotional system 1410 may calculate a number of providers contacted per time period (e.g., 8 hours, day week or the like). The promotional system 1410 may also be configured to calculate, store, or track a moving average (e.g., a 10 day moving average) of number of providers contacted per predetermined time period. Additionally or alternatively, each of one or more sales resources may have a target number of providers to contact per predetermined time period that may be based on the type of sales resource (e.g., a sales representative, an email marketing system or the like). The promotional system 1410 may be configured to calculate, store, or track a number of providers contacted, a number of providers contacted per predetermined time period, a percentage of a target number of providers contacted per predetermined time and/or any of the preceding in a moving average format. In one embodiment, outlying data may be identified and adjusted for.

Alternatively or additionally, as shown in block 810 of FIG. 8 an apparatus, such as the promotional system 1410, may include means, such as the assignment module 106, the processor 1402 or the like for identifying experience of one or more sales resources. Alternatively or additionally, experience may be provided with respect to particular categories, sub-categories, locations, and/or hyper-local regions within which a sales resource has experience. Alternatively or additionally, experience may be indicated by a time measurement and/or a number of leads closed.

As shown in block 812 of FIG. 8, an apparatus, such as the promotional system 1410, may include means, such as the assignment module 106, the processor 1402 or the like for identifying expertise. In some example embodiments, the promotional system 1410 is configured to identify or access data indicating an expertise or an expertise score of one or more sales resources. Alternatively or additionally, experience may indicate categories, sub-categories, locations, and/or hyper-local regions within which a sales resource has expertise.

As shown in block 814 of FIG. 8, an apparatus, such as the promotional system 1410, may include means, such as the assignment module 106, the processor 1402 or the like for calculating an assignment probability number. In some example embodiments, an assignment probability number represents a probability that a sales resource will be randomly assigned to a next merchant in an assignment process. The assignment probability number may be calculated or assigned based on at least one of the associated capacity, the associated experience, the associated expertise, the associated merchant mix of a sales resource, or any combination thereof.

As shown in block 816 of FIG. 8, an apparatus, such as the promotional system 1410, may include means, such as the assignment module 106, the processor 1402 or the like for assigning merchant leads. In some examples, the process for assigning a merchant to a resource may include a weighted random allocation, in some examples, a weighted random allocation gives every resource a probability for receiving the new lead. In some example embodiments, assignment may be weighted based on a likelihood that a merchant will be contacted based on a daily capacity for a representative. For example, a merchant may be less likely to be added as $120^{th}$ on a list for a resource that averages 100 contacts per day. In further example embodiments, merchants may not be allocated to a resource, if that merchant was de-allocated from that resource due to inactivity. In some examples, a resource has a greater chance of receiving a merchant in an assignment list if the ordinal rank the merchant would fall within their call list within a specific time period. In other examples, the resource may be more likely to receive a merchant if they have fewer leads or have a deficit related to a portfolio mix. In some examples, the leads may be assigned to new reps if they are easier to close so as to reduce attrition. In other examples specialization or strength of existing relationship could cause a certain lead to be assigned to a specific resource. In some examples outside resources may also be used.

In one embodiment, supply sources are considered one at a time and assignment probability numbers are determined for each of one or more sales resources before making an assignment. FIG. 12 shows an example method for calculating and/or determining an assignment probability number for each of one or more sales resources. In one embodiment, sales resources are considered for each of one or more supply sources and an assignment probability number is calculated before each assignment. In another embodiment, assignment probability numbers are re-calculated once per specific time period, e.g., once per day. In one embodiment, once the assignment probabilities are calculated, each of one or more supply sources are assigned based on the calculated assignment probability numbers.

In some example embodiments, merchants may be de-allocated and/or re-assigned according to predetermined metrics. For example, a merchant may be re-assigned (1) if a sales resource has made no contact and/or has no activity with a merchant for a predetermined period of time, the predetermined period of time may be based on merchant information such as lead source; (2) if a sales resource has made no contact and/or made no activity within a predetermined period of time from a previous activity; and (3) if a sales resource has no traction activity (e.g., 5 minutes of contact) within a predetermined period of time. A merchant may also be reassigned if a sales resource has not closed a contract within a predetermined period of time, the predetermined period of time based on a merchant ranking A merchant may also be reassigned if a sales resource has closed a first contract, but has not closed a second contract within a predetermined period of time from expiration, the predetermined period of time based on a merchant ranking FIG. 13 shows an example method that may be executed to determine whether and when to de-allocate a supply source from a sales resource.

When re-assigning merchants, as opposed to assigning a new merchant to a sales resource, predetermined rules may be used. For example, if a merchant is de-allocated from a first sales resource, during re-allocation, the merchant may not be re-assigned to the first sales resource. In some example embodiments, a merchant may be re-assigned based on a position on a potential sales resource's prioritized list. For example, a merchant that would be second on a first sales resource's prioritized list may have a greater chance of being assigned to the first sales resource than a second sales resource where the merchant may be third or lower in priority. In one embodiment, when a provider is de-allocated, previous contact history information associated with the provider is stored and/or tracked and may be utilized in the re-allocation process. For example, in an instance in which a provider has responded poorly to sales resource contact attempts, an associated probability to close may be adjusted downward. In an instance in which a provider has responded poorly to a number of resource contact attempts, a method of contact and/or a type of sales resource may be adjusted (e.g., changing from sales representatives to email marketing team or changing from calling by phone to emailing). In one embodiment, in an instance in which a provider has responded poorly to a number of sales resource contact attempts, an associated probability to close may be affected to a point where the sales value calculation is lowered and the provider is not re-assigned. In another embodiment, in an instance where a provider has responded favorably to sales resource contact attempts, an associated probability to close may be increased. In one embodiment, the increase in probability to close may result in the provider being re-assigned to a different sales resource type or contact method (e.g., email to phone).

In one embodiment, prior activity information related to a provider may be utilized to determine if several sales resources have tried and failed to close them. In those cases, the provider may be moved to for example, a sales resource comprised of a team of experts who specialize in new approaches, or to an outside rep who can make an in person visit. The determination may be made based on a number of sales resources, for example sales representatives that have made unsuccessful calls. Additionally or alternatively, the provider may be not allocated for a predetermined time (e.g., "rested") and revived at a later point in time in case there is a change in management or circumstance.

As shown in block 818 of FIG. 8, an apparatus, such as the promotional system 1410, may be configured to generate one or more prioritized data, such as call lists, for each of one or more sales resources. For example, the prioritized data may include a prioritized call list unique to each individual representative. As shown in block 820 of FIG. 8, an apparatus, such as the promotional system 1410, may be configured to provide the prioritized call list to one or more sales resources.

As shown in block 820 of FIG. 8, an apparatus, such as the promotional system 1410, may be configured to receive merchant information updates and/or inventory information updates. For example, the assignment module 106 may receive information related to a call being placed, a contract being closed, a merchant declining participation, etc.

As shown in block 824 of FIG. 8, an apparatus, such as the promotional system 1410, may be configured to provide updated merchant information and/or updated inventory information. For example, the assignment module 106 may provide updated inventory information, such as for example a closed contract, to the demand module 102, which then may be used to update available inventory and thus, update the forecasted demand. In some example embodiments, promotional system 1410 may be updated dynamically each time a contract is closed. Alternatively, the promotional system 1410 updates daily. An updating process may include updating a current inventory list and merchant database, re-calculating a forecasted demand, re-adjusting a forecasted demand, re-calculating merchant score data, re-prioritizing merchants, updating sales resource information regarding capacity, expertise and/or experience, re-assigning leads, and/or re-generating prioritized calls lists.

Commissions

In some examples, the assignment module 106 may also provide a point or award structure to resources based a give point value to a merchant based on a merchant value (e.g., sales value score) and a difficulty to close (e.g. probability to close). Using the point values, resources may be provided with a tiered commission rate based on the point value thresholds. As such, the commission rewards can be viewed as a motivation or otherwise instant reward for closing an offer.

In some examples, the bounty or points may be assigned based on current needs and may be configured to dynamically change based on current priorities, inventories, mix and/or the like. In other cases, lower value merchants may rise based on changes in status, positive reviews or the like. Alternatively or additionally, the point values may remain static when with a particular merchant, but may change if the merchant is reassigned.

In some example embodiments, the point value is assigned based on currently expected bookings (e.g., current demand*price point), intrinsic merchant value, intrinsic probability to close, productivity and/or the like. For example, the merchant value may be multiplied by 1/probability to close and scaled using an exponential decay curve. Such a curve is chosen because if a merchant as 50% probability to close, then it will take the resource 2 merchants to close. As such, that merchant may have a lower point value when compared to a merchant with a 10% probability to close where it would take 10 merchants before that resources can close a single offer. In some example embodiments, point values assigned to a provider may be modified by the actual offer (e.g., offer structure) that is closed with a provider. For example, less efficient offer structures reduce the point values a sales resource may capture.

In some examples, based on the programmatically determined point values, commission rates may be assigned based on the percentage of points to target earned for a period. In some cases, the target may be changed based on amount of time in the system, previous month's performance and/or the like. In some example embodiments, additional points may be assigned based on closing of particular merchants, new merchants, high margin merchants and/or the like.

Sales Automation Pipeline Example

Figure 5A:
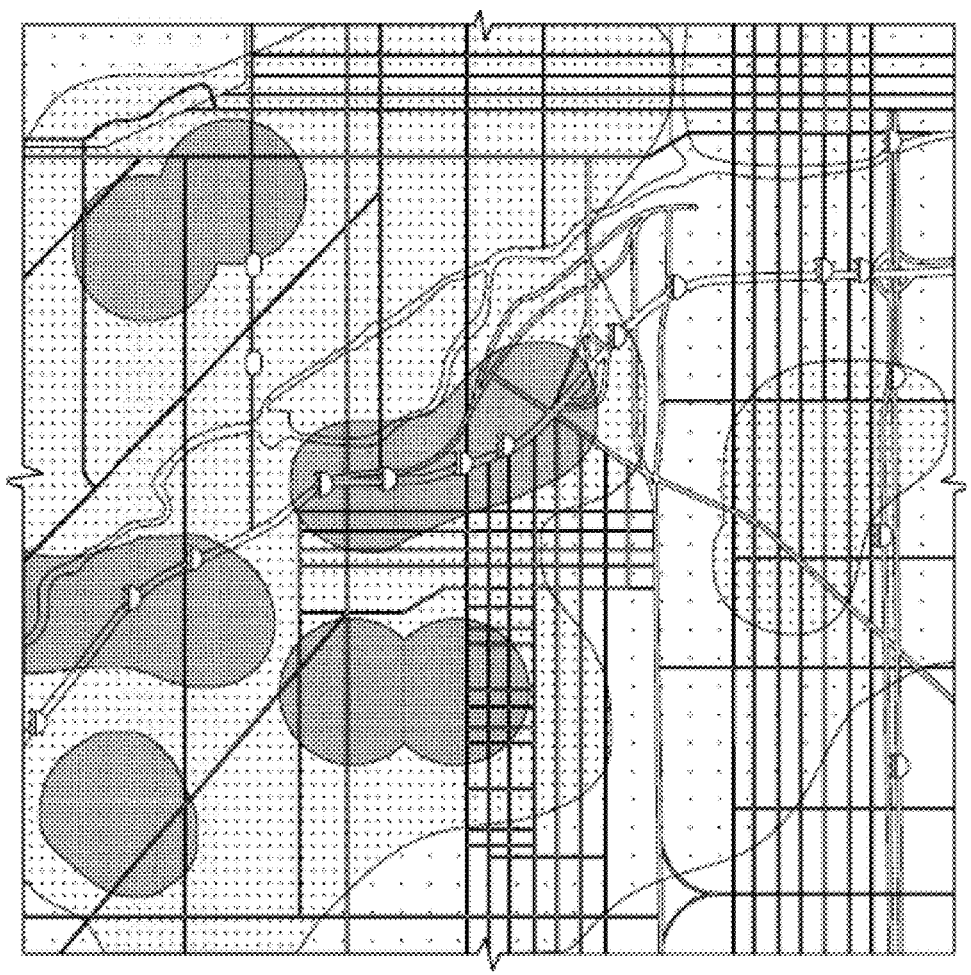
FIG. 5A-5D show example graphical user interface displays that may be presented by various components of systems in accordance with some embodiments discussed herein.

FIG. 5A shows an exemplary embodiment of the aggregation of a forecasted demand. As can be seen, a forecasted demand may be shown on a color coded map. Here, a forecasted demand for sushi in Chicago is shown. Hyper-local regions with higher levels of demand are shown in a darker color (e.g., red) while hyper-local regions with lower demand are shown in a lighter color (e.g., yellow). Demands of varying degrees are shown in color in between.

Figure 5B:
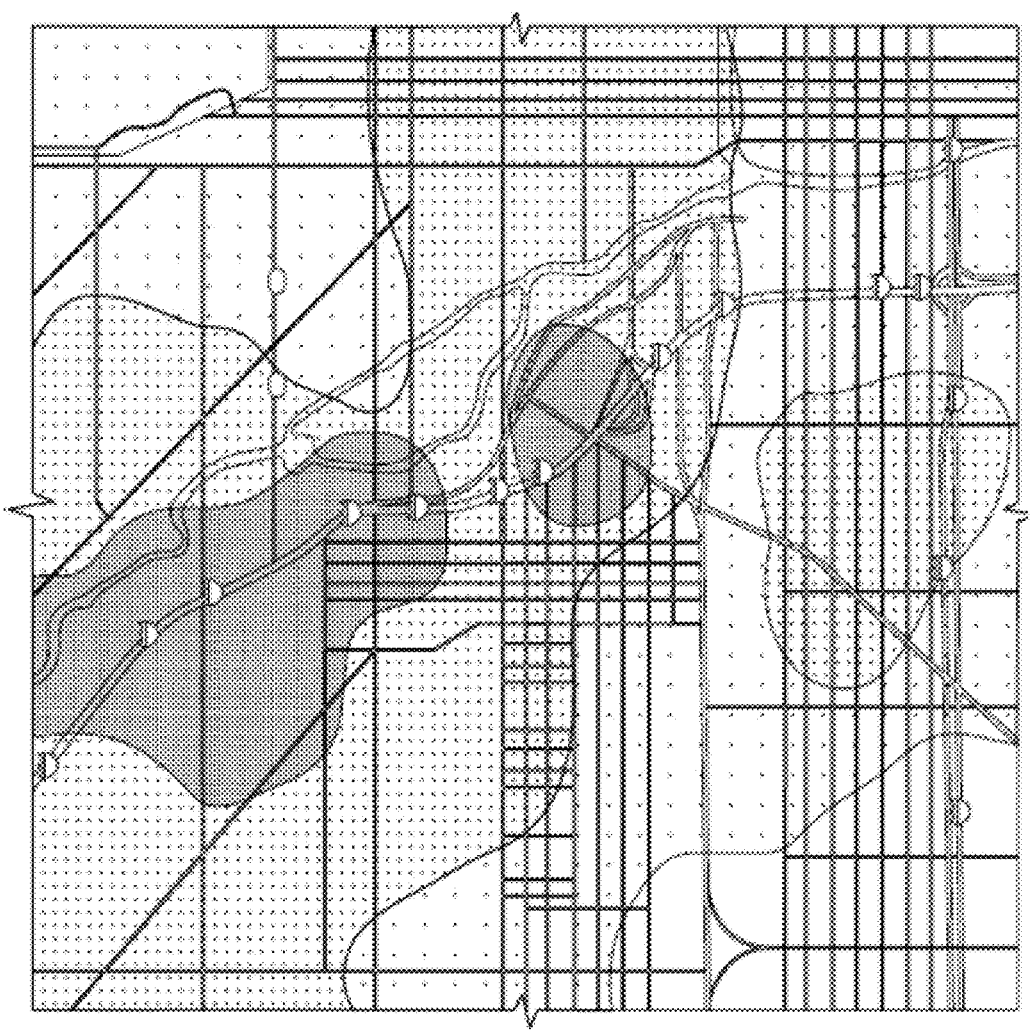

FIG. 5B shows an exemplary embodiment of the adjusted aggregation of a forecasted demand. As can be seen, an adjusted forecasted demand may be shown on a color coded map. Continuing from the example related to FIG. 6A above, FIG. 5B shows an adjusted forecasted demand for sushi in Chicago. Specifically, a forecasted demand map is shown after being adjusted to account for the existing units of sushi in inventory. The inventory or sushi may include sushi from merchants who have signed contracts for offers but have not yet offered an offer, offers that are open and have not yet expired and/or recurring offers that may be offered again. Hyper-local regions with higher levels of unmet demand may be shown in a darker color (e.g., red) while hyper-local regions with lower unmet demand may be shown in a lighter color (e.g., yellow). Unmet demand of varying degrees may be shown in colors in between.

Figure 5C:
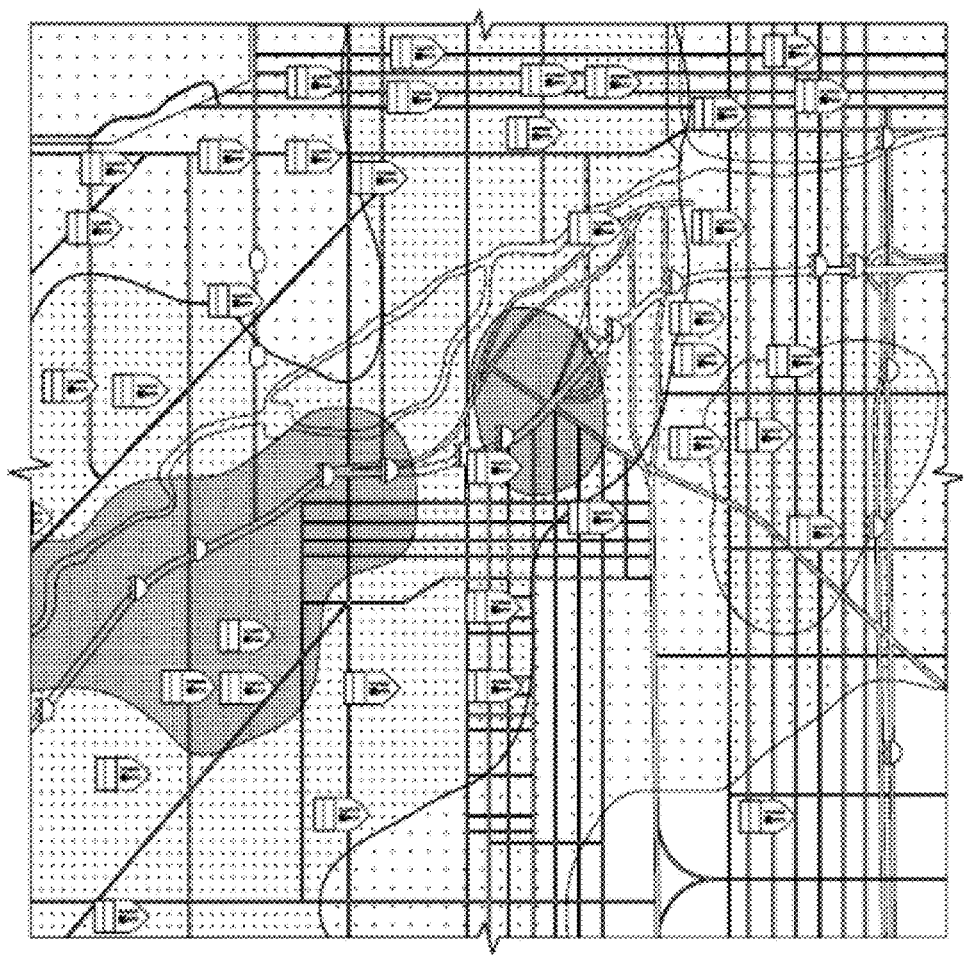

FIG. 5C shows an exemplary embodiment of block 710. As can be seen, merchants offering sushi in Chicago are identified. In some example embodiments, the information is shown overlaid onto the adjusted forecasted demand map. In some example embodiments, all merchants in a location are identified and added to a database with the products and/or services that the merchant offers. That database is then searched for the merchants that offer a specific product, in the example above, sushi.

Figure 5D:
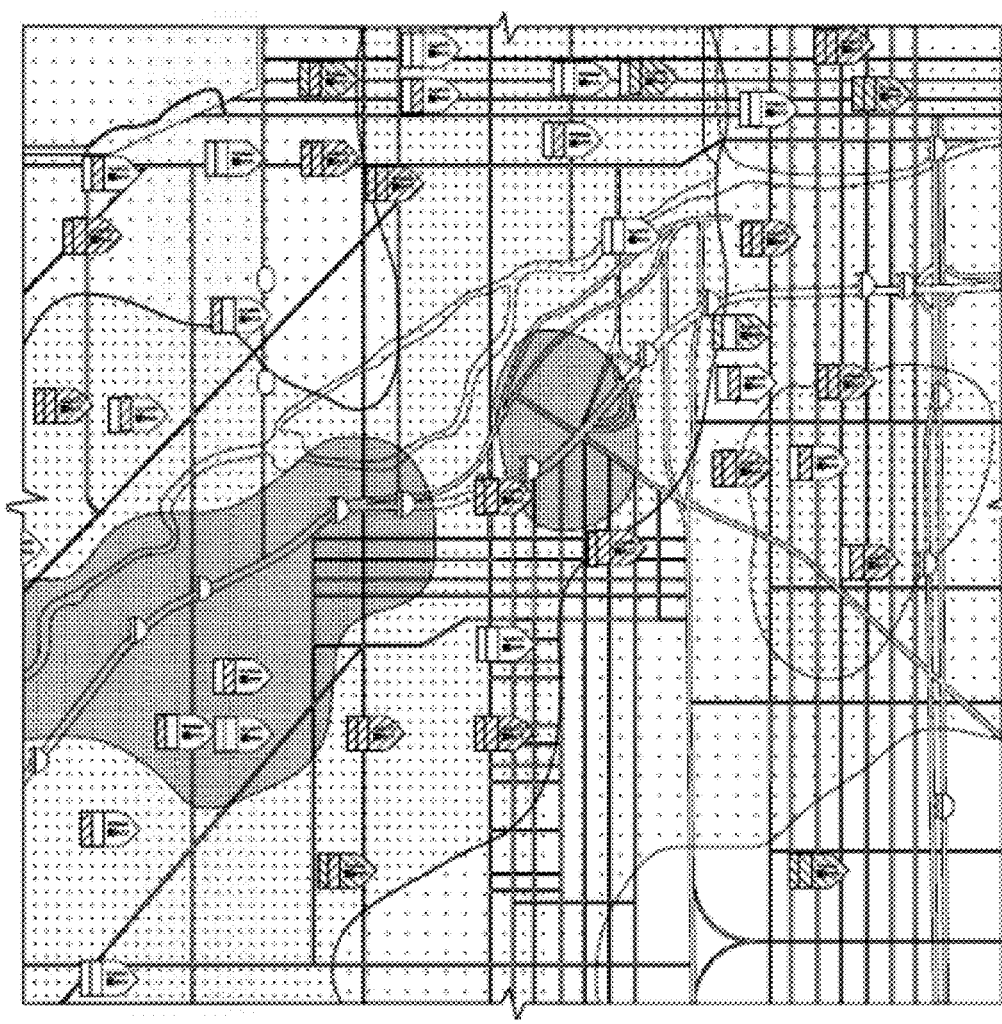

FIG. 5D shows an exemplary embodiment. Here, the identified merchants are ranked. In some example embodiments, the merchants are ranked using the adjusted forecasted demand, merchant value, merchant quality score, risk potential, probability to close, time to close and/or the like.

FIG. 9 shows an exemplary embodiment of a prioritized call list. In some example embodiments of the present invention, the prioritized call list utilizes the adjusted demand, the supply, the probability to close, and the merchant quality score. The prioritized call list may also provide any needed contact information including names, numbers, hours. The prioritized call list may further include one or more contact reasons which provide context to make the representative more effective. The prioritized call list may further provide a representative with a merchant rating, a required or suggested product/service and desired supply, a price range, and/or hyper-local region (e.g., 550+ units/month from $26-$50 for seafood in Middlesex).

Calculating a Probability that a Particular Consumer would Buy a Particular Virtual Offer and Ranking Virtual Offers FIG. 10 shows an example method, namely process 1000, that may be executed by one or more machines (some examples of which are discussed in connection with FIGS. 1, 2a, and/or 3) to calculate a probability that a consumer may buy a particular virtual offer and generate a ranked list of virtual offers, in accordance with some embodiments discussed herein. As shown in block 1002 of FIG. 10, an apparatus, such as the promotional system 1410, may be include means, such as the demand module 102, the processor 1402, the communications interface 1406 or the like, for accessing or receiving virtual offer data and consumer data.

As shown in block 1004 of FIG. 10, an apparatus, such as the promotional system 1410, may include means, such as the demand module 102, the processor 1402 or the like, for extracting features from one or both of one or more virtual offers and consumer data.

In some example embodiments, consumer data is stored in memory, such as memory 304, and the consumer data is accessed from memory (e.g., a local memory, a remote memory or the like) by, for example, a demand module 102 or processor 1402. Consumer data may include, for example, age, gender, location, hyper-local region, and/or past purchase history including specific offers, dates, cost expenditures, offer types, offer structures, tenure, email domain information, etc. Consumer data may be the accumulation of information related to each of or some portion of a current subscriber database. For example, tenure is an indication of the length of time a user has been a subscriber. In another example, based on the domain of the email address (such as Gmail®, Hotmail®, AOL®, etc.), the demand module 102, processor 1402 or the like may infer certain characteristics. For example, a AOL® user tends to be older whereas a Gmail® user tends to be younger.

In one embodiment, block 1004 may extract the distance between a consumer and a virtual offer and a consumer's prior purchases in a category. As another example, block 1004 may extract the age, gender of a consumer, extract the category of the multiple virtual offers, and calculate the distance between the consumer and the multiple virtual offers. The features extracted may be input to the scoring/ranking algorithm, which outputs a list of ranked deals.

Thus, as shown in block 1006 of FIG. 10, an apparatus, such as the promotional system 1410, may include means, such as the demand module 102, the processor 1402 or the like, for scoring each of one or more virtual offers.

The scoring may be configured to score the plurality of virtual offers based on explicit input by the consumer and/or extracted features from the consumer information. In the instance where the consumer selects certain attributes of desired virtual offers, the selected attributes of the desired offers may be used at different points in the ranking process 1000. For example, process 1000 may select only the virtual offers that meet the attributes as selected by the consumer. So that, the entire universe of virtual offers for scoring/review by the process 1000 may be dictated by the consumer. In another embodiment, process 1000 may factor in the consumer's desired attributes at a later point. In particular, the process 1000 may weigh the score depending on the desired consumer attributes (such as improving the score of a virtual offer that is characterized as a "family offer" if the consumer has selected as an offer attribute "family offers" type). In addition to using the desired attributes as selected by the consumer, the process 1000 may examine other attributes of the consumer and attributes of the plurality of virtual offers to score the plurality of virtual offers. If the consumer has not indicated a set of desired attributes, the process 1000 may examine attributes of the consumer in the consumer profile in order to evaluate which virtual offers to select for scoring and ranking Block 1006 may be configured to predict the likelihood that a particular consumer will purchase a particular offer that is offered to the consumer. The indication of acceptance of the virtual offer may take one of several forms, such as the conversion rate (the rate by which a consumer accepts a virtual offer that is offered or the number of purchases of the virtual offer divided by the number of times the virtual offer is offered to consumers) or another type of relevance score. Block 1006 may be organized into different categories of consumers correlated with different categories (and subcategories) of virtual offer types. For example, the scoring model may aggregate the historical data from previously-run virtual offers and/or historical data from the virtual offer under consideration, organizing features of consumers (such as gender and distance from a virtual offer) with the conversion rates for categories/subcategories of virtual offers. In particular, Block 1006 may be segmented by consumers (such as males 0-2 miles from the virtual offer, males 2-4 miles from the virtual offer, etc.) and segmented by virtual offers in different categories/subcategories (such as the category of restaurants, and the subcategories of Italian restaurants, Greek restaurants, etc.). Block 1006 may aggregate the data from the previous virtual offers in order to generate the conversion rates for the consumers in the different categories (such as the conversion rate for consumers that are males 2-4 miles from a Greek restaurant virtual offer in Chicago). The examples of the categories of consumers and the categories/subcategories of virtual offers are merely for illustration purposes only. Other categories are contemplated. For example, the categories of consumers may be subdivided into gender, distance, and age. As another example, Block 1006 may be subdivided based on price of the virtual offer. The results of the Block 1006 may be input to Block 1008, which may generate a ranked list of virtual offers according to the results.

As shown in block 1008 of FIG. 10, an apparatus, such as the promotional system 1410, may include means, such as the demand module 102, the processor 1402 or the like, for ranking each of one or more virtual offers.

The results of Blocks 1006 and 1008 may generate a ranked list of virtual offers, which may thereafter be iteratively re-ranked according to further analysis of consumer data and/or virtual offer data. Alternatively, Block 1006 may output the scores for the multiple virtual offers, and the scores may be iteratively modified (such as re-scored). After the final iteration, the scores may then be used to generate a final ranking of some or all of the virtual offers in order to determine what virtual offer(s) to present to the consumer.

As shown in block 1010 of FIG. 10, an apparatus, such as the promotional system 1410, may include means, such as the demand module 102, the processor 1402 or the like, for adjusting the rankings of the one or more virtual offers based on past purchase history information.

As shown in Block 1010, an adjustment may account for the consumer's past purchase history by accessing a past purchase database in order to generate a first reordered list of deals. Alternatively, the consumer's past purchase history may be used to modify the initial scores. For example, a past purchase database may be part of the consumer information database 112 and indicate which categories (or subcategories) of offers that the particular consumer previously purchased. The fact that the particular consumer has (or has not) previously purchased may be used in order to reorder the ranked list of virtual offers. For example, the ranked list of virtual offers for the particular consumer may include the top "X" virtual offers, with each of the top "X" virtual offers having a particular category and subcategory. In the event that the consumer has previously purchased an offer in a subcategory for one (or more) of the top "X" virtual offers, the scores associated with those virtual offers may be modified (such as by multiplying the score with a previous-purchase correction factor). Alternatively or in addition, in the event that the consumer has not previously purchased an offer in a subcategory for one (or more) of the top "X" virtual offers, the scores associated with those deals may be modified (such as by multiplying the score with a no-previous-purchase correction factor).

As shown in block 1012 of FIG. 10, an apparatus, such as the promotional system 1410, may include means, such as the demand module 102, the processor 1402 or the like, for adjusting the rankings of the one or more virtual offers based on one or more business rules.

Block 1012 may account for particular business needs. Examples of business rules include, but are not limited to: rerunning an offer; offer de-duplicating; filtering targeted-only offers; and limiting extended access offers. Rerunning an offer may include running an offer previously run within a predetermined time period (such as 2 days ago, 2 weeks ago, etc.). The algorithm may be programmed with a business rule in which offers are calculated for consumers who have not seen the offer before or who have not purchased the offer before. The time period the algorithm examines may look back in time a predetermined amount, such as 3 months. If the consumer has this offer as the top rank, and the consumer has seen this type of offer before (or has purchased this type of offer), then the consumer is shown something else.

Offer de-duplicating is a business rule that seeks to reduce sending of duplicate offers to a consumer. De-duplicating may come in one of several forms. One form is de-duplicating across a business (e.g., a particular business may be running two virtual offers and the algorithm only calculates the consumer probability for one of them (w/in a particular time period). Another form is de-duplicating across the type of virtual offer. It is possible to "clone" a virtual offer, such as by issuing the same virtual offer in multiple contexts (e.g., running a travel virtual offer in getaways and leisure). The algorithm may account for a previous purchase of an offer, and prevent calculation in a different context.

Filtering targeted-only virtual offers may occur when certain virtual offers are filtered or removed from consideration or scoring. Some virtual offers may be designated for specific targeting and are not considered in scoring. These virtual offers may be removed from the algorithm process and give special consideration. These specially considered virtual offers may be tagged as such so that the algorithm does not analyze them.

Further, as shown in block 1014 of FIG. 10, an apparatus, such as the promotional system 1410, may include means, such as the demand module 102, the processor 1402 or the like, for adjusting the rankings of the one or more virtual offers based on desired placement constraints. For example, if it is desired that a certain maximum number or minimum number of people receive the virtual offer, the algorithm may be modified or overridden. In particular, if it is desired that 500,000 people receive the virtual offer, and the algorithm only selects 400,000 people, the algorithm may be modified (such as the thresholds to issue a virtual offer, or a re-ranking of virtual offers) in order to issue the virtual offer to the 500,000.

As shown in block 1016 of FIG. 10, an apparatus, such as the promotional system 1410, may include means, such as the demand module 102, the processor 1402 or the like, for adjusting the rankings of the one or more virtual offers based on diversity constraint information. Diversity constraints may comprise giving pre-determined weight to specific categories, sub-categories, locations, and/or price ranges.

Other iterations and potential correction factors are contemplated. For example, an interaction accounting for price of a virtual offer and a price correction factor may be used. In one embodiment, virtual offers are scored and sorted based on an expected conversion rate. Price of the virtual offers may be accounted thereafter by applying a price adjustment factor, whereby the predicted conversion rate is adjusted by the price of the virtual offer (such by multiplying the predicted conversion rate by the price of the virtual offer). In this way, the scoring and/or ranking of the virtual offers may be used to increase or maximize revenue. The scoring and ranking may provide initial scores to the multiple virtual offers. In an alternate embodiment, the scoring and ranking may be used after the initial scoring of the multiple virtual offers, so that the scoring and ranking may be used to adjust or modify previous scores or rankings.

Supply Source Quality Score Calculation Example

FIG. 11 shows an example method, namely process 1100, that may be executed by one or more machines (some examples of which are discussed in connection with FIGS. 1, 2a, and/or 3) to calculate a supply source quality score, in accordance with some embodiments discussed herein. As shown in block 1102 of FIG. 11, an apparatus, such as the promotional system 1410, may be include means, such as the supply ID module 104, the processor 1402, or the like, for determining if a supply source has an overall star average greater than or equal to at least a 3.0 with greater than or equal to at least 5 total reviews.

If the determination at block 1102 yields a yes, the process 1100 proceeds to block 1104. As shown in block 1104 of FIG. 11, an apparatus, such as the promotional system 1410, may be include means, such as the supply ID module 104, the processor 1402, or the like, for determining if a supply source has an overall star average greater than or equal to at least a 4.5 with greater than or equal to at least 500 total number reviews.

If the determination at block 1104 yields a yes, the process 1100 proceeds to block 1106. As shown in block 1106 of FIG. 11, an apparatus, such as the promotional system 1410, may be include means, such as the supply ID module 104, the processor 1402, or the like, for determining if a supply source has a positive press review or award from an accepted source.

If the determination at block 1106 yields a yes, the process 1100 proceeds to block 1108. As shown in block 1108 of FIG. 11, an apparatus, such as the promotional system 1410, may be include means, such as the supply ID module 104, the processor 1402, or the like, for assigning a supply source a score of 10.

If the determination at block 1104 yields a no, the process 1100 proceeds to block 1110. As shown in block 1110 of FIG. 11, an apparatus, such as the promotional system 1410, may be include means, such as the supply ID module 104, the processor 1402, or the like, for determining if a supply source has an overall star average greater than or equal to at least a 4.0 with greater than or equal to at least 20 total reviews.

If the determination at block 1110 yields a yes, the process 1100 proceeds to block 1112. As shown in block 1112 of FIG. 11, an apparatus, such as the promotional system 1410, may be include means, such as the supply ID module 104, the processor 1402, or the like, for assigning a supply source a score of 8.

If the determination at block 1110 yields a no, the process 1100 proceeds to block 1114. As shown in block 1114 of FIG. 11, an apparatus, such as the promotional system 1410, may be include means, such as the supply ID module 104, the processor 1402, or the like, for determining if a supply source has an overall star average of greater than or equal to at least a 4.0 with greater than or equal to at least 5,000 "likes", such as for example, Facebook® "likes".

If the determination at block 1114 yields a yes, the process 1100 proceeds to block 1112, where the supply source is assigned a score of 8. If the determination at block 1114 yields a no, the process 1100 proceeds to block 1116. As shown in block 1116 of FIG. 11, an apparatus, such as the promotional system 1410, may be include means, such as the supply ID module 104, the processor 1402, or the like, for assigning a supply source a score of 6.

If the determination at block 1102 yields a no, the process 1100 proceeds to block 1118. As shown in block 1118 of FIG. 11, an apparatus, such as the promotional system 1410, may be include means, such as the supply ID module 104, the processor 1402, or the like, for determining if a supply source has an overall star rating of less than or equal to at least a 2.49 with greater than or equal to at least 5 total reviews.

If the determination at block 1118 yields a yes, the process 1100 proceeds to block 1120. As shown in block 1120 of FIG. 11, an apparatus, such as the promotional system 1410, may be include means, such as the supply ID module 104, the processor 1402, or the like, for assigning a supply source a score of 1.

If the determination at block 1118 yields a no, the process 1100 proceeds to block 1122. As shown in block 1122 of FIG. 11, an apparatus, such as the promotional system 1410, may be include means, such as the supply ID module 104, the processor 1402, or the like, for determining if a supply source has an overall star average of greater than or equal to at least a 3.0.

If the determination at block 1122 yields a no, the process 1100 proceeds to block 1124. As shown in block 1124 of FIG. 11, an apparatus, such as the promotional system 1410, may be include means, such as the supply ID module 104, the processor 1402, or the like, for assigning a supply source a score of 4.

If the determination at block 1122 yields a yes, the process 1100 proceeds to block 1126. As shown in block 1126 of FIG. 11, an apparatus, such as the promotional system 1410, may be include means, such as the supply ID module 104, the processor 1402, or the like, for determining if a supply source has an a positive press review or award from an acceptable source and has greater than or equal to at least 5,000 "likes", such as for example, Facebook® "likes".

If the determination at block 1126 yields a no, the process 1100 proceeds to block 1124 where the supply source is assigned a score of 4. If the determination at block 1126 yields a yes, the process 1100 proceeds to block 1114.

As shown in block 1128 of FIG. 11, an apparatus, such as the promotional system 1410, may be include means, such as the supply ID module 104, the processor 1402, or the like, for determining if a supply source is closed or determining if a supply source is closed is impossible. If block 1128 determines that a supply source is closed or cannot tell if the supply source is closed, the process 1100 proceeds to block 1120 where the supply source is assigned a score of 1.

Calculating an Assignment Probability Number

FIG. 12 shows an example method, namely process 1200, that may be executed by one or more machines (some examples of which are discussed in connection with FIGS. 1, 2a, and/or 3) to calculate or determine an assignment probability number for each of one or more sales resources for assignment purposes, in accordance with some embodiments discussed herein. As shown in block 1202 of FIG. 12, an apparatus, such as the promotional system 1410, may be include means, such as the assignment module 106, the processor 1402, or the like, for receiving a prioritized list of supply sources.

As shown in block 1204 of FIG. 12, an apparatus, such as the promotional system 1410, may be include means, such as the assignment module 106, the processor 1402, or the like, for accessing a first supply source for assignment.

As shown in block 1206 of FIG. 12, an apparatus, such as the promotional system 1410, may be include means, such as the assignment module 106, the processor 1402, or the like, for resetting the assignment probability numbers for each of one or more sales resources.

As shown in block 1208 of FIG. 12, an apparatus, such as the promotional system 1410, may be include means, such as the assignment module 106, the processor 1402, or the like, for considering each sales resource for assignment.

As shown in block 1210 of FIG. 12, an apparatus, such as the promotional system 1410, may be include means, such as the assignment module 106, the processor 1402, or the like, for determining whether a capacity of a sales resource meets a predetermined threshold. For example, a sales resource with the required amount of supply sources in their prioritized call list may have zero capacity whereas a sales resource with only 90% of the required supply sources in their prioritized call list will have a higher capacity than zero.

If the determination in block 1210 yields a no, the process 1200 then goes to block 1212. As shown in block 1212 of FIG. 12, an apparatus, such as the promotional system 1410, may be include means, such as the assignment module 106, the processor 1402, or the like, for increasing the assignment probability number of the sales resource.

If the determination in block 1210 yields a yes, the process 1200 then goes to block 1214. As shown in block 1214 of FIG. 12, an apparatus, such as the promotional system 1410, may be include means, such as the assignment module 106, the processor 1402, or the like, for decreasing the assignment probability number of the sales resource.

As shown in block 1216 of FIG. 12, an apparatus, such as the promotional system 1410, may be include means, such as the assignment module 106, the processor 1402, or the like, for determining whether the portfolio mix of the sales resource meet a predetermined threshold in one or more of the category, sub-category, location, hyper-local region and price of the supply source.

If the determination in block 1216 yields a no, the process 1200 then goes to block 1218. As shown in block 1218 of FIG. 12, an apparatus, such as the promotional system 1410, may be include means, such as the assignment module 106, the processor 1402, or the like, for increasing the assignment probability number of the sales resource.

If the determination in block 1216 yields a yes, the process 1200 then goes to block 1220. As shown in block 1220 of FIG. 12, an apparatus, such as the promotional system 1410, may be include means, such as the assignment module 106, the processor 1402, or the like, for decreasing the assignment probability number of the sales resource.

As shown in block 1222 of FIG. 12, an apparatus, such as the promotional system 1410, may be include means, such as the assignment module 106, the processor 1402, or the like, for determining whether the experience and/or expertise of the sales resource meet a predetermined threshold in one or more of the category, sub-category, location, hyper-local region and price of the supply source. In one example, the lead allocation process seeks to distinguish between experience with new supply sources and supply sources with which a relationship already exists. In one embodiment, experience and/or expertise of a sales resource may additionally or alternatively, indicate or distinguish experience and/or expertise with providers with which the promotion and marketing system has no existing relationship and providers with which the promotion and marketing system does have a previous and/or existing relationship. For example, a sales resource who has more success (relatively) in closing providers who have never offered a promotion with the promotion and marketing system will have an experience and expertise score that reflects that information and thus, are more likely to be assigned new providers. Additionally or alternatively, a sales resource who has more success (relatively) in extending past or existing relationships with providers may have an experience and/or expertise score reflecting that information and may be more likely to be assigned providers with which a relationship exists.

In another embodiment, the lead allocation process seeks to optimize travel time for sales resources. In an example embodiment, an experience or expertise score may reflect a higher level or score for providers in a specific location or hyper local region. In another embodiment, an experience and/or expertise level and/or score may be affected by the locations and/or hyper local regions of other providers on a sales resource's provider list. For example, if provider A is already assigned to a sales resource, the sales resource may be more likely to be assigned provider B, who is closer to provider A, than a provider C, who is further away from provider A. Such assignment may be implemented in an embodiment in which an experience and/or expertise score and/level is adjusted based on the locations and/or hyper local regions of providers already assigned to the sales resource.

In another embodiment, in terms of expertise, a sales resource may specialize in quickly closing new providers or reaching out to providers in order to fulfill demand. For example, providers who contact the promotion and marketing service are thought to be interested in working with the promotion and marketing service and thus, may be more likely to be assigned to a sales resource, for example a team that specializes in quickly closing and getting those providers closed.

If the determination in block 1222 yields a yes, the process 1200 then goes to block 1224. As shown in block 1224 of FIG. 12, an apparatus, such as the promotional system 1410, may be include means, such as the assignment module 106, the processor 1402, or the like, for increasing the assignment probability number of the sales resource.

If the determination in block 1222 yields a no, the process 1200 then goes to block 1226. As shown in block 1226 of FIG. 12, an apparatus, such as the promotional system 1410, may be include means, such as the assignment module 106, the processor 1402, or the like, for decreasing the assignment probability number of the sales resource.

As shown in block 1228 of FIG. 12, an apparatus, such as the promotional system 1410, may be include means, such as the assignment module 106, the processor 1402, or the like, for determining whether the supply source would rank higher in the prioritized call list of the sales resource than it would in an average prioritized call list.

If the determination in block 1228 yields a no, the process 1200 then goes to block 1230. As shown in block 1230 of FIG. 12, an apparatus, such as the promotional system 1410, may be include means, such as the assignment module 106, the processor 1402, or the like, for increasing the assignment probability number of the sales resource.

If the determination in block 1228 yields a yes, the process 1200 then goes to block 1232. As shown in block 1232 of FIG. 12, an apparatus, such as the promotional system 1410, may be include means, such as the assignment module 106, the processor 1402, or the like, for decreasing the assignment probability number of the sales resource.

As shown in block 1234 of FIG. 12, an apparatus, such as the promotional system 1410, may be include means, such as the assignment module 106, the processor 1402, or the like, for determining whether the sales resource has a relationship with the supply source.

If the determination in block 1234 yields a yes, the process 1200 then goes to block 1236. As shown in block 1236 of FIG. 12, an apparatus, such as the promotional system 1410, may be include means, such as the assignment module 106, the processor 1402, or the like, for increasing the assignment probability number of the sales resource.

If the determination in block 1234 yields a no, the process 1200 then goes to block 1238. As shown in block 1238 of FIG. 12, an apparatus, such as the promotional system 1410, may be include means, such as the assignment module 106, the processor 1402, or the like, for decreasing the assignment probability number of the sales resource.

As shown in block 1240 of FIG. 12, an apparatus, such as the promotional system 1410, may be include means, such as the assignment module 106, the processor 1402, or the like, for determining whether the supply source has ever been de-allocated form the sales resource.

If the determination in block 1240 yields a no, the process 1200 then goes to block 1242. As shown in block 1242 of FIG. 12, an apparatus, such as the promotional system 1410, may be include means, such as the assignment module 106, the processor 1402, or the like, for increasing the assignment probability number of the sales resource.

If the determination in block 1240 yields a yes, the process 1200 then goes to block 1244. As shown in block 1244 of FIG. 12, an apparatus, such as the promotional system 1410, may be include means, such as the assignment module 106, the processor 1402, or the like, for decreasing the assignment probability number of the sales resource.

As shown in block 1246 of FIG. 12, an apparatus, such as the promotional system 1410, may be include means, such as the assignment module 106, the processor 1402, or the like, for determining whether the sales resource received the previous supply source.

If the determination in block 1246 yields a no, the process 1200 then goes to block 1248. As shown in block 1248 of FIG. 12, an apparatus, such as the promotional system 1410, may be include means, such as the assignment module 106, the processor 1402, or the like, for increasing the assignment probability number of the sales resource.

If the determination in block 1246 yields a yes, the process 1200 then goes to block 1250. As shown in block 1250 of FIG. 12, an apparatus, such as the promotional system 1410, may be include means, such as the assignment module 106, the processor 1402, or the like, for decreasing the assignment probability number of the sales resource.

As shown in block 1252 of FIG. 12, an apparatus, such as the promotional system 1410, may be include means, such as the assignment module 106, the processor 1402, or the like, for determining whether the prioritized call list of the sales resource meets a predetermined threshold for new supply sources.

If the determination in block 1252 yields a no, the process 1200 then goes to block 1254. As shown in block 1254 of FIG. 12, an apparatus, such as the promotional system 1410, may be include means, such as the assignment module 106, the processor 1402, or the like, for increasing the assignment probability number of the sales resource.

If the determination in block 1252 yields a yes, the process 1200 then goes to block 1256. As shown in block 1256 of FIG. 12, an apparatus, such as the promotional system 1410, may be include means, such as the assignment module 106, the processor 1402, or the like, for decreasing the assignment probability number of the sales resource.

As shown in block 1258 of FIG. 12, an apparatus, such as the promotional system 1410, may be include means, such as the assignment module 106, the processor 1402, or the like, for assigning a supply source to sales resource based on the assignment probability number of each of one or more sales resources.

Example De-Allocation Process

FIG. 13 shows an example method, namely process 1300, that may be executed by one or more machines (some examples of which are discussed in connection with FIGS. 1, 2a, and/or 3) to determine whether and when to de-allocate a supply source from a sales resource, in accordance with some embodiments discussed herein. As shown in block 1302 of FIG. 13, an apparatus, such as the promotional system 1410, may be include means, such as the assignment module 106, the processor 1402, or the like, for determining whether a supply source has an unexpired promotion.

If the determination in block 1302 yields a yes, the process 1300 then goes to block 1304. As shown in block 1304 of FIG. 13, an apparatus, such as the promotional system 1410, may be include means, such as the assignment module 106, the processor 1402, or the like, for determining whether the sales resource has left the company.

If the determination in block 1304 yields a yes, the process 1300 then goes to block 1306. As shown in block 1306 of FIG. 13, an apparatus, such as the promotional system 1410, may be include means, such as the assignment module 106, the processor 1402, or the like, for de-allocating the supply source. The supply source may then be re-scored and/or re-assigned.

If the determination in block 1304 yields a no, the process 1300 then goes to block 1308. As shown in block 1308 of FIG. 13, an apparatus, such as the promotional system 1410, may be include means, such as the assignment module 106, the processor 1402, or the like, for determining that the supply source is not to be de-allocated at the current time. The process may then return to block 1302.

If the determination in block 1302 yields a no, the process 1300 then goes to block 1310. As shown in block 1310 of FIG. 13, an apparatus, such as the promotional system 1410, may be include means, such as the assignment module 106, the processor 1402, or the like, for determining, in an instance in which a supply source has a warm lead, whether the sales resource has contacted the supply source within 2 days.

If the determination in block 1310 yields a no, the process 1300 then goes to block 1306 where the supply source is de-allocated from the sales resource.

If the determination in block 1310 yields a yes or not applicable, the process 1300 then goes to block 1312. As shown in block 1312 of FIG. 13, an apparatus, such as the promotional system 1410, may be include means, such as the assignment module 106, the processor 1402, or the like, for determining, in an instance in which a supply source does not have a warm lead, whether the sales resource has contacted the supply source within 10 days.

If the determination in block 1312 yields a no, the process 1300 then goes to block 1306 where the supply source is de-allocated from the sales resource.

If the determination in block 1312 yields a yes or not applicable, the process 1300 then goes to block 1314. As shown in block 1314 of FIG. 13, an apparatus, such as the promotional system 1410, may be include means, such as the assignment module 106, the processor 1402, or the like, for determining whether a sales resource has made contact within 35 days since a previous promotion expired.

If the determination in block 1314 yields a yes, the process 1300 then goes to block 1306 where the supply source is de-allocated from the sales resource.

If the determination in block 1314 yields a no or not applicable, the process 1300 then goes to block 1316. As shown in block 1316 of FIG. 13, an apparatus, such as the promotional system 1410, may be include means, such as the assignment module 106, the processor 1402, or the like, for determining whether a sales resource has made traction meeting a predetermined threshold within 60 days since a previous promotion expired.

If the determination in block 1316 yields a yes, the process 1300 then goes to block 1306 where the supply source is de-allocated from the sales resource.

If the determination in block 1316 yields a no or not applicable, the process 1300 then goes to block 1318. As shown in block 1318 of FIG. 13, an apparatus, such as the promotional system 1410, may be include means, such as the assignment module 106, the processor 1402, or the like, for determining, for supply sources having scores above a predetermined threshold and where sales resource has not previously closed a contract with the supply source, whether the sales resource has not closed a contract within 120 days.

If the determination in block 1318 yields a yes, the process 1300 then goes to block 1306 where the supply source is de-allocated from the sales resource.

If the determination in block 1318 yields a no or not applicable, the process 1300 then goes to block 1320. As shown in block 1318 of FIG. 13, an apparatus, such as the promotional system 1410, may be include means, such as the assignment module 106, the processor 1402, or the like, for determining, for supply sources having scores below a predetermined threshold and where sales resource has not previously closed a contract with the supply source, whether the sales resource has not closed a contract within 90 days.

If the determination in block 1320 yields a yes, the process 1300 then goes to block 1306 where the supply source is de-allocated from the sales resource.

If the determination in block 1320 yields a no or not applicable, the process 1300 then goes to block 1322. As shown in block 1322 of FIG. 13, an apparatus, such as the promotional system 1410, may be include means, such as the assignment module 106, the processor 1402, or the like, for determining, for supply sources having scores above a predetermined threshold and where sales resource has previously closed a contract with the supply source, if the sales resource has not closed a contract within 180 days.

If the determination in block 1322 yields a yes, the process 1300 then goes to block 1306 where the supply source is de-allocated from the sales resource.

If the determination in block 1322 yields a no or not applicable, the process 1300 then goes to block 1324. As shown in block 1324 of FIG. 13, an apparatus, such as the promotional system 1410, may be include means, such as the assignment module 106, the processor 1402, or the like, for determining, for supply sources having scores below a predetermined threshold and where sales resource has previously closed a contract with the supply source, if the sales resource has not closed a contract within 120 days.

If the determination in block 1324 yields a yes, the process 1300 then goes to block 1306 where the supply source is de-allocated from the sales resource.

If the determination in block 1324 yields a no or not applicable, the process 1300 may end. Process 1300 may also determine that the supply source is not to be de-allocated and/or return to block 1302.

Claims in Summary Form from First Demand Forecasting App

In one embodiment, a method for virtual offer demand forecasting is provided. The method may comprise generating a virtual offer for one or more combinations of a category or sub-category, location, and price range, accessing consumer data comprising one or more users and user data related to each of the one or more users, calculating a probability that a particular user would buy a particular offer in a particular time frame for at least a portion of the plurality of users and for each of the virtual offers, and determining an estimated number of units of to be sold for at least a portion of the one or more virtual offers as a function of at least the probability associated with each of the one or more virtual offers.

In another embodiment, calculating a forecasted demand comprises adjusting the forecasted demand as a function of one or more external factors. In another embodiment, the method may further comprise generating a ranked user list for each of the one or more users comprising each of the one or more virtual offers and an associated calculated probability; assigning a voting value to each of the one or more virtual offers on each ranked user list, and generating a single list ranking each of the one or more virtual offers by adding the voting value each of the one or more virtual offers received on each ranked user list.

In another embodiment, the determining of the estimated number of units to be sold for is only for a predetermined number of virtual offers, and is based on the ranking of each of the one or more virtual offers on the single list. In another embodiment, the selecting of the one or more virtual offers further comprises calculating a projected revenue value for each virtual offer based on prior performance data per unit and the estimated number of units to be sold, ranking the one or more virtual offers by the projected revenue, and selecting one or more virtual offers to include in the forecasted demand based on the ranking of each of the one or more virtual offers by revenue and a pre-selected portfolio mix.

In another embodiment, the one or more external factors includes at least a seasonality component. In another embodiment, a virtual offer comprises at least price data, one product category or one service category, and location data. In another embodiment, the voting value is derived from a position of the one or more virtual offers on the ranked lists generated for each of the one or more users, wherein at least a predetermined number of virtual offers on each ranked list are assigned a first voting value. In another embodiment, the pre-selected portfolio mix comprises at least one of: a category mix, a price mix, or location constraints. In another embodiment, one or more combinations of category or sub-category, location and price range are generated for a specified time period.

In another embodiment of the present invention an apparatus is provided, the apparatus comprising at least one processor and at least one memory including computer program code, the at least one memory and the computer program code configured to, with the at least one processor, cause the apparatus at least to generate a virtual offer for one or more combinations of a category or sub-category, location, and price range, access consumer data comprising one or more users and user data related to each of the one or more users, calculate a probability that a particular user would buy a particular offer in a particular time frame for at least a portion of the plurality of users and for each of the virtual offers, and determining an estimated number of units of to be sold for at least a portion of the one or more virtual offers as a function of at least the probability associated with each of the one or more virtual offers.

In another embodiment, calculating a forecasted demand comprises adjusting the forecasted demand as a function of one or more external factors. In another embodiment, the at least one memory and computer program code are configured to, with the at least one processor, cause the apparatus to generate a ranked user list for each of the one or more users comprising each of the one or more virtual offers and an associated calculated probability, assign a voting value to each of the one or more virtual offers on each ranked user list, and generate a single list ranking each of the one or more virtual offers by adding the voting value each of the one or more virtual offers received on each ranked user list.

In another embodiment, the determining of the estimated number of units to be sold for is only for a predetermined number of virtual offers, and is based on the ranking of each of the one or more virtual offers on the single list. In another embodiment, the selecting of the one or more virtual offers further comprises calculating a projected revenue value for each virtual offer based on prior performance data per unit and the estimated number of units to be sold, ranking the one or more virtual offers by the projected revenue, and selecting one or more virtual offers to include in the forecasted demand based on the ranking of each of the one or more virtual offers by revenue and a pre-selected portfolio mix.

In another embodiment, the one or more external factors includes at least a seasonality component. In another embodiment, a virtual offer comprises at least price data, one product category or one service category, and location data. In another embodiment, the voting value is derived from a position of the one or more virtual offers on the ranked lists generated for each of the one or more users, wherein at least a predetermined number of virtual offers on each ranked list are assigned a first voting value. In another embodiment, the pre-selected portfolio mix comprises at least one of: a category mix, a price mix, or location constraints. In another embodiment, one or more combinations of category or sub-category, location and price range for a specified time period.

In another embodiment of the present invention, a computer program product is provided. The computer program product may comprise at least one computer-readable storage medium having computer-executable program code instructions stored therein, the computer-executable program code instructions comprising program code instructions for generating a virtual offer for one or more combinations of a category or sub-category, location, and price range, accessing consumer data comprising one or more users and user data related to each of the one or more users, calculating a probability that a particular user would buy a particular offer in a particular time frame for at least a portion of the plurality of users and for each of the virtual offers, and determining an estimated number of units of to be sold for at least a portion of the one or more virtual offers as a function of at least the probability associated with each of the one or more virtual offers.

In another embodiment, calculating a forecasted demand comprises adjusting the forecasted demand as a function of one or more external factors. In another embodiment, the computer-executable program code portions further comprise program code instructions for generating a ranked user list for each of the one or more users comprising each of the one or more virtual offers and an associated calculated probability, assigning a voting value to each of the one or more virtual offers on each ranked user list, generating a single list ranking each of the one or more virtual offers by adding the voting value each of the one or more virtual offers received on each ranked user list.

In another embodiment, the determining of the estimated number of units to be sold for is only for a predetermined number of virtual offers, and is based on the ranking of each of the one or more virtual offers on the single list. In another embodiment, the selecting of the one or more virtual offers further comprises calculating a projected revenue value for each virtual offer based on prior performance data per unit and the estimated number of units to be sold and ranking the one or more virtual offers by the projected revenue, and selecting one or more virtual offers to include in the forecasted demand based on the ranking of each of the one or more virtual offers by revenue and a pre-selected portfolio mix.

In another embodiment, the one or more external factors includes at least a seasonality component. In another embodiment, a virtual offer comprises at least price data, one product category or one service category, and location data. In another embodiment, the voting value is derived from a position of the one or more virtual offers on the ranked lists generated for each of the one or more users, wherein at least a predetermined number of virtual offers on each ranked list are assigned a first voting value. In another embodiment, the pre-selected portfolio mix comprises at least one of: a category mix, a price mix, or location constraints. In another embodiment, one or more combinations of category or sub-category, location and price range for a specified time period.

Promotion and Marketing System Plus Boilerplate

FIG. 14 illustrates an example network architecture for a system in accordance with some embodiments discussed herein. System 1400 may include one or more devices and sub-systems that are configured to implement some of the example embodiments discussed herein. For example, system 1400 may include promotional system 1410, which may include, for example, a processor 1402, memory 1404, a communications interface 1406, and a user interface (not shown). Memory 1404 may include promotional computing device 1412.

Promotional system 1410 can be coupled to one or more salesperson devices 1440A-1440Z, a search engine system 1442, one or more consumer devices 1444A-1444N, a $3^{rd}$ party server 1446, and/or one or more merchant devices 1448A-1448M via network 1450. In this regard, network 1450 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 1450 may include a cellular telephone, an 802.11, 802.16, 802.20, and/or WiMax network. Further, the network 1450 may include a public network, such as the Internet, a private network, such as an intranet, or combinations thereof, and may utilize a variety of networking protocols now available or later developed including, but not limited to TCP/IP based networking protocols. Furthermore, Promotional system 1410 can be coupled to one or more salesperson devices 1440A-1440Z directly via any wired or wireless communication network including, for example, a wired or wireless local area network (LAN), personal area network (PAN), metropolitan area network (MAN), wide area network (WAN), or the like, as well as any hardware, software and/or firmware required to implement it.

Salesperson devices 1440A-1440Z, consumer devices 1444A-1444N, and/or merchant devices 1448A-1448M may each be implemented as a personal computer and/or other networked device, such as a cellular phone, a "smartphone", a tablet computer, mobile device, etc., that may be used for any suitable purpose in addition to buying or selling offers. The depiction in FIG. 14 of "N" consumers, "M" merchants, and "Z" salespersons is merely for illustration purposes. System 1400 may also include at least one search engine system 1442 and/or third party server 1446, among other things.

Memory 1404 of promotional system 1410 may include Promotional computing device 1412, a consumer database 1432, a virtual offer engine 1434, offer inventory 1436, and merchant database 1438 and/or other programs and data repositories 1430. Promotional computing device 1412 can be any suitable network server and/or other type of processing device. Consumer database 1432, virtual offer engine 1434, offer inventory 1436, merchant database 1438 and/or other programs and data repositories 1430 may be any suitable network database configured to store offer parameter data, consumer account information, merchant account information and/or analytics data, such as that discussed herein. In this regard, promotional system 1410 may include, for example, at least one backend data server, network database, cloud computing device, among other things.

Regarding promotional system 1410, FIG. 14 shows a schematic block diagram of circuitry, some or all of which may be included. As illustrated in FIG. 14, in accordance with some example embodiments, the circuitry can includes various means, such as processor 1402, memory 1404, communications interface 1406, and/or input/output module 1408. As referred to herein, "module" includes hardware, software and/or firmware configured to perform one or more particular functions. In this regard, the means of the merchant device's circuitry as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 1404) that is executable by a suitably configured processing device (e.g., processor 1402), or some combination thereof.

In addition, promotional system 1410 may comprise one or more distinct computing systems/devices and may span distributed locations. In other example embodiments, a pre-processing module or other module that requires heavy computational load may be configured to perform that computational load and thus may be on a remote device or server. Furthermore, each block shown may represent one or more such blocks as appropriate to a specific example embodiment. In some cases one or more of the blocks may be combined with other blocks.

Processor 1402 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof. Accordingly, although illustrated in FIG. 14 as a single processor, in some embodiments, processor 1402 comprises a plurality of processors. The plurality of processors may be embodied on a single computing device or may be distributed across a plurality of computing devices collectively. The plurality of processors may be in operative communication with each other and may be collectively configured to perform one or more functionalities of promotional system 1410 as described herein. In an example embodiment, processor 1402 is configured to execute instructions stored in memory 1404 or otherwise accessible to processor 1402. These instructions, when executed by processor 1402, may cause promotional system 1410 to perform one or more of the functionalities as described herein.

Whether configured by hardware, firmware/software methods, or by a combination thereof, processor 1402 may comprise an entity capable of performing operations according to embodiments of the present invention while configured accordingly. Thus, for example, when processor 1402 is embodied as an ASIC, FPGA or the like, processor 1402 may comprise specifically configured hardware for conducting one or more operations described herein. Alternatively, as another example, when processor 1402 is embodied as an executor of instructions, such as may be stored in memory 1404, the instructions may specifically configure processor 1402 to perform one or more algorithms and operations described herein, such as those discussed in connection with FIGS. 4, 5, 7, and 8.

Memory 1404 may comprise, for example, volatile memory, non-volatile memory, or some combination thereof. Although illustrated in FIG. 14 as a single memory, memory 1404 may comprise a plurality of memory components. The plurality of memory components may be embodied on a single computing device or distributed across a plurality of computing devices. In various embodiments, memory 1404 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 1404 may be configured to store information, data (including offer parameter data, consumer data, inventory data and/or analytics data), applications, instructions, or the like for enabling promotional system 1410 to carry out various functions in accordance with example embodiments of the present invention. For example, in at least some embodiments, memory 1404 is configured to buffer input data for processing by processor 1402. Alternatively or additionally, in at least some embodiments, memory 1404 is configured to store program instructions for execution by processor 1402. Memory 1404 may store information in the form of static and/or dynamic information. This stored information may be stored and/or used by salesperson device 1440 during the course of performing its functionalities.

Communications interface 1406 may be embodied as any device or means embodied in circuitry, hardware, a computer program product comprising computer readable program instructions stored on a computer readable medium (e.g., memory 1404) and executed by a processing device (e.g., processor 1402), or a combination thereof that is configured to receive and/or transmit data from/to another device, such as, for example, salesperson device 1440, consumer device 1444, merchant device 1448 and/or the like. In some embodiments, communications interface 1406 (like other components discussed herein) can be at least partially embodied as or otherwise controlled by processor 1402. In this regard, communications interface 1406 may be in communication with processor 1402, such as via a bus. Communications interface 1406 may include, for example, an antenna, a transmitter, a receiver, a transceiver, network interface card and/or supporting hardware and/or firmware/software for enabling communications with another computing device. Communications interface 1406 may be configured to receive and/or transmit any data that may be stored by memory 1404 using any protocol that may be used for communications between computing devices. Communications interface 1406 may, alternatively or additionally, be in communication with the memory 1404, input/output module 1408 and/or any other component of promotional system 1410, such as via a bus.

Input/output module 1408 may be in communication with processor 1402 to receive an indication of a user input and/or to provide an audible, visual, mechanical, or other output to a user (e.g., merchant and/or consumer). As such, input/output module 1408 may include support, for example, for a keyboard, a mouse, a joystick, a display, a touch screen display, a microphone, a speaker, a RFID reader, credit card reader, barcode reader, biometric scanner, and/or other input/output mechanisms as represented by 1408. Input/output module 1408 may be in communication with the memory 1404, communications interface 1406, and/or any other component(s), such as via a bus. Although more than one input/output module and/or other component can be included in promotional system 1410, only one is shown in FIG. 14 to avoid overcomplicating the drawing (like the other components discussed herein).

FIG. 14 also shows an example circuitry that may be included in promotional computing device 1412, which may be configured to perform the analysis, calculation, management and/or other functionality discussed in connection with promotional system 1410. In this manner, from the merchant's perspective, promotional computing device 1412 may provide cloud computing functionality and services to the merchant. As illustrated in FIG. 14 and in accordance with some example embodiments, promotional computing device 1412 can includes various means, such as demand module 102, supply ID module 104, and/or assignment module 106.

Demand module 102 may be included and configured to perform the functionality discussed herein related to generating, calculating, adjusting, managing, and/or editing demand. In some embodiments, some or all of the functionality of generating, calculating, adjusting and/or editing demand may be performed by processor 1402. In this regard, the example processes and algorithms discussed herein can be performed by at least one processor 1402 and/or demand module 102. For example, non-transitory computer readable media can be configured to store firmware, one or more application programs, and/or other software, which include instructions and other computer-readable program code portions that can be executed to control each processor (e.g., processor 1402 and/or demand module 102) of the components of promotional computing device 1412 to implement various operations, including the examples shown above. As such, a series of computer-readable program code portions are embodied in one or more computer program products and can be used, with a computing device, server, and/or other programmable apparatus, to produce machine-implemented processes.

For example, demand module 102 may be configured to receive virtual offers and apply current consumer and/or subscriber information in order to calculate a forecasted demand. Alternatively or additionally, the demand module 102 can be configured to adjust demand based on current inventory and/or external factors. As a result of this calculation and adjustment, demand module 102 can be configured to output a forecasted demand.

The demand module 102 may be configured to access consumer data, such as from database 1432, comprising one or more users and user data related to each of the one or more users and calculate a probability that a particular user would buy a particular offer in a particular time frame for at least a portion of the plurality of users and for each of the virtual offers. The demand module 102 may also be configured to access a program 1430 that may calculate a probability that a specific individual consumer may purchase a specific virtual offer. The demand module 102 may be configured to aggregate the probabilities, for each of one or more virtual offers, and each of one or more consumers.

Supply ID module 104 can be configured to receive a forecasted demand and access a merchant database for the purpose of identifying merchants capable of meeting the demand. In order to identify merchants capable of meeting this demand, the supply ID module 104 may be configured to calculate merchant value, calculate a merchant quality score, calculate a risk potential, calculate a probability to close, and calculate a time to close. Alternatively or additionally, the supply ID module 104 can be configured to prioritize the merchants based on the aforementioned factors. For example, supply ID module 104 can be the component of promotional computing device 1412 that is configured to receive an inventory adjusted demand, access a merchant database, and identify and/or prioritize the merchants in such a way as to convey to a sales team and/or salesperson which merchants offer the most value, with regard to time spent, in fulfilling the inventory adjusted demand. The supply ID module 104 may be configured to calculate one or more metrics related to a merchant. For example, on a per merchant basis, the supply ID module 104 may be configured to determine a sales value score based on the ability of each merchant to supply a demanded offer. The supply ID module 104 may be configured to calculate a quality score, an expected amount of bookings in units and/or dollars, a time to close and/or a probability to close. Alternatively or additionally, the supply ID module 104 may calculate a return on investment value for one or more merchants and/or offers. The supply ID module 104 may be configured to calculate a merchant return rate, an offer value, and/or a merchant value. The supply ID module 104 may be configured to determine value based on each minute incremental minute of a salesperson's time and can be configured to determine value based on the merchant quality score, the risk potential, the probability to close, and/or a time to close. Although supply ID module 104 is shown as being a single module included in single promotional computing device, both the promotional computing device and/supply ID module 104 (like other devices and components discussed herein) can be embodied as a plurality of distributed systems, apparatuses, and/or any other suitable machine(s).

Further description related to current inventory is found in U.S. Provisional Patent Application No. 61/682,762, filed Aug. 13, 2012, titled "UNIFIED PAYMENT AND RETURN ON INVESTMENT SYSTEM", and U.S. patent application Ser. No. 13/460,745, filed Apr. 30, 2012, titled "SALES ENHANCEMENT SYSTEM", both of which is hereby incorporated by reference.

Assignment module 106 may be configured to receive a prioritized merchant list and/or a salesperson list. Alternatively or additionally, the assignment module 106 can be configured to access a prioritized merchant data and/or salesperson data. Furthermore, the assignment module 106 can be configured to identify capacity of one or more salespersons, identify experience of one or more salespersons, and/or identify expertise of one or more salespersons and assign merchant leads based on one or more of the aforementioned factors. Alternatively or additionally, the assignment module 106 may be configured to generate and/or provide a prioritized call list for one or more salespersons. The assignment module 106 may also be configured to receive updated merchant and/or inventory from, for example, the salespersons utilizing the prioritized call list and provide that information to the demand module 102, the supply ID module 104, memory 1404, and/or processor 1402 or the like.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for forecasting demand comprising:
generating a virtual promotion, wherein the virtual promotion comprises a combination of a category or sub-category, a location, and a price range;
calculating a probability that a particular consumer would buy the virtual offer in a predetermined time period, wherein the probability is generated at least based on historical data related to the particular consumer and one or more related consumers;
determining an estimated number of units to be sold for the virtual offer as a function of at least the probability, the estimated number of units representing a predicted demand;
calculating a real time demand, wherein the real time demand is generated based on a plurality of generated identification pairs for the predetermined time period, wherein calculation of the real-time demand comprises:
accessing, in real-time, user search data, the user search data generated by a user interacting with a promotion and marketing service to identify a requested promotion, the user search data comprising at least location specific data;
generating an identification pair for the search data, the identification pair comprising a first classification and a second classification, the first classification identifying a promotion tuple, comprising at least a category of promotion, and the second classification identifying a location identified by the locations specific data,
the first classification and the second classification generated by:
normalizing the user search data, supplying the normalized user search data to a classifying model as attribute data and training the classifying model to recognize one or more patterns of attribute data, wherein the first classifier and the second classifier is a trainable classifier adapted using a supervised learning method, the first classifier and the second classifier adapted based on a training data set;
determining, using a processor, total demand by summing the predicted demand and the real time demand; and
subsequent to the determination of the total demand, distributing the total demand to multiple hyper-locations and multiple sub-categories due to the determination of the total demand for a portion of the virtual offers being identified by or including high level locations or categories, wherein the distribution of the total demand among the multiple hyper-locations and among the sub-categories comprising the distribution of the real time demand among the multiple hyper-locations and among the sub-categories.

2. The method according to claim 1, wherein calculating the real time demand comprises:
determining a first classification of the user search data by parsing the user search data into one or more terms;
applying one or more terms within the user search data to a search index, wherein the first classification is configured to generate a mapping from the one or more terms within the user search data to at least one of a service or merchant;
determining a second classification of the user search data, wherein the second classification identifies a requested redemption location for the requested promotion; and
generating the identification pair for the search data that is representative of a promotion tuple, the identification pair comprising the first classification and the second classification.

3. The method according to claim 1, further comprising:
distributing the real time demand across one or more predetermined price points.

4. The method according to claim 1, further comprising:
distributing the real time demand across a plurality of hyper-local regions in an instance in which the second classification comprises a region that contains two or more hyper-local regions.

5. The method according to claim 2, further comprising:
distributing the real time demand across a plurality of sub-categories in an instance in which the first classification comprises a category that contains two or more sub-categories.

6. The method according to claim 1, wherein determining total demand further comprises:
identifying a benchmark conversion rate;
comparing the real time demand to the benchmark conversion rate to set a modified real time demand that identifies a quantity of units that would have been purchased had the units been available;
identifying an actual purchase quantity; and
modifying the real time demand, wherein the real time demand is equal to the actual purchase quantity subtracted from the modified real time demand.

7. The method according to claim 1, further comprising:
adjusting the total demand as a function of one or more external factors.

8. The method of claim 1, further comprising:
generating a ranked user list for each of the one or more users comprising each of the one or more virtual offers and an associated calculated probability;
assigning a voting value to each of the one or more virtual offers on each ranked user list; and
generating a single list ranking each of the one or more virtual offers by adding the voting value each of the one or more virtual offers received on each ranked user list.

9. The method according to claim 8, wherein the determining of the estimated number of units to be sold for is only for a predetermined number of virtual offers, and is based on the ranking of each of the one or more virtual offers on the single list.

10. The method of claim 8, wherein the selecting of the one or more virtual offers further comprises:
calculating a projected revenue value for each virtual offer based on prior performance data per unit and the estimated number of units to be sold; ranking the one or more virtual offers by the projected revenue; and
selecting one or more virtual offers to include in the forecasted demand based on the ranking of each of the one or more virtual offers by revenue and a pre-selected portfolio mix.

11. The method of claim 8, wherein the one or more external factors includes at least a seasonality component.

12. The method according to claim 1, wherein a virtual offer comprises at least price data, one product category or one service category, and location data.

13. The method according to claim 8, wherein the voting value is derived from a position of the one or more virtual offers on the ranked lists generated for each of the one or more users, wherein at least a predetermined number of virtual offers on each ranked list are assigned a first voting value.

14. The method according to claim 10, wherein the pre-selected portfolio mix comprises at least one of: a category mix, a price mix, or location constraints.

15. The method according to claim 1, wherein one or more combinations of category or sub-category, location and price range are generated for a specified time period.

16. A computer program product comprising at least one non-transitory computer-readable storage medium having computer-executable program code instructions stored therein, the computer-executable program code instructions comprising program code instructions for: generating a virtual promotion, wherein the virtual promotion comprises a combination of a category or sub-category, a location, and a price range; calculating a probability that a particular consumer would buy the virtual offer in a predetermined time period, wherein the probability is generated at least based on historical data related to the particular consumer and one or more related consumers; determining an estimated number of units to be sold for the virtual offer as a function of at least the probability, the estimated number of units representing a predicted demand; calculating a real time demand, wherein the real time demand is generated based on a plurality of generated identification pairs for the predetermined tins period, wherein calculation of the real-time demand comprises: accessing, in real-time, user search data, the user search data generated by a user interacting with a promotion and marketing service to identify a requested promotion, the user search data comprising at least location specific data; generating an identification pair for the search data, the identification pair comprising a first classification and a second classification, the first classification identifying a promotion tuple, comprising at least a category of promotion, and the second classification identifying a location identified by the locations specific data, the first classification and the second classification generated by: normalizing the user search data, supplying the normalized user search data to a classifying model as attribute data and training the classifying model to recognize one or more patterns of attribute data, wherein the first classifier and the second classifier is a trainable classifier adapted using a supervised learning method, the first classifier and the second classifier adapted based on a training data set; determining, using a processor, total demand by summing the predicted demand and the real time demand; and subsequent to the determination of the total demand, distributing the total demand to multiple hyper-locations and multiple sub-categories due to the determination of the total demand for a portion of the virtual offers being identified by or including high level locations or categories, wherein the distribution of the total demand among the multiple hyper-locations and among the sub-categories comprising the distribution of the realtime demanded among the multiple hyper-locations and among the sub-categories.

17. The computer program product according to claim 16, wherein calculating the real time demand comprises:
    determining a first classification of the user search data by parsing the user search data into one or more terms;
    applying one or more terms within the user search data to a search index, wherein the first classification is configured to generate a mapping from the one or more terms within the user search data to at least one of a service or merchant;
    determining a second classification of the user search data, wherein the second classification identifies a requested redemption location for the requested promotion; and
    generating the identification pair for the search data that is representative of a promotion tuple, the identification pair comprising the first classification and the second classification.

18. The computer program product according to claim 16, wherein the computer-executable program code instructions further comprise program code instructions for:
    distributing the real time demand across one or more predetermined price points.

19. The computer program product according to claim 16, wherein the computer-executable program code instructions further comprise program code instructions for:
    distributing the real time demand across a plurality of hyper-local regions in an instance in which the second classification comprises a region that contains two or more hyper-local regions.

20. The computer program product according to claim 17, wherein the computer-executable program code instructions further comprise program code instructions for:
    distributing the real time demand across a plurality of sub-categories in an instance in which the first classification comprises a category that contains two or more sub-categories.

21. The computer program product according to claim 16, wherein the computer-executable program code instructions for determining total demand further comprise program code instructions for:
    identifying a benchmark conversion rate;
    comparing the real time demand to the benchmark conversion rate to set a modified real time demand that identifies a quantity of units that would have been purchased had the units been available;
    identifying an actual purchase quantity; and
    modifying the real time demand, wherein the real time demand is equal to the actual purchase quantity subtracted from the modified real time demand.

22. The computer program product according to claim 16, wherein the computer-executable program code instructions further comprise program code instructions for: adjusting the total demand as a function of one or more external factors.

23. The computer program product according to claim 16, wherein the computer-executable program code instructions further comprise program code instructions for:
    generating a ranked user list for each of the one or more users comprising each of the one or more virtual offers and an associated calculated probability; assigning a voting value to each of the one or more virtual offers on each ranked user list; and
    generating a single list ranking each of the one or more virtual offers by adding the voting value each of the one or more virtual offers received on each ranked user list.

24. The computer program product according to claim 23, wherein the determining of the estimated number of units to be sold for is only for a predetermined number of virtual offers, and is based on the ranking of each of the one or more virtual offers on the single list.

25. The computer program product according to claim 23, wherein the computer-executable program code instructions for the selecting of the one or more virtual offers further comprise program code instructions for:
    calculating a projected revenue value for each virtual offer based on prior performance data per unit and the estimated number of units to be sold; ranking the one or more virtual offers by the projected revenue; and selecting one or more virtual offers to include in the forecasted demand based on the ranking of each of the one or more virtual offers by revenue and a pre-selected portfolio mix.

26. The computer program product according to claim 23, wherein the one or more external factors includes at least a seasonality component.

27. The computer program product according to claim 16, wherein a virtual offer comprises at least price data, one product category or one service category, and location data.

28. The computer program product according to claim 23, wherein the voting value is derived from a position of the one or more virtual offers on the ranked lists generated for each of the one or more users, wherein at least a predetermined number of virtual offers on each ranked list are assigned a first voting value.

29. The computer program product according to claim 25, wherein the pre-selected portfolio mix comprises at least one of: a category mix, a price mix, or location constraints.

30. The computer program product according to claim 16, wherein one or more combinations of category or sub-category, location and price range are generated for a specified time period.

31. An apparatus comprising at least one processor and at least one memory including computer program code, the at least one memory and the computer program code configured to, with the processor, cause the apparatus to at least:
generate a virtual promotion, wherein the virtual promotion comprises a combination of a category or sub-category, a location, and a price range;
calculate a probability that a particular consumer would buy the virtual offer in a predetermined time period, wherein the probability is generated at least based on historical data related to the particular consumer and one or more related consumers;
determine an estimated number of units to be sold for the virtual offer as a function of at least the probability, the estimated number of units representing a predicted demand;
calculate a real time demand, wherein the real time demand is generated based on a plurality of generated identification pairs for the predetermined time period, wherein calculation of the real-time demand comprises:
accessing, in real-time, user search data, the user search data generated by a user interacting with a promotion and marketing service to identify a requested promotion, the user search data comprising at least location specific data;
generating an identification pair for the search data, the identification pair comprising a first classification and a second classification, the first classification identifying a promotion tuple, comprising at least a category of promotion, and the second classification identifying a location identified by the locations specific data,
the first classification and the second classification generated by:
normalizing the user search data, supplying the normalized user search data to a classifying model as attribute data and training the classifying model to recognize one or more patterns of attribute data,
wherein the first classifier and the second classifier is a trainable classifier adapted using a supervised learning method, the first classifier and the second classifier adapted based on a training data set;
determine, using a processor, total demand by summing the predicted demand and the real time demand; and
subsequent to the determination of the total demand, distributing the total demand to multiple hyper-locations and multiple sub-categories due to the determination of the total demand for a portion of the virtual offers being identified by or including high level locations or categories, wherein the distribution of the total demand among the multiple hyper-locations and among the sub-categories comprising the distribution of the real time demand among the multiple hyper-locations and among the sub-categories.

32. The apparatus according to claim 31, wherein the at least one memory and the computer program code for calculating the real time demand are further configured to, with the processor, cause the apparatus to:
determine a first classification of the user search data by parsing the user search data into one or more terms;
apply one or more terms within the user search data to a search index, wherein the first classification is configured to generate a mapping from the one or more terms within the user search data to at least one of a service or merchant;
determine a second classification of the user search data, wherein the second classification identifies a requested redemption location for the requested promotion; and
generate the identification pair for the search data that is representative of a promotion tuple, the identification pair comprising the first classification and the second classification.

33. The apparatus according to claim 31, wherein the at least one memory and the computer program code are further configured to, with the processor, cause the apparatus to:
distribute the real time demand across one or more predetermined price points.

34. The apparatus according to claim 31, wherein the at least one memory and the computer program code are further configured to, with the processor, cause the apparatus to:
distribute the real time demand across a plurality of hyper-local regions in an instance in which the second classification comprises a region that contains two or more hyper-local regions.

35. The apparatus according to claim 32, wherein the at least one memory and the computer program code are further configured to, with the processor, cause the apparatus to:
distribute the real time demand across a plurality of sub-categories in an instance in which the first classification comprises a category that contains two or more sub-categories.

36. The apparatus according to claim 31, wherein the at least one memory and the computer program code for determining total demand are further configured to, with the processor, cause the apparatus to:
identify a benchmark conversion rate;
compare the real time demand to the benchmark conversion rate to set a modified real time demand that identifies a quantity of units that would have been purchased had the units been available;
identify an actual purchase quantity; and
modify the real time demand, wherein the real time demand is equal to the actual purchase quantity subtracted from the modified real time demand.

37. The apparatus according to claim 31, wherein the at least one memory and the computer program code are further configured to, with the processor, cause the apparatus to:

adjust the total demand as a function of one or more external factors.

38. The apparatus according to claim 31, wherein the at least one memory and the computer program code are further configured to, with the processor, cause the apparatus to:
- generate a ranked user list for each of the one or more users comprising each of the one or more virtual offers and an associated calculated probability;
- assign a voting value to each of the one or more virtual offers on each ranked user list; and
- generate a single list ranking each of the one or more virtual offers by adding the voting value each of the one or more virtual offers received on each ranked user list.

39. The apparatus according to claim 38, wherein the determining of the estimated number of units to be sold for is only for a predetermined number of virtual offers, and is based on the ranking of each of the one or more virtual offers on the single list.

40. The apparatus according to claim 38, wherein the at least one memory and the computer program code for selecting of the one or more virtual offers are further configured to, with the processor, cause the apparatus to:
- calculate a projected revenue value for each virtual offer based on prior performance data per unit and the estimated number of units to be sold; rank the one or more virtual offers by the projected revenue; and
- select one or more virtual offers to include in the forecasted demand based on the ranking of each of the one or more virtual offers by revenue and a pre-selected portfolio mix.

41. The apparatus according to claim 38, wherein the one or more external factors includes at least a seasonality component.

42. The apparatus according to claim 31, wherein a virtual offer comprises at least price data, one product category or one service category, and location data.

43. The apparatus according to claim 38, wherein the voting value is derived from a position of the one or more virtual offers on the ranked lists generated for each of the one or more users, wherein at least a predetermined number of virtual offers on each ranked list are assigned a first voting value.

44. The apparatus according to claim 40, wherein the pre-selected portfolio mix comprises at least one of: a category mix, a price mix, or location constraints.

45. The apparatus according to claim 31, wherein one or more combinations of category or sub-category, location and price range are generated for a specified time period.

\* \* \* \* \*

UNITED STATES PATENT AND TRADEMARK OFFICE
CERTIFICATE OF CORRECTION

PATENT NO. : 10,032,180 B1
APPLICATION NO. : 14/316245
DATED : July 24, 2018
INVENTOR(S) : Shariff et al.

Page 1 of 1

It is certified that error appears in the above-identified patent and that said Letters Patent is hereby corrected as shown below:

In the Claims

Column 83,
Line 25, "predetermined tins period" should read --predetermined time period--;
Line 53, "realtime demanded" should read --real time demand--.

Signed and Sealed this
Twenty-ninth Day of January, 2019

Andrei Iancu
*Director of the United States Patent and Trademark Office*